United States Patent [19]

McGee et al.

[11] 3,866,179

[45] Feb. 11, 1975

[54] NUMERICAL CONTROL WITH ENVELOPE OFFSET AND AUTOMATIC PATH SEGMENT TRANSITIONS

[75] Inventors: John K. McGee, Houston, Tex.; Norbert C. Kolell, Fond Du Lac, Wis.

[73] Assignee: Gidding & Lewis Inc., Fond du Lac, British W. Indies

[22] Filed: Sept. 22, 1972

[21] Appl. No.: 291,319

[52] U.S. Cl............ 340/172.5, 235/151.11, 318/572
[51] Int. Cl... G06f 15/46, G05b 19/24, G06f 15/20
[58] Field of Search............. 340/172.5; 235/151.11; 318/572

[56] References Cited
UNITED STATES PATENTS

| | | | |
|---|---|---|---|
| 3,148,317 | 9/1964 | Tripp | 235/151.11 X |
| 3,246,129 | 4/1966 | McKelvie | 235/151.11 X |
| 3,430,121 | 2/1969 | Yoshitake et al. | 235/151.11 X |
| 3,449,554 | 6/1969 | Kelling | 235/151.11 |
| 3,500,150 | 3/1970 | Foster | 318/572 |
| 3,609,319 | 9/1971 | Clifford, Jr. et al. | 340/172.5 X |
| 3,684,874 | 8/1972 | Kelling | 235/151.11 |

OTHER PUBLICATIONS

Wortzman, D., "Cutter Compensation in Numerical Control" in IBM Technical Disclosure Bulletin, Vol. 12, No. 1, June 1969, pp. 152–155.

Dunne, W. L., "Offset Compensation Program to Increase Accuracy of Computer Generated Plots" in IBM Technical Disclosure Bulletin, Vol. 12, No. 9, Feb. 1970, pp. 1401–1402.

*Primary Examiner*—Harvey E. Springborn
*Assistant Examiner*—James D. Thomas
*Attorney, Agent, or Firm*—Wolfe, Hubbard, Leydig, Voit & Osann

[57] ABSTRACT

Numerical control for machine tools and the like of the genus described in McGee U.S. Pat. No. 3,656,124. Improvements are here described for digital computations and control which cause a tool or cutter to follow successive path segments programmed in workpiece edge coordinates, even though the servos operate to control the motion and positioning of the center of a cutter having a finite and unforeseeable radius. Additionally, automatic smooth transitions from segment to segment of the path are effected with a tangent fillet machined on the workpiece which has a radius equal either to that of the cutter or a value which is designated as a single numerical value in the program command data.

36 Claims, 19 Drawing Figures

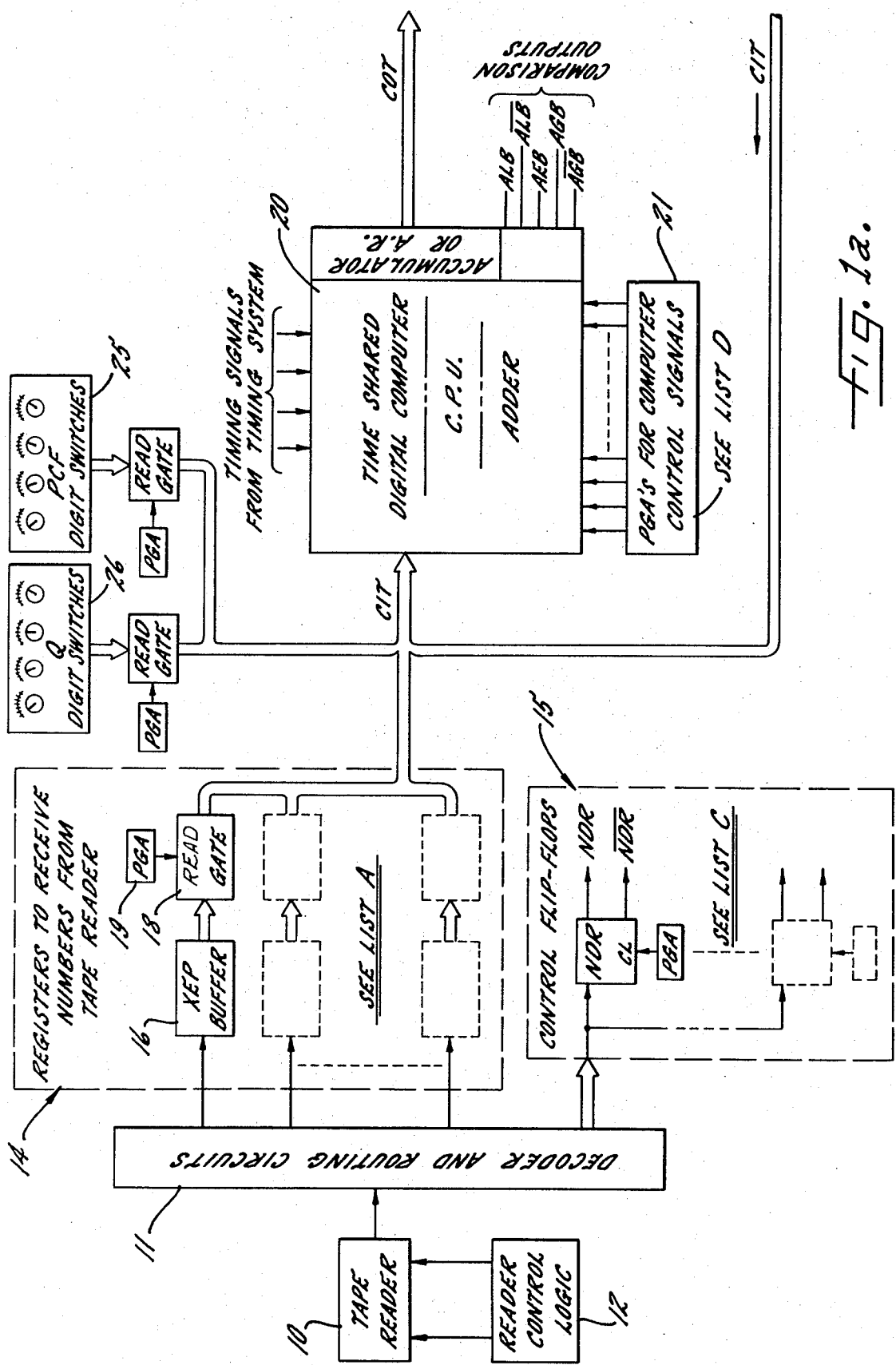

| | (000) | (100) | (200) | (300) | (400) | (500) | (600) | (700) | (800) | (900) |
|---|---|---|---|---|---|---|---|---|---|---|
| | 0000 | 0200 | 0400 | 0600 | 0800 | 1000 | 1200 | 1400 | 1600 | 1800 |
| | 0001 | 0201 | | | | | 1201 | | | |
| | 0002 | 0202 | | | | | 1202 | | | |
| | 0003 | 0203 | | | | | 1203 | | | |
| | 0004 | | | | | | 1204 | | | |
| | 0005 | | | | | | 1205 | | | |
| | 0006 | | | | | | 1206 | | | |
| | 0007 | | | | | | | | | |
| | 0008 | | | | | | | | | |
| | 0009 | | | | | | | | | |
| | 0093 | | | | | | | | | |
| | 0094 | | | | | | | | | |
| | 0095 | | | | | | 1295 | | | |
| | 0096 | | | | | | 1296 | | | |
| | 0097 | 0297 | | | | | 1297 | | | |
| | 0098 | 0298 | | | | | 1298 | | | |
| | 0099 | 0299 | 0499 | 0699 | 0899 | 1099 | 1299 | 1499 | 1699 | 1899 |
| | 0100 | 0300 | 0500 | 0700 | 0900 | 1100 | 1300 | 1500 | 1700 | 1900 |
| | 0101 | 0301 | | | | | 1301 | | | |
| | 0102 | 0302 | | | | | 1302 | | | |
| | 0103 | | | | | | 1303 | | | |
| | 0104 | | | | | | | | | |
| | 0105 | | | | | | | | | |
| | 0106 | | | | | | | | | |
| | 0107 | | | | | | | | | |
| | 0108 | | | | | | | | | |
| | 0190 | | | | | | | | | |
| | 0191 | | | | | | | | | |
| | 0192 | | | | | | | | | |
| | 0193 | | | | | | | | | |
| | 0194 | | | | | | | | | |
| | 0195 | | | | | | 1395 | | | |
| | 0196 | | | | | | 1396 | | | |
| | 0197 | | | | | | 1397 | | | |
| | 0198 | 0398 | | | | | 1398 | | | 1998 |
| | 0199 | 0399 | 0599 | 0799 | 0999 | 1199 | 1399 | 1599 | 1799 | 1999 |

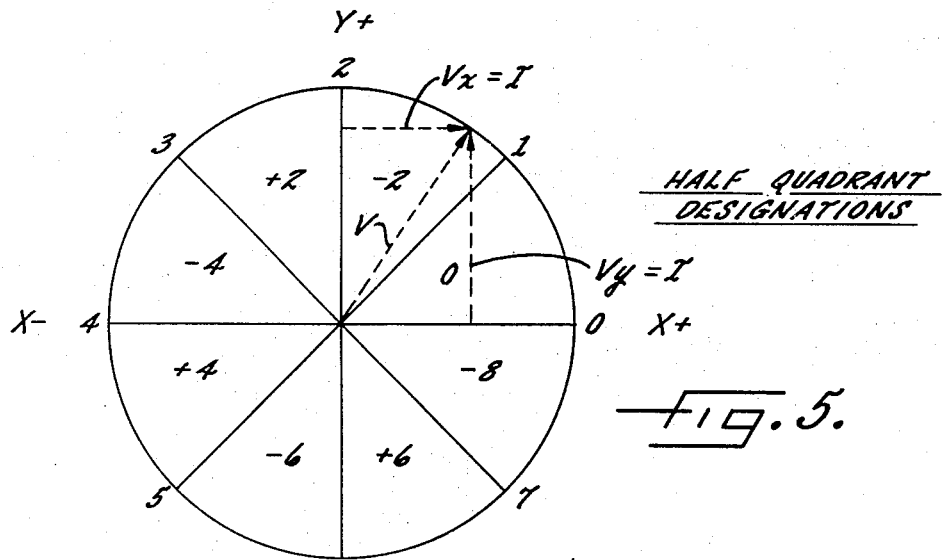
Fig. 5. HALF QUADRANT DESIGNATIONS
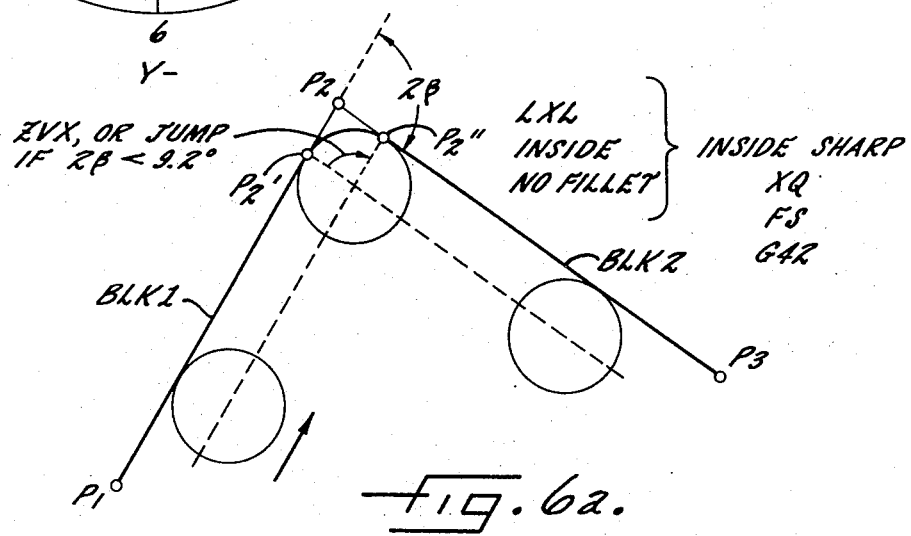
Fig. 6a.
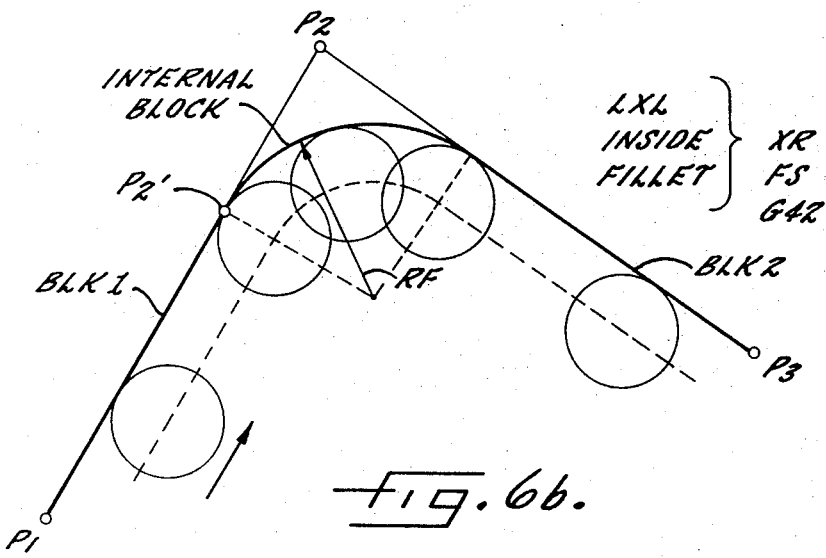
Fig. 6b.

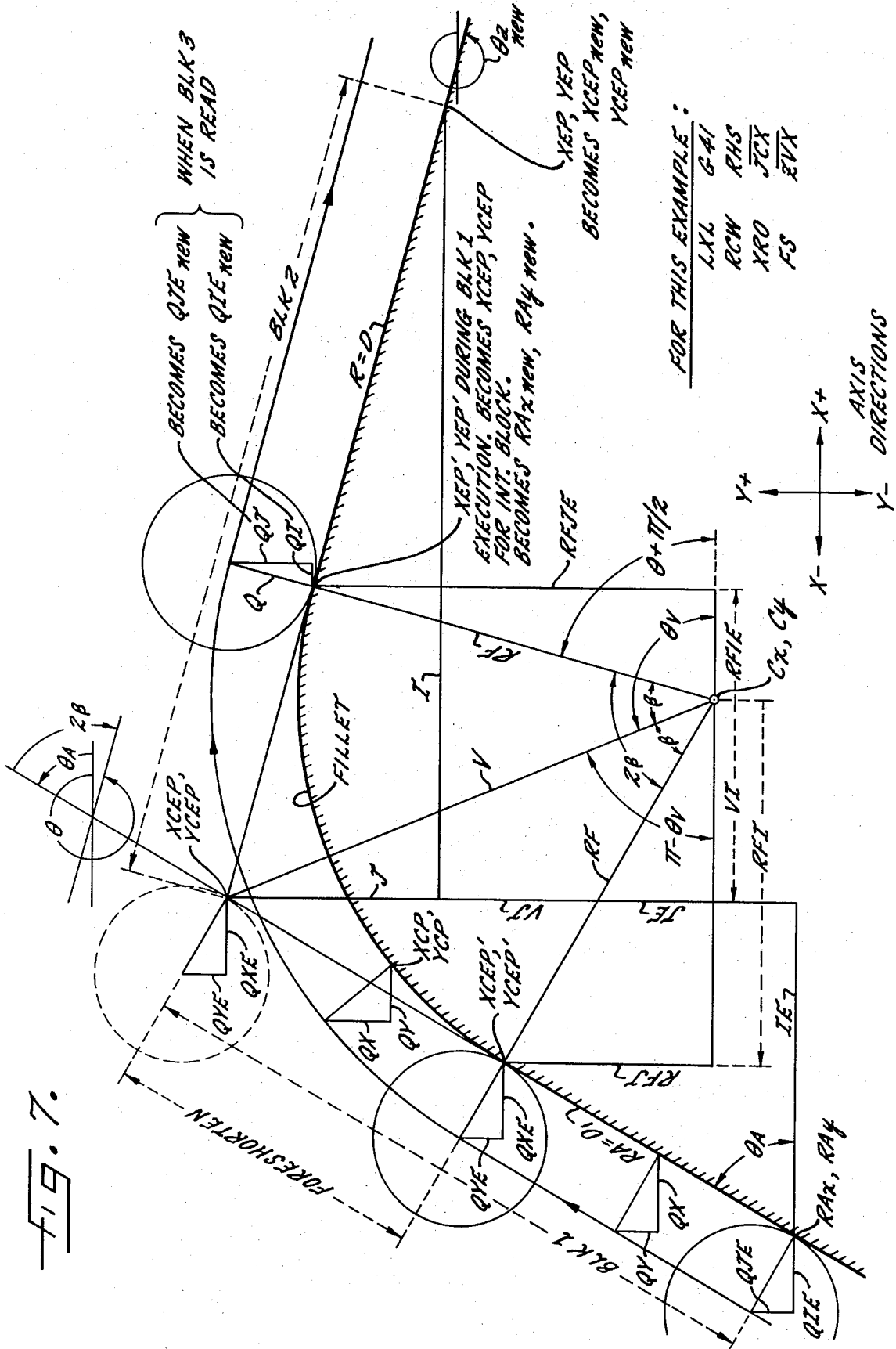

NUMERICAL CONTROL WITH ENVELOPE OFFSET AND AUTOMATIC PATH SEGMENT TRANSITIONS

TABLE OF CONTENTS

Abstract of the Disclosure
The Various Types of Segment Transitions
Detailed Description of Operational Sequences
1. Introduction and Assumptions
2. The Example of FIG. 7: Sequential Operations
    A. DP2 Mode (Table IV)
    B. DP3 Mode (Table V)
    C. DP4 Mode (Table VI)
    D. DP5 Mode (Table VII)
    E. DP6 Mode (Table VIII)
    F. DP7 and 8 Modes (Table IX)
    G. DP12 Mode (Table XIII)
    H. The Principal and Auxiliary Interpolations To Move the Cutter Center Along the Offset Path CCP
        1. Linear Interpolation While Blk 1 of FIG. 7 is Executed
        2. Look-Ahead, Prorate, And Transfer To The Next Block
        3. Execution of the Internal Block For FIG. 7 — Circular Interpolation
    I. Supplemental Data Processing Just After the Internal Block Becomes Active
        1. DP9 Mode (Table X)
        2. DP10 Mode (Table XI)
    J. Completion of Internal Block and Transfer of Block 2 to Active
3. The Example of FIG. 8; Sequential Operations
    A. DP2 (Table IV)
    B. DP3 (Table V)
    C. DP4 (Table VI)
    D. DP5 Mode (Table VII)
    E. DP6 (Table VIII)
    F. DP7/8 (Table IX)
    G. DP9 Mode (Table X)
    H. DP10 Mode (Table XI)
    I. DP12 Mode (Table XIII)
    J. Mode 3 Transfer Operations
4. Entering or Leaving the Envelope Offset Mode
5. Modified Look-Ahead Operations to Anticipate End of, and to Terminate, the Active Block Path Segment
Resume
List A
List B
List C
List D
List E
Table I
Table II
Table III
Table IV
Table V
Table VI
Table VII
Table VIII
Table IX
Table X
Table XI
Table XII
Table XIII
Table XIV
Table XV
Table XVI
Table XVII
Table XVIII
Table XIX The present invention relates in general to numerical control of machine tools and the like, and more particularly relates to such control by iterative computation methods and apparatus of the genus disclosed in McGee U.S. Pat. No. 3,656,124. In a more concrete sense, the present invention relates to "cutter radius compensation," but more accurately to "envelope offset" control with automatic path segment transitions which, in most sharp transitions, are automatically formed with tangent fillets.

For a general understanding of previous proposals dealing with "cutter compensation," reference may be made to the following prior art patents:

U.S. Pat. No. 2,917,693 — Cail
U.S. Pat. No. 3,176,120 — Whitemore et al.
U.S. Pat. No. 3,270,186 — Centner
U.S. Pat. No. 3,430,035 — Read
U.S. Pat. No. 3,555,253 — Seki It is the general aim of the present invention to make it possible to prepare an overall parts program defining successive segments of a part edge path (including both linear and circular segments and with rather large changes in direction between segments) entirely in "part coordinates" measured with reference to an origin fixed in relation to a part workpiece; — and yet to have the operative or tool center move along a parallel or "envelope offset" path such that it produces the desired shape or contour on the part. This is accomplished even though the cutter and its radius may from time to time be changed, and the radius of the cutter was not known to the technician who prepared the part program.

More particularly, it is an object to cause a tool holder and the center of a tool held therein to follow a path which is exactly offset by any desired and adjustable distance from a part edge or workpiece path defined in part coordinates by an overall program of numerical data, thereby to permit cutters of differing diameters to be used without changing a given overall part program, and to permit successive roughing and finishing cuts to be made on the part by re-execution of a part program defining the desired finished shape.

It is another object of the invention to achieve full envelope offset in a simple and advantageous fashion by performing two simultaneous circular interpolations, one involving a circular arc for the part edge path, and one involving a circular arc executed by the tool center about its tangent point of contact with the part edge, the results of the two being summed.

Still another object of the invention is to cause a numerical control system automatically to generate the necessary numerically signaled values to insert an extra path segment, herein called an "internally generated block" or "internal block", which is not defined by the original part program, thereby to cause a tangent fillet to be produced at the corner or transition between two programmed part path segments, such fillet having a radius equal either to the tool radius in the case of an inside sharp corner, or to a value designated by a single numerical word contained within the block of data for the second one of two successive programmed segments.

A further object is to produce a tangent fillet at the junction of two successive path segments defining an inside corner, and with the fillet radius being equal to the cutter radius, without requiring the time for execution of an internal block, but on the contrary, by abrupt transfer of the numerical values which define the cutter radius lying normal to the programmed part edge.

Yet another object of the invention is to automatically produce signals indicating whether a transition between two path segments is an inside corner or an outside corner, merely from processing the programmed data which defines those two successive path segments.

Still further, it is an object to provide signals which classify the nature of a transition between two successive path segments, such signals designating that a transition is inside sharp, outside sharp, inside fillet or outside fillet, these classification signals being advantageously used in sequentially processing the numerical command data in order to achieve envelope offset and automatic smooth segment transitions.

Yet another object of the invention is to derive from the programmed data for two successive path segments a signal indicating if full execution of the first path would cause overrunning of the cutter beyond the position for proper entry into the second path segment, and in this event to signal that "foreshortening" of the first and second programmed path segments is required. A related object is to derive from the programmed data for two path segments an artificial end point for the first segment when foreshortening is required, to terminate the execution of the first path segment when the cutter reaches the artificially foreshortened end point; and to begin the execution of the second block at a foreshortened starting point which is the end point of an internally generated block.

Another object of the invention is to process command data in a numerical control system such that any circular path segment, whether defined by a block of programmed data or by an internally generated block, cannot result in excessive accelerations along either of two axes due to a circular arc of small radius being executed at the programmed feed rate.

Also, an object of the present invention is to determine automatically from programmed data and a numerical representation of cutter radius those instances when the cutter radius is greater than a fillet radius programmed for an inside corner transition, or is greater than a programmed circular path segment radius, and in such cases to delete any response to the circular segment data so that the cutter progresses directly to the next segment.

Still another object is automatically to cause the cutter to decelerate from the programmed path velocity to zero velocity as it reaches the end of a first block segment on an inside sharp transition (fillet formed with radius equal to that of the tool) and then to re-accelerate to programmed path velocity as it begins the second block segment — so that undue accelerations are avoided and an internal block can be "jumped."

And a specific object of the invention is to improve the precision in "looking ahead" and terminating the execution of a circular segment when the principal interpolation involves small updating changes per iteration period — this being accomplished by performing the "look ahead" functions on the auxiliary circular interpolation variables involving the cutter radius.

Other objects and advantages of the invention will become apparent from the more detailed description which follows, taken in conjunction with the accompanying drawings, in which:

FIGS. 1a and 1b when joined together constitute a generalized block diagram of an exemplary numerical control system embodying the features of the present invention and with which the methods of the invention may be carried out;

FIG. 2 is a block diagram of a timing signal generator which supplies timing signals to the system illustrated in FIG. 1a;

FIG. 4 is a block diagram of a counter and decoder for determining different data processing modes in which different computational sequences are performed during any given iteration period $\Delta T$, the counter and decoder supplying logic control signals to the system of FIG. 1a;

FIG. 5 is a diagram showing the code numbers which are assigned to angles lying in the eight possible half-quadrants, as used by the apparatus of FIGS. 1a and b;

FIGS. 6a through 6m are sketches showing various types of corner transitions which may be made between two successive programmed path segments;

Figure 1B:
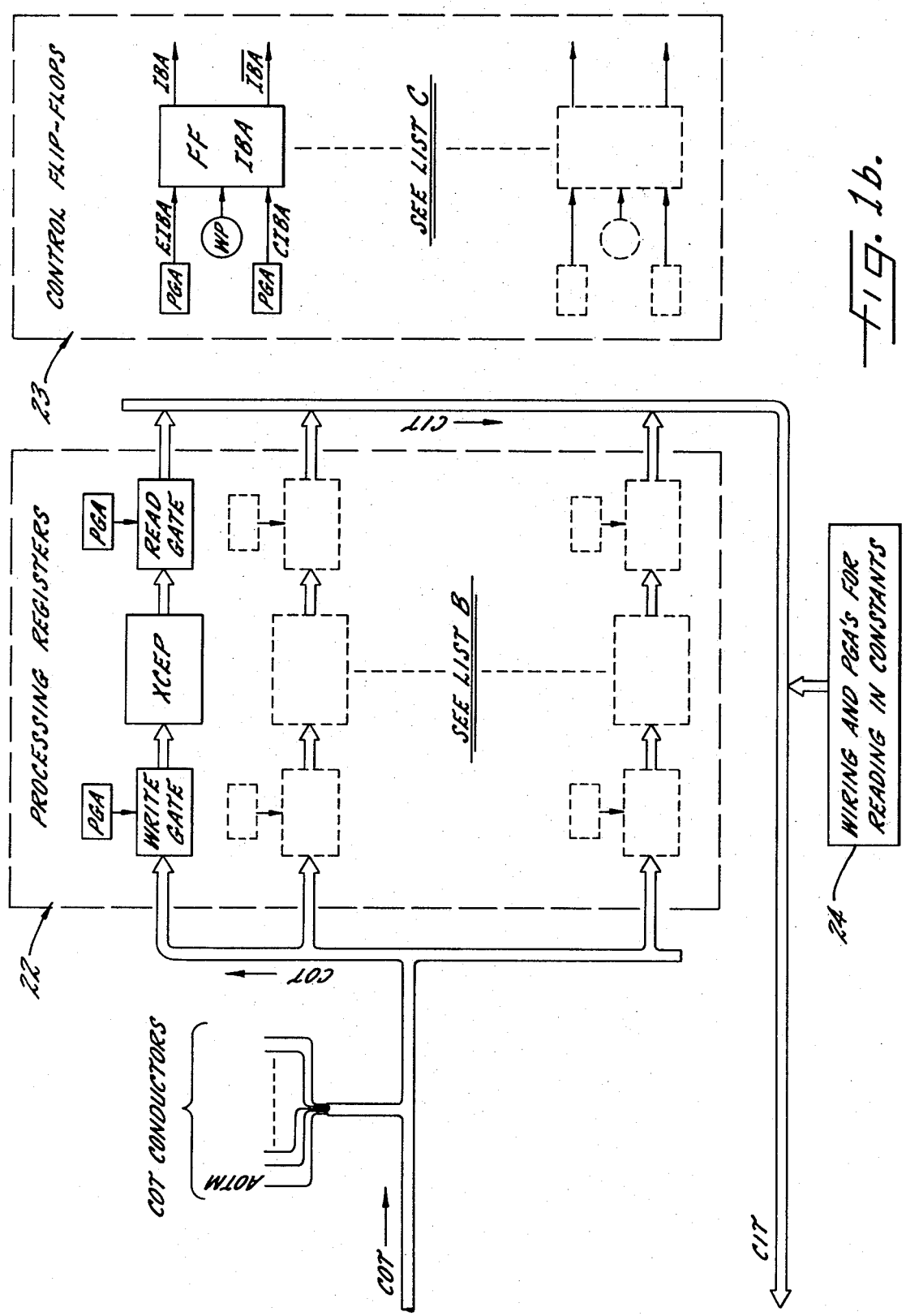
FIG. 1c is a block diagram illustrating how certain logic signals are derived.
Figure 8:
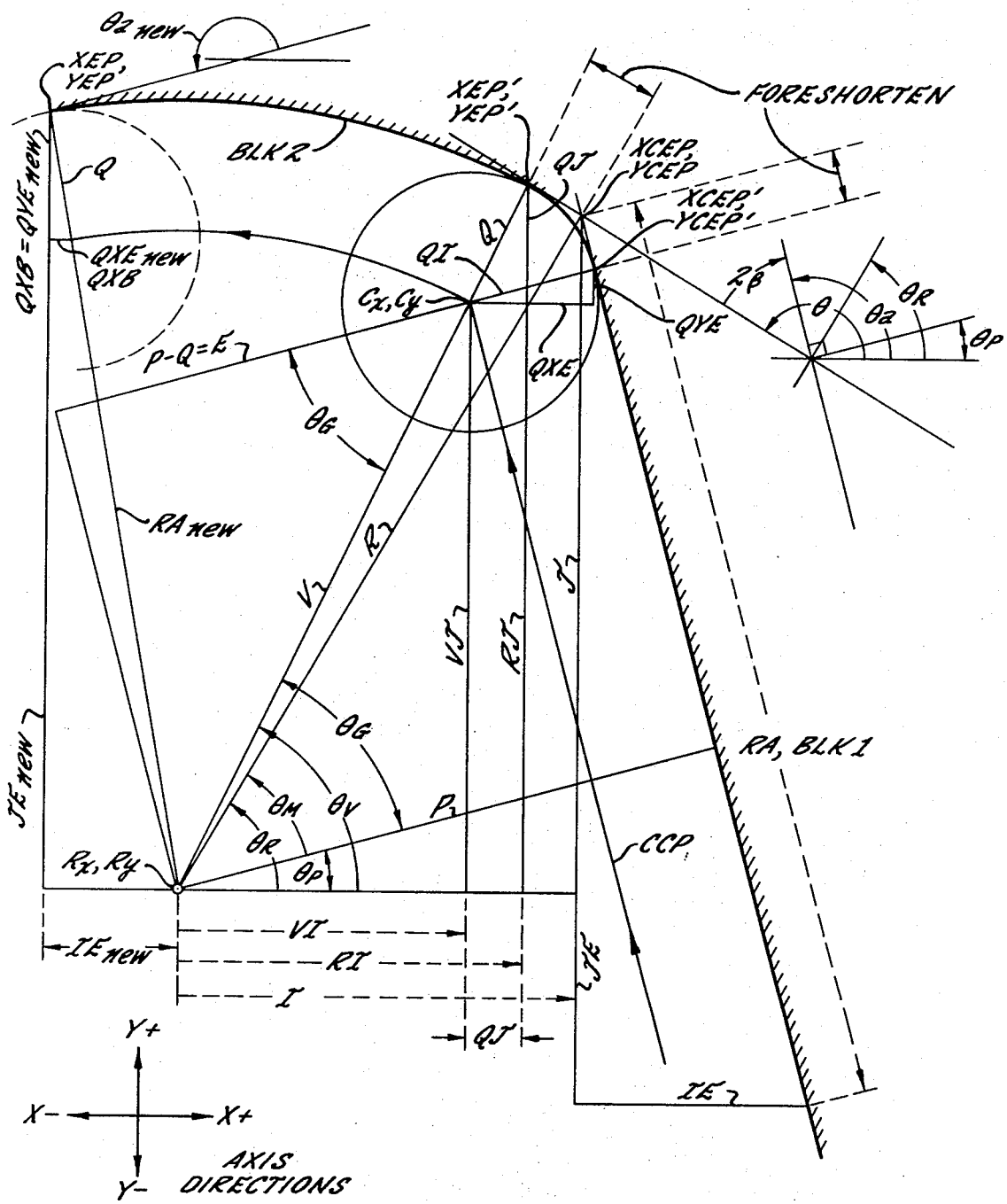

FIG. 7 is a geometric layout of two successive path segments in the plane of X, Y axes to illustrate by alphabetical symbols the physical distances or coordinates which are represented numerically by digital signals within the system of FIGS. 1a and 1b, this layout being for the specific example of a linear-to-linear, outside corner transition with a connecting programmed fillet; and FIG. 8 is similar to FIG. 7 but shows as an example a linear-to-circular inside corner transition without a programmed fillet.

While the invention has been shown by, and its method steps will be described in some detail with reference to, the drawings and the tables which are appended as a part of the present specification, there is no intention that it be limited to such detail. On the contrary, it is the intention here to cover all modifications, alternatives and equivalents falling within the spirit and scope of the appended claims.

At this point, the specification and drawings in U.S. Pat. No. 3,656,124 (herein called Case A) are incorporated by reference to form an integral part of the present disclosure. Although this incorporation by cross reference is not limited thereto, the principal parts of Case A to which further reference will be made are FIGS. 40a through 40m and Tables VII through IX. Moreover, the drawings and description of copending United States application Ser. No. 124,356, now U.S. Pat. No. 3,727,191 (herein called Case B) — filed Mar. 15, 1971 in the name of John K. McGee (one of the present applicants) and assigned to the assignee of the present application — are incorporated by reference into the present disclosure. By reading Case A and Case B, one skilled in the art will fully understand the ensuing description in this application, and the drawings and description in the present case can thus be desirably abbreviated in relation to the number and length which otherwise would be required. Except where specifically noted herein, the same symbols for storage registers, signaled numbers and control signals as employed in Cases A and B are also used in the present drawings and description.

There are attached as the last several pages of this specification five Lists designated A through E and several logic control tables designated Tables I through XIX. It is believed that repeated reference to the various lists or tables will be facilitated by placing them at the end, so that they may be temporarily removed and easily inspected while the text is being perused.

By way of a general introduction, it may be noted from FIGS. 1a, 1b, 2, 5 and 6 in Case A that the cutter of a machine tool (such as a milling machine) may be moved through different linear or circular path segments within the plane of X, Y axes in order to machine a desired shape or contour on a workpiece, that shape or contour being herein called "the part edge" and being numerically defined by successive blocks of programmed numerical data. Generally, the successive blocks of program data are digitally represented on an input record medium, such as a punched tape, which is read, one block at a time, by a tape reader 10 (FIG. 1a) to produce corresponding digital output signals transmitted to a decoder and routing circuits 11. The starting and stopping of the tape reader is controlled by reader logic 12, and the output signals from the decoder and routing circuits are passed to receiving registers collectively designated at 14 in FIG. 1a, or to receiving control flip-flops collectively designated at 15. The nature and the organization of the initial input registers and the control flip-flops 15 in FIG. 1a of this case will generally be understood by reference to FIGS. 40k through 40m in Case A or FIGS. 9l, 9m, 9n and 9o in Case B.

Each of the registers within the group 14 receives addressed numerical input signals from the decoder 11, and each is capable of supplying those signals to a computer input trunk CIT whenever an associated read gate is enabled by a connected Pulse Gate Array (here called PGA). Since the organization of these several registers and their respective read gates and PGA's is substantially identical, and the details of several examples are given in Case A, it will suffice in the present instance merely to indicate that the registers 14 correspond in number and in their individual identifications to the symbols which are set out and described in List A. Merely as an example in FIG. 1a an XEP buffer storage register 16 is shown as included within the group of List A, this register receiving numbers designated by the X address from the tape reader 10, and holding those numbers until they are replaced by a new set. A read gate 18 is connected to the output terminals of the buffer registers 16, and that gate is opened when it receives an enabling signal from an associated PGA 19. The PGA 19 receives signals from the timing signal generator (to be described) and other logical control signals as will be made clear from the later description of Tables I–XIX. Although the individual registers in the group 14 are not shown as having write gates controlled by PGA's, most of such registers are so equipped; and thus they may receive input signals either from the decoder 11 or the output trunk COT of the time-shared computer mentioned below.

Certain control flip-flops shown collectively at 15 may be set in response either to address signals or codes received from the tape reader 10, or to input pulses passed by timed logic PGA's. Also, each of these flip-flops may be reset or cleared in response to a signal received from an associated PGA which in turn receives logic signals from the timing signal generator and other sources, as designated by the Tables forming a part of the present specification. The quantity and the individual identity of the several flip-flops included in the group 15 is made clear by List C, to which attention is directed. It may be noted, incidentally, that most of the flip-flops which comprise the group 15 and which are identified in List C are also shown and described more fully in Case B.

The numerical control system of FIGS. 1a and 1b further includes a time-shared digital computer 20 which is capable of performing individual arithmetic operations in relatively short times, on the order of 10 microseconds or less. The computer can thus be "time-shared" to perform a great number of arithmetic operations and sub-routines. It will suffice here simply to indicate that the computer 20 may take any of several suitable forms known to those skilled in the art; specifically, it may be of the type which is shown at 53 in FIG. 9f or 40f in Case A, or in FIG. 9f of Case B, and there described in considerable detail. Merely by way of review, it will be noted here that the computer 20 of FIG. 1a receives timing signals from the timing system of FIG. 2 so that its operations are carried out in a precisely timed fashion. It receives multi-digit signals representing (in BCD notation) numerical values on a multi-conductor input trunk CIT, serving normally to add a received input number to the number then existing in its accumulator or answer register whose output terminals lead to a multi-conductor output trunk COT. The computer 20 may, however be controlled by various control signals so as to perform other arithmetic operations, and for this purpose, a plurality of PGA's shown collectively at 21 supply various control signals to the computer 21 during various time steps and if various other logic control signals exist. Because the nature of these control signals, and organization of the PGA's by which they are created, is explained in detail in Cases A and B, it is necessary in the present application only to indicate that these computer control signals are identified in List D. Within the latter list, only the control signal CONV is not explained in either Case A or Case B; this control signal causes the computer to convert a number which is expressed in characteristic plus mantissa form into decimal form, i.e., so that the resultant decimal form is signaled in binary coded decimal notation. More specifically, if the mantissa of a number signaled in characteristic plus mantissa form is first placed into the computer accumulator, and the characteristic then read into the computer on the CIT with the simultaneous appearance of a CONV control signal, then the computer will, in a sequence of time steps, end up with the decimal form of that number signaled in its accumulator and on its output trunk COT.

As explained in Cases A and B, the computer 20 is also capable of performing a comparison or classifying operation. If a number A is first read into the computer, and a second number is read into the computer at a later time step along with a classification control signal cx, then a binary 1 level signal ALB or AGB appears on the output terminals labeled correspondingly in FIG. 1a if the number A is respectively less than or greater than the number B. The signals $\overline{ALB}$ and $\overline{AGB}$ are simply the inverse or complement of ALB and AGB, while the signal AEB signifies that the number A is equal to B. Whenever a classification operation is performed in the computer 20, the original number A remains in the answer register, and the particular classification signals produced remain in existence until another classification operation is performed.

For the storage of changeable numbers, a large plurality of storage registers are employed, and these are collectively represented at 22 in FIG. 1b. While such storage registers and the manner in which numerical values are placed therein or read therefrom are fully described in Case A, it may be observed briefly here that each such storage register has input terminals connected to the output trunk COT through a WRITE gate which is controlled by a PGA. Therefore, if the PGA is activated on any given time step because other necessary qualifying logic control signals are then supplied thereto, the WRITE gate will be opened and the number signaled at that instant on the COT will be transferred into the associated storage register, replacing the number or the signals previously stored therein. On the other hand, the output terminals of each of these storage registers included within the group 22 are connected through a normally closed, multi-conductor READ gate which is controlled by a PGA. Whenever that PGA is activated because the logic signals and timing signals which it requires are all simultaneously present, the READ gate will be opened, and the signals in the associated storage register will be transmitted to the multi-conductor input trunk CIT and fed to the input of the computer 20. The several storage registers which comprise the group 22 are identified by symbols in List B, to which attention is directed. Those registers in List B down to the register YR have been described in Case A, and those registers in List B from Q' to PVC are identified in Case B. Thus, the significance of the changeable numbers which appear in these particular registers will not only be apparent from the brief descriptions which appear in List B but also from Case A and Case B. Beginning with the register SPRA in List B, however, there are a plurality of registers which have not been specifically described in Case A or Case B. As to these, however, the organization of each will be apparent from the examples of the storage registers given in Cases A and B. Therefore, it is unnecessary to show in FIG. 1b each of the many registers which are identified in List B. It may be noted, incidentally, that the register Q' which is included within in List B designates that register which was called Q in Case B; and this is for the reason that in the present application there is a separate numerical value which is designated simply Q. Also, a large plurality of Scratch Pad registers which may have different numbers stored in them at different times are indicated at the end of List B as comprising Scratch Pad registers SP1-SP40. Of course, as many Scratch Pad registers may be employed as may be required. The registers in groups 14 and 22 (Lists A and B) are, for all intents and purposes, substantially alike in that all have both read and write gates controlled by PGA's, but the group 14 has been shown separately to indicate that these registers may also directly receive addressed input signals from the tape reader.

There is also shown in FIG. 1b a plurality of control flip-flops collectively designated 23. Each of these is identified in List C, and their output signals are used as inputs to the various PGA's, or for other qualifying control purposes, as designated in the Tables to be described below. Briefly, each of the control flip-flops includes setting and resetting input terminals which receive input logic 1 signals from respective PGA's when the conditions required by those PGA's are satisfied. Thus, with reference to the example of flip-flop IBA in FIG. 1b, the flip-flop will be set to its 1 state when a WRITE pulse appears on its terminal WP during any time step when an enabling signal EIBA is supplied by the associated PGA. That PGA is in structure and function fully described to one skilled in the art (and especially one familiar with Case A) by the time step line 3-x697 in Table −X where conditions required for a response are indicated. When in the "set" or "1" state, the flip-flop IBA produces a logic 1 signal designated IBA; and at this time, the signal $\overline{IBA}$ is absent or at a logic 0 level. Thereafter, at some later time period and under certain other conditions when the clearing PGA is required, a "clearing" signal CIBA is supplied to the resetting input terminal of the flip-flop IBA. A WRITE pulse appearing during any time step when the CIBA signal exists, will cause the flip-flop to be reset to its 0 state making the signals IBA and $\overline{IBA}$ respectively reside at logic 0 and 1 voltage levels. In essence, therefore, the several control flip-flops represented collectively at 23 in FIG. 1b constitute one bit storage registers whose output signals are employed for logic control purposes. The general function of each of these several control flip-flops will be apparent from List c.

Also shown in FIG. 1b collectively at 24 are the PGA's and wiring for reading in predetermined constant numbers to the computer 20. The manner in which any desired decimal value can be supplied under certain time step and logic conditions to the input of the computer will be apparent from Case A and Case B, particularly from FIG. 9r in Case B. In the Tables for this case, the designation of reading in a particular number such as 2.000 simply means that the appropriate PGA is enabled to connect logic 1 level signals to the proper conductors of the input trunk CIT so that the computer receives that number as an input.

It may be desirable in some instances to sense the bit signals which appear on the individual conductors of the output trunk COT, particularly that bit conductor which by a logic 0 or a logic 1 signal indicates that the output number is positive or negative in sign. Thus, in FIG. 1b it is shown that the individual conductors of the output trunk COT are available to be used for supplying logic signals and, in particular, the sign conductor is shown as supplying a signal AOTM whenever the number represented on the computer output trunk is negative in sign.

Finally, two numbers may be fed into the system by manually setting digit switches. More particularly, a first set of digit switches 25 may be manually adjusted to represent the value of a percent override factor PCF, and this number may be supplied through an associated read gate (when enabled by its PGA) to the input trunk CIT. The digit switches 25 and the significance of the percent override number PCF are explained with reference to identical digit switches shown at 228 in FIG. 9q of Case B. In the present application, however, there is still another changeable number which is manually adjustable by an operator who may adjust a plurality of digit switches. As here shown, the second set of digit switches 26 represents a number designated Q which, at desired time steps and under certain logic conditions, can be transmitted through a read gate and over the CIT to the input of the computer 20. The adjustable number Q represents the radius of the cutting tool which is operating in the machine tool spindle. As cutters are sharpened and thus changed in diameter before being replaced in the machine tool, or as cutters of differing diameters are used for various reasons in the machine tool, the operator need only correctively adjust the digit switches 26 to represent the radius of the tool actually being used, and the control system will then function properly even though the programming technician who prepared the original part edge program did not know, and could not know, what the radius of the cutter would actually be.

In the subsequent description of computational steps which are carried out, reference will also be made to several miscellaneous control signals which exist under different conditions. For convenience, these miscellaneous control signals are identified in List E, and they may be briefly explained at this point. First, as explained in Case A, each block of command data for one path segment read from the punch tape by the reader 10 includes a designated code to indicate whether that path segment is linear, circular clockwise, or circular counterclockwise. Those path segment indicator codes are respectively G01, G02 and G03; and such signals are created by a decoder associated with the G Buffer register included in the register group 14 of FIG. 1a (and as shown at 46a in FIG. 91 of Case B). The G code signals are modal, however, and as between code groups of different significance, any particular G code will be retained until a different one is read by the tape reader 10. Thus, every block of command data on the record medium need not contain a path indicator G code. Also, the decoder associated with the G Buffer register includes flip-flops which are respectively set or cleared so as to retain a particular G code within a given group until a new such G code is received. Thus, whenever a control signal G01, G02 or G03 exists, it indicates that the "next block" corresponding to the data in buffer storage (and not the "last block" corresponding to the data in active storage which is being executed by the machine tool servos) is respectively linear, circular clockwise or circular counterclockwise.

Secondly, the signals G40, G41 and G42 shown in List E also are provided as modal signals from the G decoder associated with the G Buffer register. The control signal G40 exists whenever the system is not commanded to operate in the envelope offset mode; whereas the code signals G41 or G42 are read from the punched tape and appear at the output of the G decoder whenever the control system has been commanded respectively to operate in the envelope offset mode with the cutter on the left of the part edge (when looking in the direction of cutter travel) or when the control system has been commanded to operate in the offset mode with the cutter disposed on the right hand side of the part edge (looking in the direction of cutter travel). Thus, by placing a G40, a G41 or a G42 code in any command block of data on the input record medium, the programming technician designates the nature (or lack) of the offset mode which is desired.

The next control signal in List E is NBC which means "next block circular." This control signal is tantamount to the presence of a G02 or a G03 signal, and is thus derived from the G decoder mentioned above. The complement of the NBC signal, which of course is written $\overline{NBC}$, therefore simply designates that the next or buffer block of data defines a path segment which is not circular, and therefore linear, and thus is tantamount to a G01 signal. These relationships are apparent from List E and from FIG. 1c which shows logic circuits by which certain control signals are derived.

In contrast to signals designating the nature of the path segment for the last-read block of data in buffer storage, signals are also produced to designate the nature of the path segment for the block of data in active storage, and which the servo controls are currently executing. As shown in FIG. 40f of Case A, when the G01, G02 or G03 mode signals are transferred to an active register 105' constituted by two flip-flops, resulting G signals are decoded by a plurality of AND gates and an OR gate as shown at 106'. Thus, the "last block" or active block nature is designated by a control signal LIN if linear, a control signal CW if circular clockwise, a control signal CCW if circular counterclockwise, and a control signal CIRC if circular (i.e., if either CW or CCW). These latter control signals therefore designate the nature of the segment defined by the active block data.

List E next includes the control signals AOTM, ALB, AEB and AGB which have been mentioned above. The AOTM signal exists whenever the computer answer register contains a negative number. The BRxx signal in List E refers to the fact that the computer contains an auxiliary answer register which may be called the "B register", and the individual output terminals of that register may be sensed to see whether they carry logic 1 or logic 0 signals. Thus, it is possible to determine whether or not a certain numerical value is signaled in the B answer register of the computer by sensing the individual output terminals of that register which signal a number in binary coded decimal notation.

The next signal in List E is CND, and this requires separate explanation only in that a "clear new data" signal CND operates to clear all of the new data flip-flops which are identified as the last five items in List C. In other words, when a CND signal is produced by a PGA, it serves to clear or reset any or all of the "new data" flip-flops (e.g., NDR, NDI, etc.) which may at that instant be in the set state.

Figure 2:
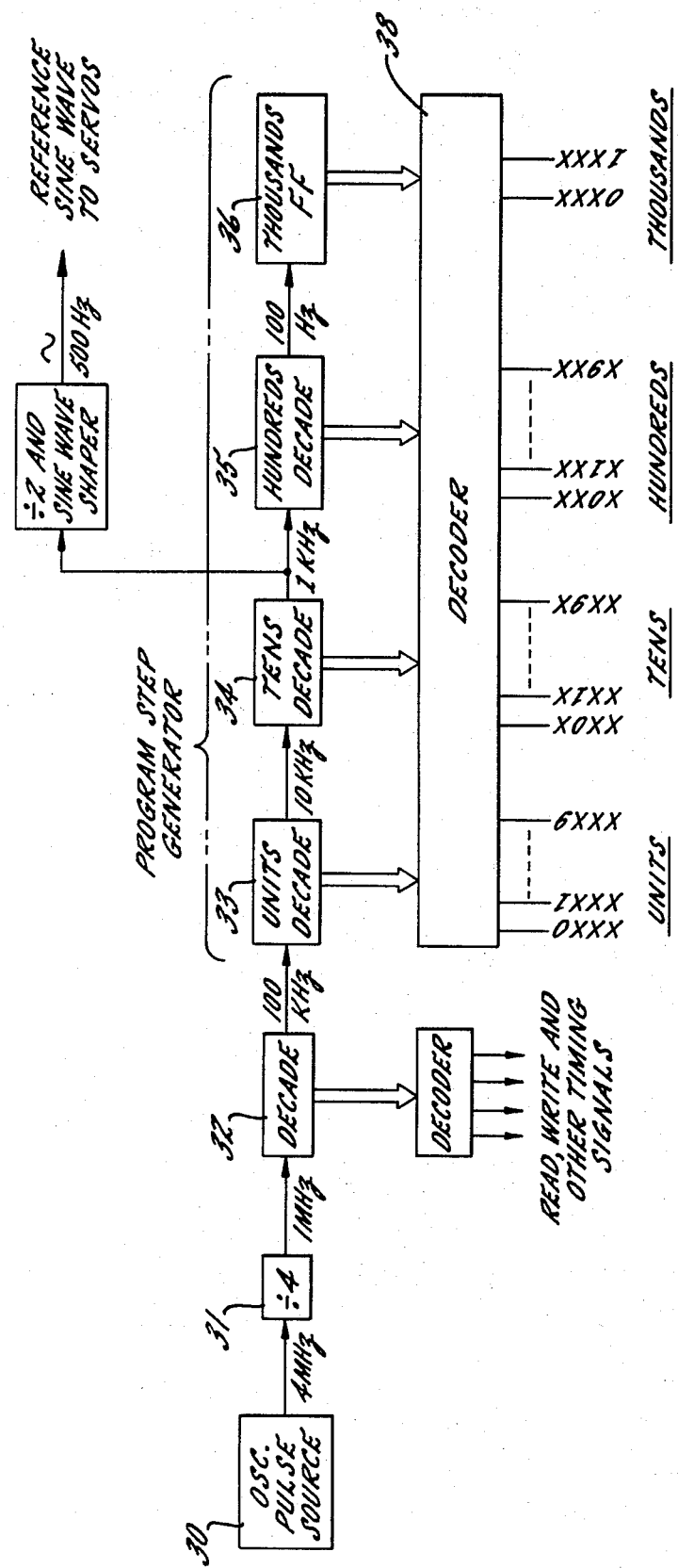

The next signal CHD in List E is generated by an appropriate PGA, and is fed to the HD counter in FIG. 2 such that the counter is "cleared" or reset to 0.

Figures 1C, 3:
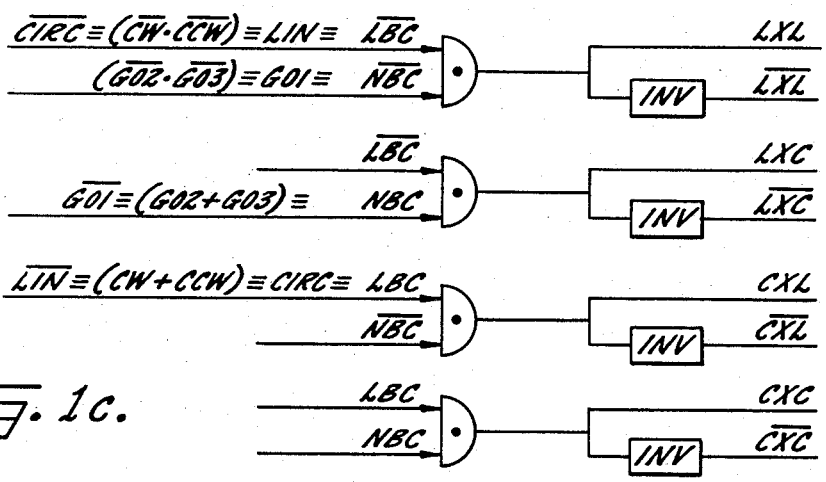
FIG. 3 is a chart, fragmented and partially omitted to conserve space, illustrating the manner in which "program steps" and "time columns" within one iteration time period $\Delta T$ occur in sequence and are numerically designated.

Four items in List E are signals designating the nature of the two successive path segments which are involved in any particular transition. The logic signals LXL, LXC, CXL and CXC respectively mean that the transition is linear-to-linear, linear-to-circular, circular-to-linear or circular-to-circular, —the first word in each case referring to a first block (here called block 1) and the second word referring to the second block (here called block 2). As shown in FIG. 1c and as indicated in List E, the LXL signal may be derived from an AND gate which receives two input signals $\overline{LBC}$ and $\overline{NBC}$ meaning that block 1 is not circular and is therefore linear and block 2 (the next block) is not circular and therefore is linear. The $\overline{LBC}$ signal is tantamount to the signal LIN, or to the signal $\overline{CIRC}$, and also exists when signals $\overline{CW}$ and $\overline{CCW}$ are simultaneously present. In a similar vein, it will be understood that the $\overline{NBC}$ signal is tantamount to a G01 signal or to the simultaneous presence of the signals $\overline{G02}$ and $\overline{G03}$. In a similar fashion it will be apparent from FIG. 1c how the signals LXC, CXL and CXC are derived from simple AND gating logic with inverters to produce complement signals. Those skilled in the art of Boolean logic and digital control circuits will, of course, understand that any symbol which carries a superimposed bar designates "not," and it may be produced by an inverter which complements the primary signal.

The timing signal generator for the present case differs from the corresponding signal generator described in case A only in that it provides a greater number of individual time steps within each iteration period $\Delta T$, in order that more time steps can be available for carrying out the different computations which may be required. FIG. 2 of the present application may be compared with FIG. 9b and FIG. 40b of Case A, and FIG. 3 in the present case may be compared with FIG. 10a in Case A. Only the differences will be briefly noted here. In particular, FIG. 40b of Case A shows a pulse source or clock having a frequency of 4MHz and a succession of dividing circuits or counter stages comprising a divide by 4 flip-flop array 141', followed by four decade counters 131', 133', 135' and 137'. In consequence, the timing in Case A involved one complete counting cycle and one iteration period $\Delta T$ during each 1/50 second, and each such $\Delta T$ was divided into 1,000 individual time steps as shown in FIG. 10a of Case A. Those 1,000 time steps were divided into 10 columns of 100 steps each, and thus it was possible to designate any time step between 000 and 999 by a numerical value of the count signals from decoders associated with three decade counters in FIG. 40b.

In FIGS. 2 and 3, however, the number of time steps is essentially doubled because the oscillator pulse source or clock 30 produces pulses at a frequency of 4MHz fed to a divide-by-four circuit 31 and four decade counter units 32–35, the latter supplying its carry output pulses to a divide by 2 flip-flop 36. In this arrangement, therefore, the decade 32 corresponds to the decade counter 131' of FIG. 40b in Case A, but the program step generator is made up of decade counters 33, 34, 35 and the flip-flop 36. Therefore, during each complete counting cycle, the number signaled in BCD notation by the program step generator changes from 0000 to 1999, as shown in the fragmented time step table of FIG. 3. The output signals from the program step generator counting units are supplied to a decoder or BCD to decimal converter 38, so that the numbers which are contained at different time steps in the program step generator are signaled in decimal notation by a binary logic 1 level on one of the conductors within each of the units, tens, hundreds and thousands groups. As a way of visualizing the sequence which occurs during each iteration period $\Delta T$, the succession of program step numbers may be visualized as made up of 20 individual columns of 100 steps each, but with the pairs of columns arranged vertically, i.e., with the column 0100 located below the column 0000, the column 0300 located below the column 0200, and so on. Since the entire sequence of program steps shown in FIG. 3 occupies 1/50 second, each of the two thousand individual program steps is ten microseconds in duration and each of the 20 "hundreds" columns occupies 0.001 seconds.

In the present case with the timing arrangement shown by FIG. 3, the even-numbered time columns 0000 through 1800 at the top of FIG. 3 correspond to the columns which have been designated 000 through 900 in FIG. 10a and elsewhere in Case A. Except for this noted difference, the timing signal generator in FIG. 2 of the present case is otherwise substantially identical to the timing signal generator shown and described in Case A. In the various time "columns" which appear in some of the Tables at the end of this specification, the time column numbers under the numbering system of Case A are designated in parentheses just as they are in present FIG. 3. The successive short periods required to run through all of the two thousand time steps of FIG. 3 are called "iteration periods" but each such period will, for brevity, be here called a $\Delta T$. A $\Delta T$ in this exemplary system is 1/50 sec., and each time step is 10 microseconds.

It will be understood from Case A, of course, that all of the various pulse gate arrays (i.e., PGA's) receive not only control signals from the timing signal generator but may also receive other logic control signals so that they produce an enabling output during a particular time step and when certain predetermined conditions prevail. From the example given in FIG. 16 and described at Columns 39 and 40, one skilled in the art will know immediately and in detail how to construct and physically connect each of the PGA's which are utilized in the present apparatus. More particularly, from Tables III through XIX forming a part of this specification, the modes, timing steps and qualifying condition signals for enabling any given READ or WRITE gate, or any given flip-flop, are concretely specified. From this, one skilled in the art will be able readily to construct the rather extensive PGA which will produce an output signal under the various required conditions and with the required timing. By this "shorthand" designation of structural details, which provides a clear and concrete disclosure, the drawings and description in this application have been prepared in a fashion to avoid the confusion of a myriad of figures, crossing wires and connections which exist in the completed physical embodiment of the novel appparatus which carries out novel successions of method steps.

The end of block counter shown in FIG. 40e, and the multi-mode time base logic arrangement shown in FIG. 40d of Case A are employed in the present instance, and these result in the system being placed in Mode 1, Mode 2 or Mode 3 under different circumstances. Different computational sequences may occur in different modes because of the manner in which logic input signals are applied to the various PGA's throughout the system. In addition to this mode arrangement as described in Case A, however, the present system involves a "data processing" mode controller which handles each block of data after it is read in from the tape reader 10 in a fashion to derive the necessary numerical and control signals for producing the envelope offset and automatic smooth corner transitions which will be described hereinafter. As a general introduction, the data processing mode controller shown in FIG. 4 causes certain sequences of operations to be carried out during the odd-hundred designated columns in the lower half of FIG. 3 whenever a "HD counter" is in certain different ones of its count states, —so that different computational sequences may occur according to the advancement of the count state of the HD counter.

Figure 4:
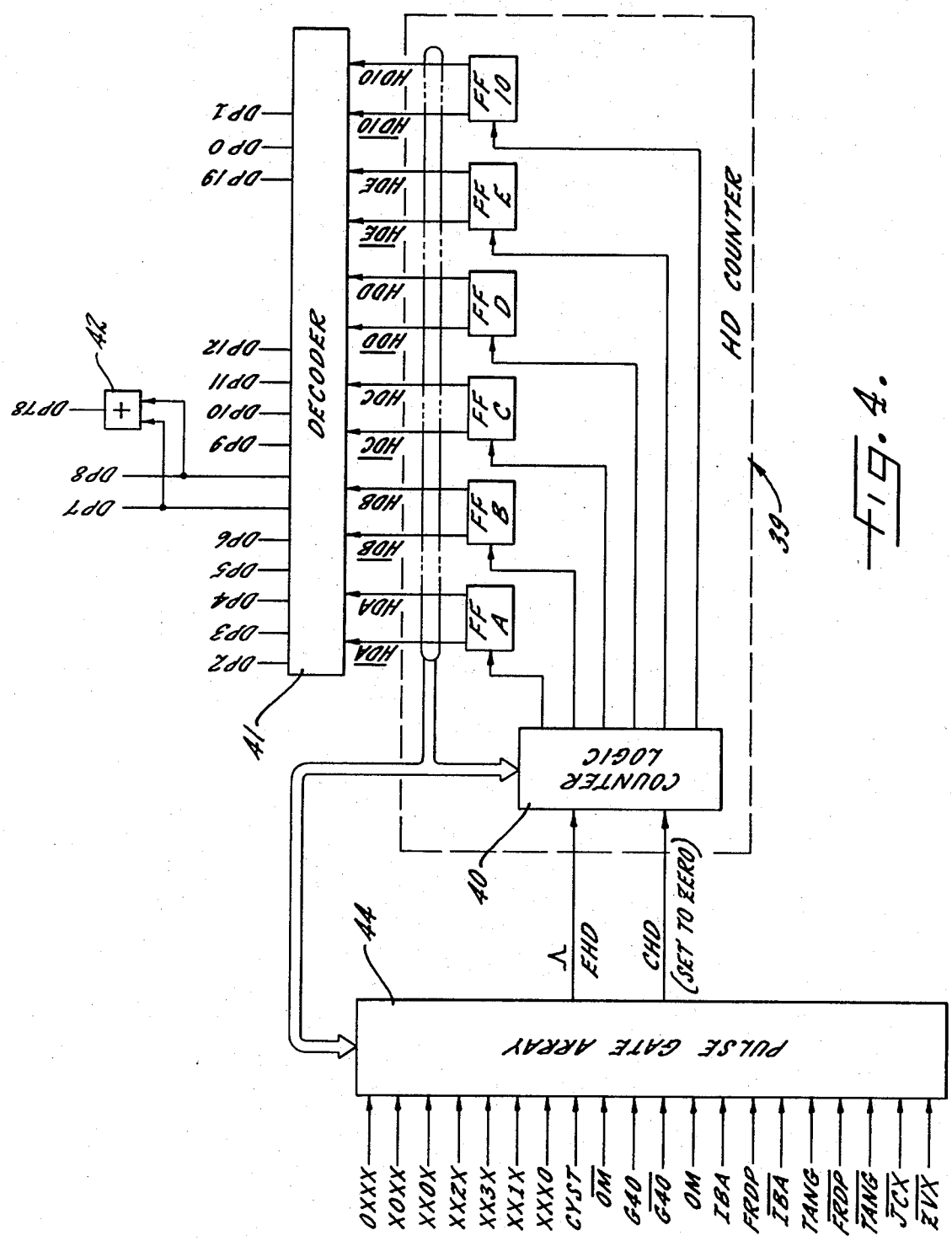

Referring to FIG. 4, the HD counter receives enabling or input pulses EHD to be counted and these are routed through counter logic 40 to control five flip-flops A, B, C, D and E plus a final flip-flop FF10. Thus, the HD counter 39 is organized as a switch tail counter which can count from a zero state to a full count of nineteen, and then begin a new counting cycle. This is accomplished by the counter logic 40 gating pulses to the several flip-flops such that flip-flop A is set to the 1 state after the first pulse is received, and as the next four input pulses are received, that 1 state is successively shifted to the right, as shown by the counting sequence shown in Table I. Thus, after five pulses have been received, the flip-flops A through E are all in one state; but thereafter, the counter logic 40 causes the flip-flop A to be reset in response to the next or sixth pulse. The reset or 0 state is then successively shifted to the right in response to successive input pulses, but at count state 10 (see Table I) when flip-flops A through E have been restored to a 0 state, the switch tail final flip-flop 10 is switched to a 1 state. Thereafter, the foregoing sequence for flip-flops A through E is repeated, so that after the nineteenth input pulse has been received, flip-flops E and 10 are in the 1 state, and the next succeeding input pulse resets these to restore the HD counter to its 0 state.

Each of the flip-flops within the HD counter provides "true" and "complement" output signals to a decoder 41 which, in essence, signals the count state of the counter itself in decimal notation. Thus, the decoder output terminals are labeled DP0 through DP12 and DP19. When any of the signals DP2 through DP12 exists, the system is said to be in preliminary data processing modes DP2 through DP12. An OR circuit 42 produces an output signal DP78 whenever the HD counter is either in the seven or eight count state. The equivalent decimal count state, the combination of true or complement signals which uniquely correspond thereto, and the corresponding "DP" output signal from decoder 41 are shown in Table II for convenient reference. These DP or data processing mode controlling signals are fed to the various PGA's of the system in order to condition the system to perform certain predetermined calculations and functions under different conditions. This will be apparent as the more detailed description of operational sequences is presented below.

As shown in FIG. 4, the input pulses (here called EHD) to the HD counter 39 are produced only under certain predetermined conditions, and during certain predetermined time steps, by a pulse gate array 44 which not only receives the output signals from the HD counter 39 but also receives control signals from the timing signal generator and certain other flip-flops or logic circuits in the system. The manner in which the HD counter advances from one state to the next, and thus places the system in one DP mode or another, is logically designated by the shorthand gating control designations set out in Table III. A brief explanation of the "shorthand language" in Table III will be helpful at this point, and it will then be clear how the pulse gate array 44 in FIG. 4 is organized and operates. Referring to the first line in Table III, on time step 0020 designated in the left column, an input pulse EHD is supplied to the HD counter 39 if at that instant the logic control signals CYST, HDA, $\overline{HDB}$, and $\overline{HD10}$ all simultaneously exist. From the code of Table I, it will be apparent that the HDA flip-flop is set, and the HDB and HD10 flip-flops are reset only when the counter is in its decimal one state, so that the counter will be advanced from its one state to its two state if the logic control signal CYST exists during program step 0020. From this example, it will be apparent that time step gating numbers are shown in the left column, the gating control signals (written in Boolean logic form) required to produce a certain result appear to the right of the first column, and the result is designated on the right side of a center vertical line. The remaining gating conditions, which result in EHD, i.e., an input pulse and advancement by one in the state of the counter 39, shown in Table III will not be treated in detail at this time, since Table III will be more readily understood after the logic control signals designated therein have been more fully explained. It may be noted, however, from Table III that the HD counter is advanced in its count state only during a relatively early time step within each iteration period ΔT. That is, if the HD counter is to be advanced, it will be advanced in time column 0020 or 0010 or 0030, and having been advanced into a given count state to establish a particular DP signal from the decoder 41, the counter will remain in that state until the early portion of the following iteration ΔT. As a generality, however, any particular DP mode begins relatively early in an iteration period ΔT and remains in effect until shortly after the following period ΔT begins. Thus, each DP mode exists for one iteration during most of the many time steps-shown for one ΔT in FIG. 3, and the computations which are to be carried out during any particular DP mode can take place during the odd-hundreds numbered columns within that iteration.

Under some conditions, different ones of the DP modes may be "skipped" by rapid advancement of the HD counter through two or more count states. In general, this may occur as a consequence of the gating control designated in those lines of Table III for which the last digit of the time step is "X." This means simply that the HD counter will be enabled or advanced, for example, during each of the successive time steps 0020 through 0029 if the other gating conditions associated with an "002x" time step designation are satisfied during each such time step. Since signals from the HD counter itself, designating the count state, are used in those gating conditions, it will be seen that in different circumstances the counter will advance from, say, state two to nine at the start of a given ΔT, remain in state nine until the next ΔT begins, and then continue its cotnrolled advance. The different possibilities, and the action in any given set of circumstances when certain combinations of control signals are present, will be evident from study of Table III. As a convenient summary, however, the following chart will make clear those conditions under which some DP modes are skipped and certain DP modes effected:

DP MODE SEQUENCE CHART

| Control Gating Signal Combination | DP Modes Effected for One ΔT |
|---|---|
| G40 | 12 |
| OM·G40 | 11, 12 |
| OM·IBA | 9, 10, 12 |
| FRDP·OM·IBA | 2, 9, 10, 12 |
| TANG·OM·IBA | 9, 10, 12 |

-Continued

DP MODE SEQUENCE CHART

| Control Gating<br>Signal Combination | DP Modes Effected for One ΔT |
|---|---|
| $\overline{JCX} \cdot \overline{ZVX} \cdot \overline{FRDP} \cdot \overline{TANG} \cdot OM \cdot \overline{IBA}$ | 2, 3, 4, 5, 6, 7, 8, 12 |
| $OM \cdot (ZVX + JCX)$ | 2, 3, 4, 5, 6, 7, 8, 9, 10, 12 |

The Various Types of Segment Transitions

Figure 6C:
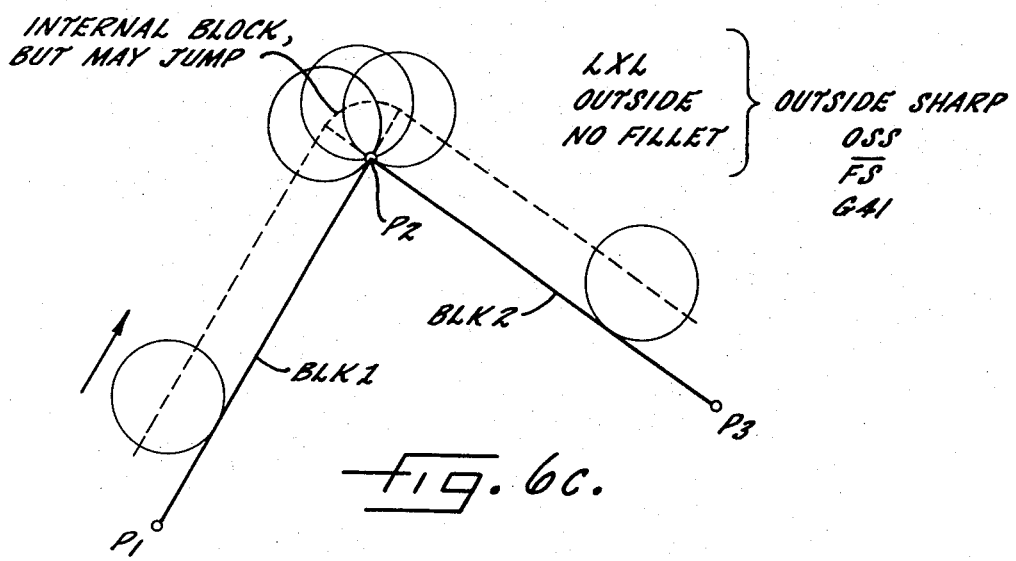
Figure 6D:
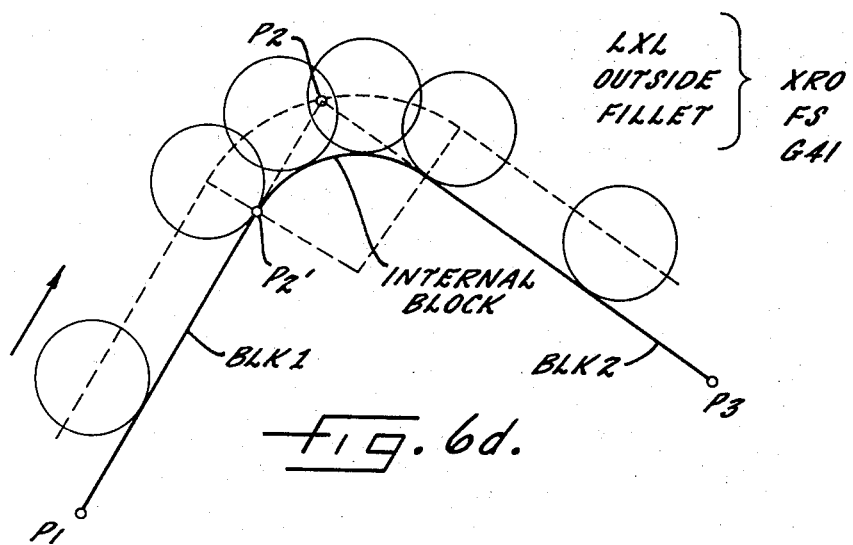

With the foregoing in mind as to the physical organization of the numerical control system, the computational sequences and data manipulation, transfer or responses produced in the present system can be made clear by reference to Tables IV through XIX. Before treating those Tables, however, it will be helpful to consider with reference to FIGS. 6a through 6m examples of the different kinds of transitions which may be made between two successive programmed path segments. As noted previously, any transition may be linear-to-linear, linear-to-circular, circular-to-linear or circular-to-circular. If the first block being executed from data in active storage is assumed to lie between points $P_1$ and $P_2$ and the next block or block 2 is assumed to lie between points $P_2$ and $P_3$ along the desired part edge contour or path, then it will be apparent that FIGS. 6a, b, c, d illustrate linear-to-linear transitions. Any such transition, however, may involve the cutter progressing around an "inside corner" or an "outside corner" in the desired part edge; and FIGS. 6a and 6b represent examples of the former while FIGS. 6c and 6d illustrate examples of the latter. But, in accordance with one feature of the present invention, any transition between two successive path segments may be bridged by a tangent fillet simply in response to the programming technician including in the block 2 data, and placing on the input record medium (punched tape), a desired fillet radius number. Thus, any particular transition between two successive paths may involve either the presence or the absence of a programmed fillet, the latter being here called "no fillet" even though the cutter radius itself may produce a fillet on an inside sharp transition. FIGS. 6a and 6c illustrate examples of inside and outside transitions with no fillet, while FIGS. 6b and 6d illustrate linear-to-linear inside and outside transitions with a tangent fillet joining the two linear path segments.

Figure 6E:
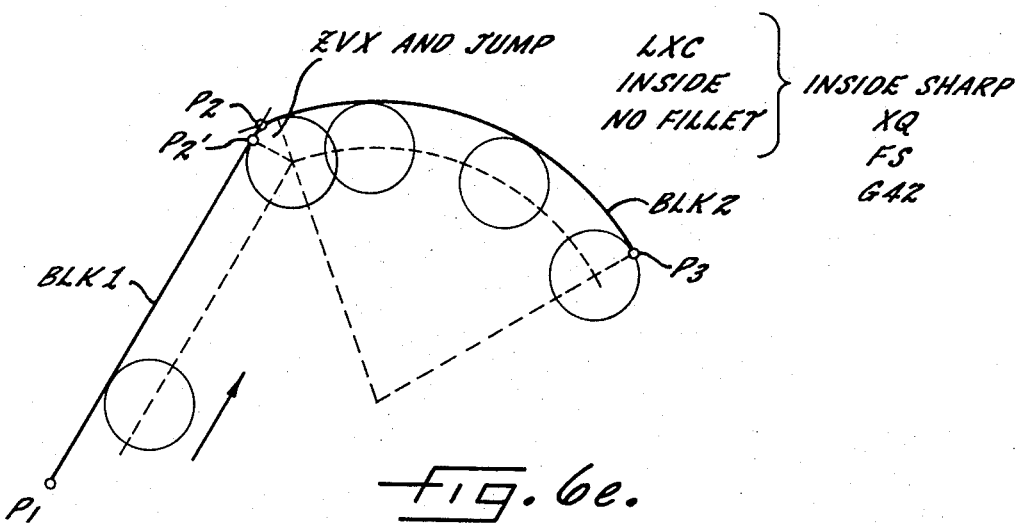
Figure 6F:
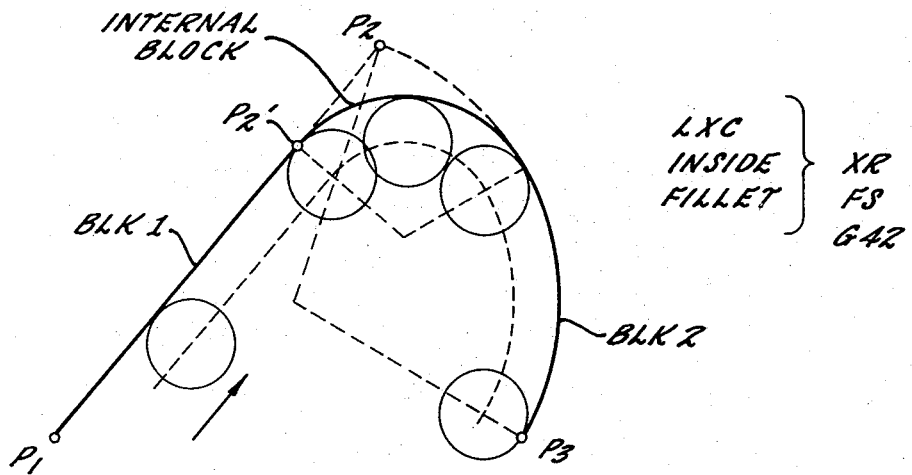
Figure 6G:
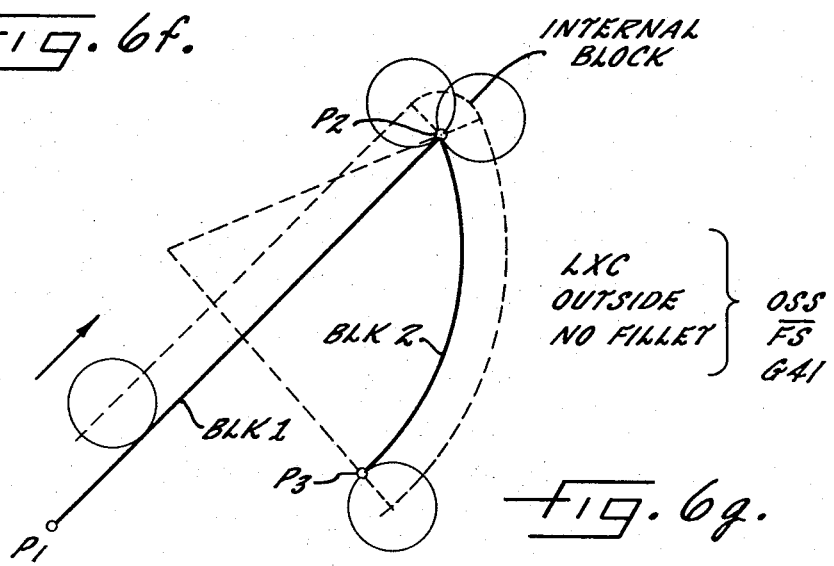
Figure 6H:
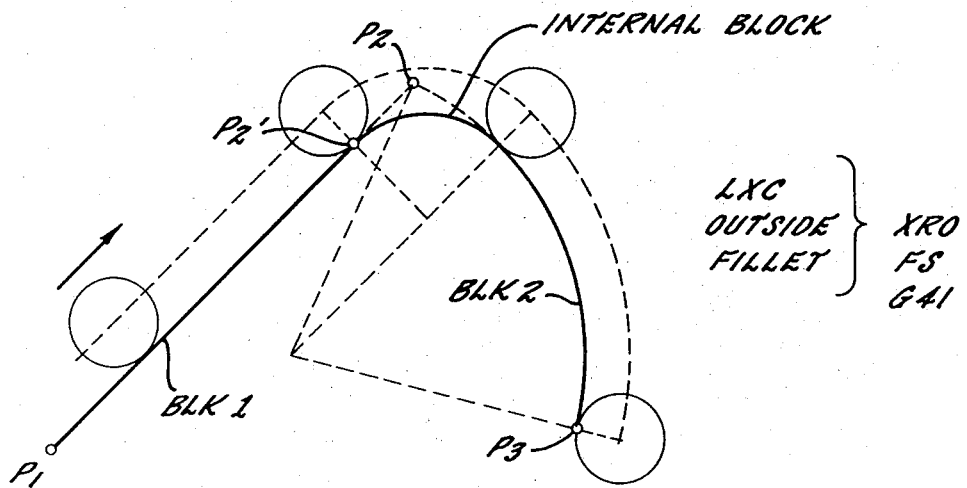
Figure 6I:
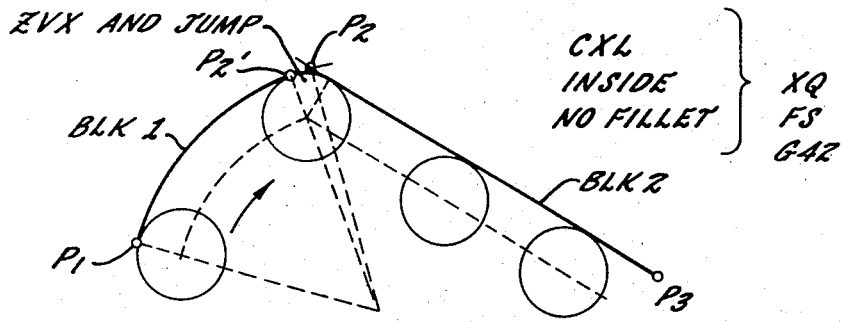
Figure 6J:
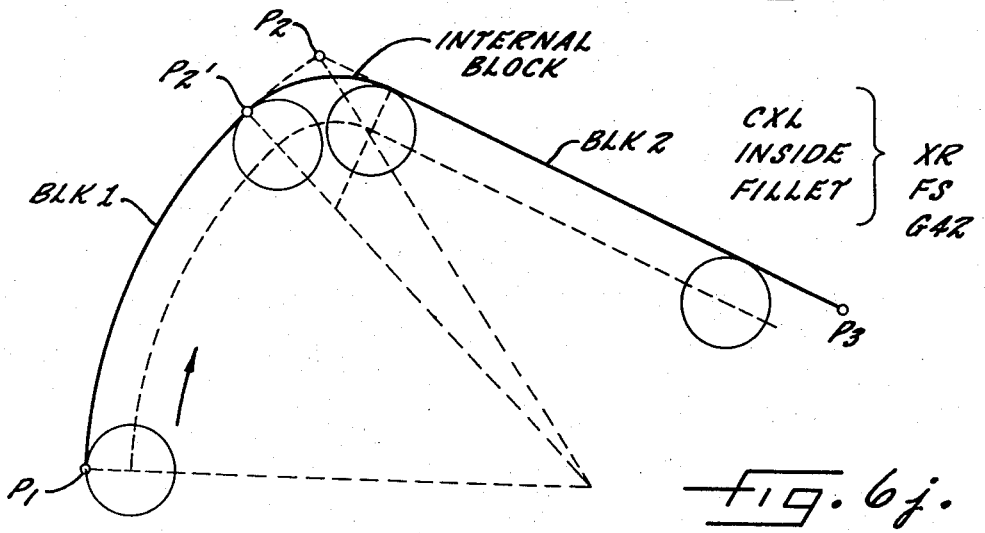
Figure 6K:
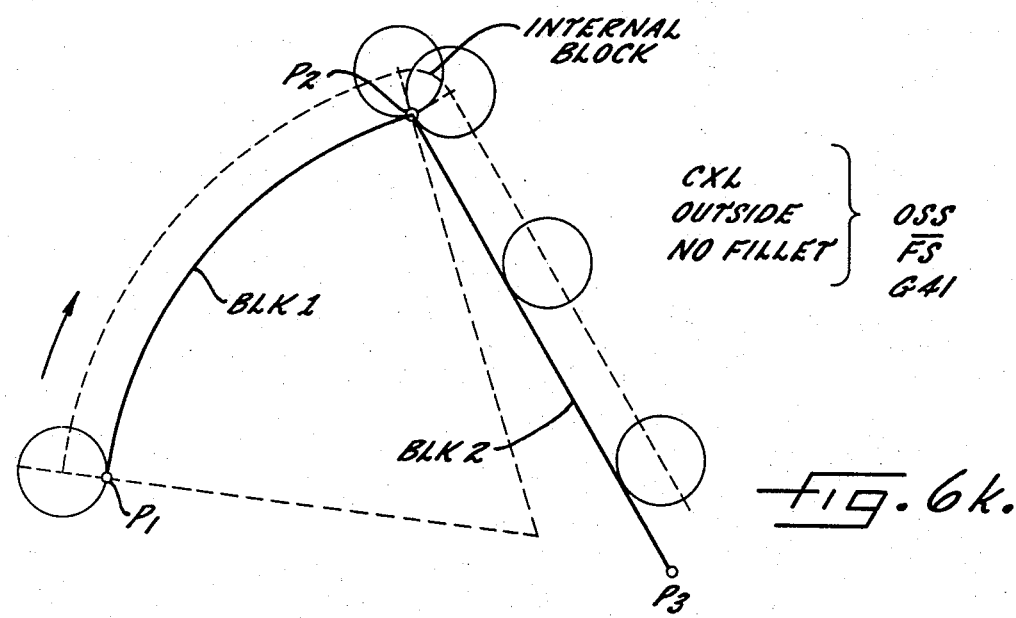
Figure 6L:
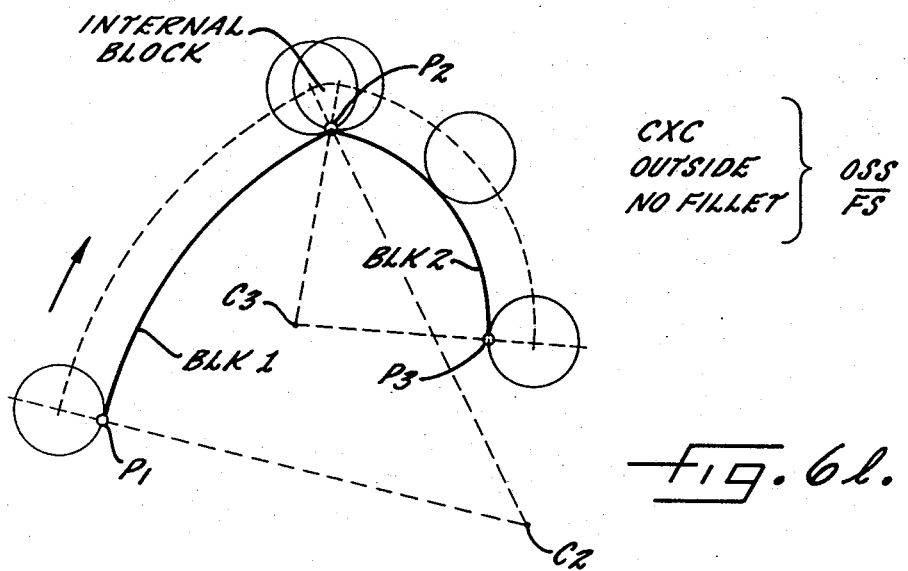
Figure 6M:
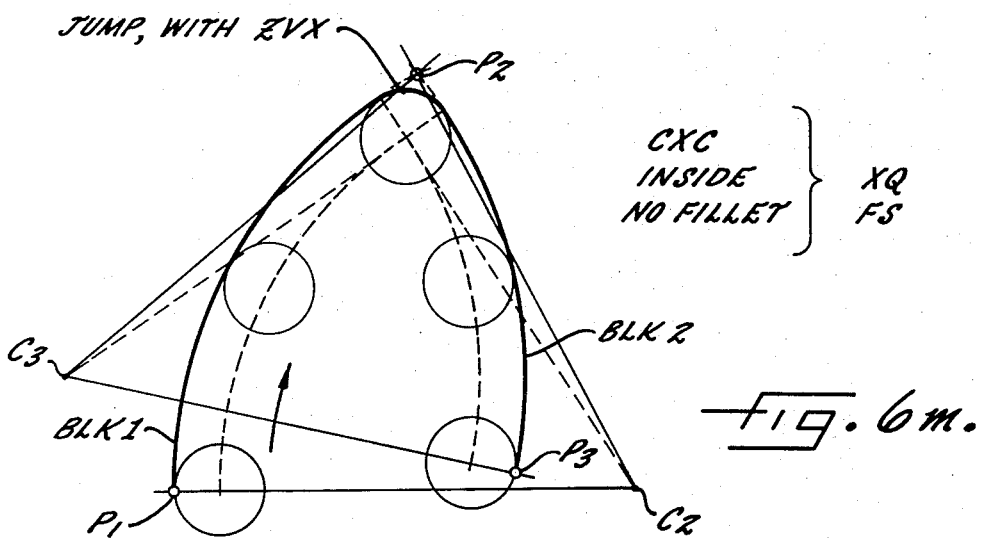

By analogy to the foregoing explanation of the linear-to-linear transitions, FIGS. 6e, f, g and h illustrate examples of linear-to-circular transitions, the first two being "inside" and respectively without and with a fillet, while the second two being outside and respectively without and with fillets. Similarly, FIGS. 6i, j, k illustrate examples of circular-to-linear transitions, the first being inside with no fillet, the second being inside with a fillet, and the third being outside with no fillet. The reader can visualize the fourth case, i.e., a circular-to-linear outside transition with a fillet. FIGS. 6l and 6m illustrate two types of circular-to-circular transitions, the first being outside with no fillet and the second being inside with no fillet. Again, the reader can visualize the circular-to-circular inside or outside transitions with fillets joining the two successive segments.

The "no fillet" cases may be designated as "sharp" corner transitions, i.e., FIGS. 6a, e, i and m illustrate "inside sharp" transitions and FIGS. 6c, g, k and l show "outside sharp" transitions. For "inside sharp" cases, however, the corner can be no sharper than the radius of the tool itself, and thus it is desirable as shown in FIG. 6a to terminate the block 1 tool motion at a point such that a tangent fillet is formed with a radius equal to the tool radius. Whereas in the normal execution of block 1 (FIG. 6a), the cutter would move to a location such that its periphery is tangent (and its radius to the point of contact is perpendicular) to the line $P_1$, $P_2$ at end point $P_2$, the actual movement of the cutter for block 1 must terminate when its point of tangency reaches an artificial end point $P_2'$. In other words, and in accordance with the invention, the block 1 path segment is "foreshortened" so that the cutter periphery will not overrun line $P_2$, $P_3$ of the desired block 2 segment, but on the contrary will reach a point of tangency with the block 2 path segment.

In all cases involving a fillet (because a fillet radius word is included as a numerical value in the programmed data for block 2), the block 1 movement of the cutter must be foreshortened to an end point $P_2'$ whose location is short of the end point defined by the normally programmed data for block 1, and whose location is determined from the programmed fillet radius number. Thus, in each of FIGS. 6a, b, d, e, f, h, i, j and m, foreshortening will take place in order to produce the desired smooth transition with a tangent fillet whose radius is either the programmed fillet radius value or equal to the radius of the cutter in use. Foreshortening of the block 2 path segment also occurs, and it is to be executed, for example in FIG. 6a, by moving the cutter under the control of block 2 data only from point $P_2''$ on the path to point $P_3$.

In cases involving a programmed fillet or in cases where the effective radius of the cutter must swing through an angle about the path corner (e.g., FIG. 6c) it is desirable automatically to create command data for, and to execute, an "internal block" which is not in any sense prepared by the programming technician or represented on the punched tape or other record medium which is sensed by the tape reader. It will be seen that FIGS. 6b, c, d, f, g, h, j and l involve internal blocks to make the cutter go "around the corner." The computation and execution of such an "internal block" of data will be explained more fully below. On the other hand, in certain instances involving an "inside sharp" transition or when an outside sharp corner involves a very small change in tool center position at the corner, the tool radius value can be made to "jump" from the point $P_2'$ to a point $P_2''$ in terms of numerical computations while the tool bodily remains stationary. This is illustrated in FIGS. 6a, e, i and m; and it is called a JCX or ZVX case, meaning that in computations involving the tool radius and the X and Y axis components thereof, there is a "jump corner transfer" or a "zero velocity transfer" which results in a jump.

When (as for example in FIGS. 6a, e or m), an inside corner transition requires a large angular change in the path, so that the X or the Y axis velocity of the cutter must abrupty change by a large amount (even though the path velocity would normally remain substantially constant), the acceleration or deceleration required along one of the axes may be larger than the X or Y axis servo drive can produce. In such situations, the transition is here designated as one requiring ZVX ("zero velocity transfer"). As hereinafter explained, the commanded path velocity or feed rate is in these circumstances gradually reduced to zero as the cutter approaches the foreshortened block 1 segment end point, and thereafter it is gradually accelerated from zero commanded path velocity up to the normally commanded path velocity as the cutter begins its motion along the block 2 segment.

Detailed Description of Operational Sequences

1. Introduction and Assumptions

With the foregoing as a general introduction, the physical operational sequences which occur in carrying out the present invention may next be explained with reference to Tables III through XIX. And from these Tables the actual physical construction of all the various PGA's for controlling the registers, flip-flops and computers will be made plain to those skilled in the art. However, it is desirable first to explain certain assumptions which are here made. It will be assumed that the command data for block 1, having been previously processed while in buffer storage, has just been transferred into the active registers so that it is being used to produce progressive changes in the digital servo command numbers XSC and YSC; and so that the cutter is initially moving along with its edge in tangent contact with the programmed block 1 path segment. It will also be assumed that the system is in the offset mode with OM = 1 due to the earlier receipt and presence of a G41 or G42 offset mode enabling signal.

Immediately after the block 1 data has been transferred into the active storage registers and the block 1 segment begins to be executed, the HD counter is advanced from its count state of nineteen to its reset or zero state. Thus, the decoder shown in FIG. 4 and which was previously producing a DP19 signal now produces a DP0 signal. As will be explained below, when a DP0 signal appears, the tape reader 10 in FIG. 1a is started near the end of the current $\Delta T$, so that the next block of data, here called block 2, is read line by line and the decoder 11 associated with the reader 10 produces signals which are thus stored in the tape data buffer registers which comprise the group collectively designated at 14.

When block 2 on the tape has been fully read, the reader is automatically stopped by the reader control logic 12, and this stopping is initiated (as set out in Case B) as a consequence of the tape reader producing an EL signal symbolizing end of block. The end of block signal in combination with the DP0 signal causes the HD counter in FIG. 4 to advance from its zero to its one state, and thus when the DP1 signal appears from the decoder 41, this indicates that a fresh set of data for a block 2 is ready for the buffer registers for analysis and computations which may be required prior to transfer to and use in the active registers of the system.

It will be recalled that the data read for block 2 may include those numerical values which are described in Case A, although the value Q which is described in Case A is not read from the punched tape but is derived by computations, as explained in Case B. Moreover, as indicated in List A, any block of data read from the punched tape may contain an R word which numerically designates the length of the radius for a programmed fillet to be formed between the block 1 and block 2 segments. And, as indicated in List A, any block of data may also include an H numerical word which is stored in a buffer register H, this being a value selected by the programming technician as the extra added envelope offset distance which is desired in order to make the cutter execute one or more roughing passes along the desired, programmed final workpiece contour; thereby making it possible for the same program tape to be used again with the H value being ignored the second time so that in the latter case the actually programmed part edge contour is produced. With the above-stated assumption that an R word contained in any block of data read from the punched tape designates the length of the radius for a programmed fillet, it is assumed that if block 2 defines a circular path segment, the starting radius from the center of the arc to the path will be represented on the punched tape by numerical values I and J for the X and Y axis components of the starting radius. Thus, if values of I and J are read into the buffer registers IB and JB from any given block of data which contains or is subject to a previously read G02 or G03 code, then the numbers stored in the I and J buffers IB and JB will be assumed to represent the X and Y axis components of the starting radius for a block 2 segment which is circular.

It will be recalled from Tables VII and VIII in Case A that the data in active storage is employed to create changeable numbers $\Delta X$ and $\Delta Y$ which represent the increments of motion which are to be produced along the X and Y axes during each iteration time period $\Delta T$. The servo command numbers XSC and YSC are changed by $\Delta X/\Delta T$ and $\Delta Y/\Delta T$ (indeed, by $.1\Delta X/.1\Delta T$ and $.1\Delta Y/.1 \Delta T$ for micromove updating) and represent progressively changing values of machine coordinates. The servo drive systems operate to keep the X and Y axis movable members dynamically tracking such that the tool center is kept substantially instantaneously in agreement with the coordinate numbers XSC and YSC (as well as XMP and YMP).

In the present case, however, additional incremental changes are added to the XSC and YSC numbers during each period $\Delta T$ to reflect the changing X and Y axis components of a tool radius Q which is always perpendicular to the programmed part edge path. Referring for the moment to FIG. 7, it will be seen that when the cutter tangency point is at the coordinate point XCEP', YCEP' on the part path, the cutter radius Q lies at an angle such that the cutter center lies displaced from the path by an X axis distance QXE and a Y axis distance QYE. These are the then existing X and Y axis components QX and QY of the cutter radius Q. As the cutter moves progressively to the next position illustrated in FIG. 7, the component values of the radius Q are progressively changed (by a circular interpolation process detailed in Table XVI to be treated below) because incremental values QX$\Delta$ and QY$\Delta$ are successively and algebraically added thereto. This means that the tool center (as illustrated in its second position in FIG. 7) must be progressively disposed at coordinate locations which are XCP + QX and YCP + QY when the cutter is contacting the workpiece path at part coordinate points XCP, YCP. By performing during each $\Delta T$ the additions of $XSC_{new} = XSC + \Delta X + QX$ and $YSC_{new} = YSC + \Delta Y + QY$ to carry out a separate circular interpolation process for the tool radius, the servo command numbers XSC and YSC are always kept at values which make the X and Y axis servo drives properly move the cutter center along the cutter center path CCP which is "envelope offset" from the programmed part edge path by the perpendicular distance Q.

As noted above, the distance Q is not taken into account by the technician who prepares a program data tape in the first instance; but on the contrary, the value of the tool radius Q is dialed in by the machine operator on the digit switches 26 (FIG. 1a), and thus any value corresponding to the actual radius of the tool in use will be effective to offset the cutter center path CCP properly from the programmed part edge path.

In tables of form like that for Table IV, the "shorthand language" is like that briefly described above for Table III. That is, the timing step number required to enable a given PGA is designated in the left or first column, the other logic control signals required to enable that particular PGA on that time step are shown in the second column, and the result produced by the enabled PGA is shown immediately to the right of the center line. At the right portion of the table, explanatory notes appear. Thus, merely as an example which will enable one skilled in the art to independently read and understand the tables of the present application, it may be noted with reference to Table IV that the operation designated at the first line can occur only when the program step generator is signaling time step 0102. This means that the timing signal generator at its output terminals in FIG. 2 is signaling the number 0120, and that the timing signal generator is operating in the lower half of the first column of FIG. 3, i.e., in what is designated as the 0100 column. The qualifying signal designated in the first line of Table IV is DP2, and this means simply that the program gating array which is represented by that line must receive a logic 1 level voltage from the DP2 output terminal of the decoder shown in FIG. 4, as well as 1 signal from the 0, 1, 2, 0 lines in the thousands, hundreds, tens and units groups of timing generator output lines (FIG. 2). If these conditions are met, then the result produced by that PGA is the transmission of a control signal CAR to the computer 20 which "clears the answer register." Simultaneously, another PGA associated with the flip-flop CCA supplies a clearing or resetting signal to that flip-flop under the same step and qualifying DP2 conditions. Likewise, the symbols CCCC in line one of Table IV designates "clear flip-flop CCC" and this action will be produced by another PGA associated with that flip-flop and fully enabled on time step 0120 if the DP2 signal then exists. With the understanding that the dots and plus symbols employed in Table IV and similar tables stand for "AND" and "OR" Boolean notations, those skilled in the art will easily be able to understand the sequence of operations which are designated in Tables IV through XV.

2. The Example of FIG. 7; Sequential Operations

To more fully explain exactly how sequences of operations are effected and their physical significance and results, the sequences of operations will be here described, beginning with the above-stated assumption that the block 1 data has just been transferred to active storage, the block 2 data has just been read from the punched program table and resides in buffer storage. It should be mentioned, and will later be confirmed, that when the block 1 data was transferred to active storage, certain registers were set to hold numbers pertinent to the block 1 segment. The THETA$a$ register holds a number representing the exiting path angle $\theta_a$ (see FIG. 7) for block 1; the register SPRA holds the block 1 segment RA (see FIG. 7) or radius RA length if that block is circular or linear; registers SPIE or SPJE hold the numbers IE or JE which are linear path segment components (see FIG. 7) or the ending radius components for a linear or circular block 1; the register SPQ holds the effective tool radius; the registers QXE and QYE hold the Q components as they will exist at the end of the block 1 segment (i.e., when and if the cutter tangent point reaches the segment end point XCEP, YCEP); and the registers QXB, QYB presently hold those same numbers. The active registers QX, QY, QX$\Delta$, QY$\Delta$ hold numbers necessary for execution of the block 1 segment, as will become clear below; and for a linear block 1, the QX and QY register numbers are the same as the QXE, QYE numbers because the tool radius components do not change as a linear segment is executed.

With this, the example illustrated in FIG. 7 will be described, this being a linear-to-linear transition for an outside corner with a programmed fillet. It will be assumed that the "offset mode" has been established by the reading of a G41 code from a previous block on the punched tape, thereby designating that the envelope offset mode is in effect with the tool located on the left side of the part edge path as shown in FIG. 7.

After the block 2 data has been read into buffer registers from the tape reader, when the time step generator reaches 0020 during the next period $\Delta T$, the HD counter 39 in FIG. 4 will be advanced to its two state as a result of the gating action indicated at line one of Table III. Therefore, at step 0020, the signal DP2 will appear and will remain in existence for the current period $\Delta T$.

A. DP2 Mode (Table IV)

With this, it will be seen from the first line in Table IV that on the later time step 0120, the computer answer register is cleared, and the flip-flops CCA and CCC are both cleared (i.e., reset). On step 0121 if the new data R flip-flop has been set, and this is so in the FIG. 7 example because a connecting fillet has been programmed and an R word value has been read into the R register, the flip-flop CCA is set, and the signal CCA thus appears to indicate that the newly read block 2 includes a programmed fillet.

On the same time step, another pulse gate array enables the flip-flop CCC during the DP2 mode if the signals NBC simultaneously exists with either NDI or NDJ. Since in the example of FIG. 7, block 2 is linear, the "next block circular" signal NBC will be absent, and thus the flip-flop CCC is left in its reset state.

At steps 0126 and 0127, the value of zero then existing in the answer register is written into the registers SPR and SPRF. The symbol W/SPR means simply "write" the number then appearing on the output trunk COT into the register SPR. In this fashion, both of the registers SPR and SPRF are initially set to zero.

On step 0130, the computer is cleared, and the number XEP, stored in the buffer register XEP (designating the X coordinate for the end point of block 2) is read into the computer. On step 0131, if the new data X signal NDX exits (as it will because a new value of X has been read with the block 2 data), the number XEP then in the computer answer register will be written into the SPX register. On that same time step, the computer is cleared and the YEP number is read, so that on time step 0132 the latter number is written into the register SPY. Thus, the operations indicated for time steps 0130 through 0132 merely result in transfer of block 2 end coordinate numbers into the SPX and SPY registers. It will similarly be apparent that on time steps 0132 through 0134 any newly read values of I and J numbers for block 2 are read from the buffer registers IB and JB, and transferred into registers SPI and SPJ. On time stpe 0134, in addition, the newly read number R is read into the cleared computer. On time step 035, the radius fillet number R is then written from the computer answer register into the SPRF register, but only if the CCA signal exists to indicate that block 2 data included a programmed fillet. The answer register is cleared. Then on time step 0136, the new data R flip-flop is cleared or reset if the signal CCA exists.

On time steps 0138 through 0139, the G path mode code number for block 2 is read from program gates supplying the fixed numerical values of 01, 02 or 03 depending upon the presence of the G01 or G02 or G03 numbers from the G decoder. The result is written into a G register MG on step 0139 so that it can be preserved and utilized later. It is this register which holds the signal G01, G02 or G03 for block 2 from this point forward. In the example of FIG. 7, the MG register will thus be set to hold the number G01 since block 2 is a linear block.

On time steps 0730 and 0731 the numbers from SPX and SPXE are read (the latter with a subtract control signal sx) into the computer, and on time step 0732, the difference XEP − XCEP = I is written into the SPI register. Since (as hereinafter explained) the SPXE register at this time holds the X coordinate for the programmed end point of block 1, the SPI register is thus conditioned to hold a number representing the X component distance I shown in FIG. 7 for block 2. Similarly, on time steps 0732 through 0734, the block 2 and the block 1 end point Y coordinates are read subtractively, and the result is written into the SPJ register which then contains a number representing the Y component distance J for block 2 as labeled in FIG. 7. These latter operations occur only if $\overline{NBC}$, i.e., block 2 is linear, since if block 2 is circular, I and J numbers will have been read from the punched tape and stored in SPI and SPJ at steps 0133 and 0134.

In the 0700 column of the DP2 mode, a square root sub-routine for the computer is "turned on" or enabled by setting a control flip-flop SQS. Whenever the SQS signal exists in any "hundreds" time column, the computer is operative through a sequence of steps to accept first and second input numbers fed in on the trunk CIT during steps xx80 and xx82 (for FIG. 7, these numbers are I and J from SPI and SPJ) of that hundreds time column, and to process such input numbers so as to signal the square root of the sum of squares of such numbers in the answer register at a later time period, here designated 1594. The details of "square root of the sum of the squares" sub-routines are well known to those skilled in the computer art, and thus for the sake of brevity they are omitted from the present tables. It will be seen, however, that on step 1594 when the result of be routine appears in the answer register, it is written during the DP2 mode into the register SPR. In the case of a linear block 2, the register R is thus set to numerically represent the programmed path segment length R (sometimes called D in a linear case) which is so labeled in FIG. 7. Also, on that same time step, if the NBC signal exists because block 2 is circular, the same number is written into the R register, the new data R flip-flop is enabled, and the SQS flip-flop is cleared. While this does not occur in the example of FIG. 7 because block 2 is linear, in those instances when block 2 is circular, the register R will hold a number representing the length of the starting radius for block 2.

The registers SPI and SPJ now hold the X and Y components for the block 2 path segment shown in FIG. 7, and their ratio J/I is the tangent of the angle $\theta$ which that path segment makes with the horizontal or X axis. For a purpose to become apparent below, it is desirable to obtain a numerical value for the angle $\theta$, which is the angle for entering the programmed block 2 segment. Because a numerical value expressed in radians for the angle $\theta$ will ultimately be derived by an arctan computer sub-routine which operates only over a 45° range, it is desirable first to classify the particular half quadrant in which the angle $\theta$ lies.

Referring momentarily to FIG. 5, the various half quadrant codes are there shown. Any vector which lies at an angle relative to the X+ axis is assigned a particular code designation, and as indicated, that code is 0 through 7 if the vector lies at successive multiples of 45°. On the other hand, if the vector lies in the 0° to 45° quadrant, it is assigned a code of 0; if it lies in the second half quadrant, it is assigned a code of −2; if it lies in the third or fourth half quadrants, it is assigned codes of +2 or −4; if it lies in the fifth or sixth half quadrant it is assigned a code of +4 or −6; and if it lies ahead in the seventh or eighth half quadrants, it is assigned a code of +6 or −8.

In Table IV at step 17xx through 1771, a half quadrant determination sub-routine is detailed which has as its purpose the ultimate writing of the applicable half quadrant code for the angle at which R lies into a half quadrant code register designated HQ. To initiate this half quadrant sub-routine, a half quadrant flip-flop HQC is enabled when the 1700 column begins during the DP2 mode, and so long as that flip-flop produces a signal HQC, certain operational steps are performed during the individual time steps within that particular hundreds column. Thus, on time step 1760, the computer flip-flops FFZ, FFJ, FFC and FFD are all cleared. The zero value which appears in the answer register is written into the HQ register on time step 1761, and thereafter on time step 1762 and 1763 the I component is read from register SPI and transferred to Scratch Pad register SP1. On time step 1764 if the I component is negative in sign, and the signal AOTM exists, the flip-flop FFC is enabled, and the answer register cleared. In like fashion, on time steps 1764 and 1765 the J component number is transferred into Scratch Pad register SP2, the number 0 is read as a second input to the computer along with a classification control signal cx so that the signal AEB will appear if J is zero. On the time step 1766, the flip-flop FFZ is enabled if the J component is zero, and on the same time step the number 4 is read into the computer if FFC is set (meaning I is negative) and J is zero. This value of four is written into the HQ register on time step xx67 if it had been read under the conditions of time step 1766. If the angle $\theta$ is 180°, therefore, the HQ register is set to hold the code to four.

On the other hand, the value of J is read from SP2 into the computer on time step 1767 and on step 1768 the flip-flop FFD is set if J is negative. On steps 1768 and 1769, the value of I from SP1 is classified against zero, and in the event that I is zero so that the signal AEB appears, the numerical value of 2 is read into the cleared accumulator on step 1770. On the other hand, if I is zero and J is negative the value of four is read into the accumulator; or if I is not zero, J is positive and I is negative, the value of 2 is read into the accumulator. On the same step 1770 if I is not zero, J is negative and I is negative, the value of 4 is read into the accumulator; and if I is not zero, J is negative and I is positive, then the value of 6 is read into the accumulator. On step 1771, therefore, if the value of 4 has not previously been read into the accumulator because the $\overline{FFZ}$ signal exists, the particular value which is read into the accumulator is written into the HQ register. Thus it will be seen that the HQ register now holds the number 2, 4 or 6 if the angle $\theta$ which is being classified respectively lies (i) at 90° or in the second quadrant (FIG. 5), (ii) in the third quadrant or at 180°, or (iii) at 270° or in the fourth quadrant. On time step 1771, the value of I is placed in the accumulator and on time step 72 the flip-flop FFZ is set (if it was not previously set) if the signal AEB exists to indicate that J is zero. Thus, if flip-flop FFZ is now set, either I or J is zero. On time step 1772, I is classified against J from SP2 and the number then in the HQ register is read into the cleared computer. On time step 1773, the flip-flop FFJ is set if I is less than J, but on time step 1774 the number 1 is read into the computer and the flip-flop FFZ is enabled if I and J are equal. Thus, if I and J are equal, a value of 1 is added to the previous value in the HQ register and the sum is written back into the HQ register on step 1775. The HQ register now holds a number of 0, 1, 2, 3, 4, 5, 6 or 7.

On step 1777, the control signal BR72 exists if the conductor for the seventh decimal place and the two bit of the 1, 2, 4, 8 binary decimal code is at a logic 1 level. Thus, this signal will exist if the number in the HQ and BR registers is either 2, 3, 6 or 7; and in this event, a value of −2 will be read into the adder if I is greater than J. Likewise, the number −2 is read into the accumulator if the HQ register then holds 0, 1, 4 or 5, but I is less than J. On time step 1778, the number in the accumulator is brought in and added with like sign addition to the previously inserted value of −2, and the result is written on time step 1779 into the HQ register. The HQ register will, therefore, hold the value which it contained on time step 1775, or a negative number which is equal numerically to the sum of that value and the number 2. From inspection of FIG. 5 it will become apparent, therefore, that the HQ register now holds the proper code classification number which indicates the half quadrant or the 45° line at which the angle $\theta$ in FIG. 7 lies, this being the angle of the block 2 path segment. On time step 1779, the computer is cleared and the flip-flop HQC is reset to make the system exit from the half quadrant sub-routine. In the example of FIG. 7, the HQ register now holds −8.

The computer is next caused to divide one number by another in order to produce a quotient, and this is carried out by a division sub-routine, the details of which are omitted from Table IV for the sake of brevity. It will suffice to note here that a division routine may be initiated by enabling a flip-flop DVA which thereafter produces a control signal to cause the division steps to be carried out. This enabling of the division routine may take place at the beginning of a 1700 column, and the numerator read in on time step 80 of that column with the denominator being read in on time step 84 of that column. The result is obtained in characteristic plus mantissa form, with the mantissa being signaled at the output of the computer on a subsequent time step 1992 and the characteristic being signaled at the output of the computer on step 1993. Thus in Table IV on time step 1780 either the value of I or J will be read in depending upon which is the smaller of the two (J is larger if FFJ is set), and this will become the numerator for the division operation; and on time step 1784 the larger of I or J will be read in as the denominator. The quotient as a number less than 1.0 will thus be written into Scratch Pad registers SP7 and SP8 on time steps 1992 and 1993 so that those registers hold respectively the mantissa and the characteristic of the quotient. This quotient, of course, represents the tangent of the smaller of the two angles $\alpha$ or 90° − $\alpha$, where tan $\alpha$ = J/I.

The operations which are to be performed in the DP2 mode, have thus been completed, and no further operations occur until the next iteration period $\Delta T$ begins. Because the HD counter is now in the two state, the enabling logic circuits represented in Table III as OM $\overline{IBA}\cdot\overline{FRDP}\cdot TANG\cdot HDB\cdot\overline{HD10}$ will result in a pulse being entered into the HD counter on time step 0020, so that the counter advances to state three, and the DP3 signal appears from the decoder 41 of FIG. 4. Thus, the system is placed in its DP3 mode, and the operations which are set out in Table V will be carried out during the remaining time steps of that particular $\Delta T$.

B. DP3 Mode (Table V)

Referring to Table V, the appearance of a DP3 signal results in the setting of an "arctan" flip-flop ATAN thereby to enable control elements (not shown) to put the computer through what is called an arctan sub-routine during which the numerical value of the tangent of an angle, in characteristic plus mantissa form, is read into the computer, and the numerical value of the angle itself later appears in the answer register. Since the details of an arctan sub-routine are known to those skilled in the art, they are not shown in Table V, but the steps 0192 through 0399 set out at the top of Table V simply designate that the arctan routine is performed. More specifically, with the ATAN flip-flop set, the number appearing SP8 and SP7 are read into the computer on time steps 0192 and 0193, these numbers being the mantissa and the characteristic of the tangent of the angle previously computed during the DP2 mode. The control of the computer operates to perform the computation of a convergent power series formula which is set out in Table V where $m$ is the tangent of the angle being treated, and the value of that convergent series appears in the accumulator just prior to step 0399. On the latter step, the result is written into register SP33 so that the latter holds a numerical value of the angle expressed in radians, and the ATAN flip-flop is cleared.

During steps 1300 through 1329 as shown in Table V, another sub-routine called "develop angle" is performed for the purpose of converting the numerical value of the angle $m$ then held in SP33 to a value between 0 and $2\pi$, inasmuch as the value in SP33 will lie between 0 and $\pi/4$. Specifically, the "develop angle" sub-routine begins with column 1300 by the setting of a flip-flop DANG when the DP3 signal exists. Then, as shown in Table V, on step 1320 with the DANG signal present, the computer is cleared, the code previously stored in half quadrant register HQ is read thereinto, and the flip-flop FFC is cleared. On step 1321, the HQ code number is written into the B register of the computer, and the flip-flop FFC is set if the HQ code number is negative. On steps 1323 through 1327 one of four possible numerical constants is read into the computer. More specifically, on step 1323 which is qualified by BR78 if the HQ stored code is −8, the numerical constant $2\pi$ will be read into the computer. On the other hand, on step 1324, if the four bit line in the seventh decimal digit place of the BR register is at logic 1 level, this means that the stored HQ number has a value of either plus or minus 4, 5, 6 or 7; and in this event, the numerical constant $\pi$ is read into the accumulator. On step 1325, if the two bit line of the seventh decimal place in the BR register is at logic 1 level, this means that the HQ number is then either 2, 3, 6 or 7; and in that event, the value of $\pi/2$ is read into the computer. Finally, on step 1327, if the one bit output terminal of the seventh decimal place of the BR register is at a logic 1 level, this means that the HQ number is then either 1, 3, 5 or 7; and in that event, the value of $\pi/4$ is read into the computer.

On step 1328, the numerical value of angle $m$ stored in Scratch Pad 33 is read into the computer as a positive number but only if the $\overline{FFZ}$ signal exists, indicating that $\tan^{-1} J/I$ is not a multiple of 45° because neither I nor J is zero and I is not equal to J. On the other hand, on that same time step, if the FFC signal exists, meaning that the stored HQ number is negative, the numerical value of $m$ is read into the computer subtractively. On step 1329 the overall results appears in the answer register and is written into Scratch Pad 21 and the DANG flip-flop is cleared. The reader will be abel to confirm that SP21 thus holds the numerical value for an angle which is restricted to lie between zero and $2\pi$ radians. This is the result of the "develop angle" routine and the value held in SP21 is the number in radians for $\tan^{-1} J/I$, i.e., the angle which the resultant vector of the I and J components makes with the X axis.

During steps 1329 through 1331, the angle of the vector which is represented by R or D in FIG. 7, and whose axis components are I and J, is rotated (by adding or subtracting $\pi/2$)90° if the next block is circular, so that angle (which is the angle of the starting radius) properly represents the entry angle for block 2. In the example of FIG. 7, this does not take place, but it may be noted in Table V that on step 1329 if the NBC signal exists, the numerical constant $\pi/2$ is read into the computer where it is normally added to the numerical value of $\theta$ then existing in the accumuator, but it is subtracted if the next block is circular and clockwise, i.e., if GO2·NBC. On step 1330, the flip-flop FFC is cleared, and on step 1331 the numerical value of the entering angle $\theta$, proper for either the situation where block 2 is linear or circular, is written into the $\theta$ register. If $\theta$ is negative so that the ATOM signal exists, the flip-flop FFC is set.

The objective now is to express $\theta$ as a number which is greater than 0 but less than $2\pi$, and this is accomplished on steps 1334 through 1336 by reading into the computer the numerical constant $2\pi$ along with a classification signal $cx$. On step 1335, the value of $2\pi$ is read additively or subtractively into the computer under the respective conditions of $\theta$ being negative (because FFC is set) or $\theta$ being greater than $2\pi$ (because the ALB signal exists). Thus, if $\theta$ is negative or greater than $2\pi$, the value $2\pi$ is respectively added or subtracted, and the resultant value is written as a number in the THETA register on step 1336, so that the latter register holds a numerical value of the block 2 entering angle $\theta$ between 0 and $2\pi$.

In review, and with reference to FIG. 7, the operations thus far have resulted in the storage of the block 2 end point coordinate values XEP, YEP in the reigsters SPX and SPY; the computation and storage of the block 2 components I and J in the registers SPI and SPJ; the computation and storage of the entering path angle $\theta$ for block 2 in THETA.

On step 1336, the computer is cleared and the numerical value of $\theta_a$ is read into the computer from the THETA$_a$ register and with a positive sign regardless of the sign of the number stored in the $\theta_a$ register. The THETA$_a$ register at this point in time holds the exiting angle of the path for the previous block 1, as clearly labeled in FIG. 7. On step 1337, the value of $\theta$ is read into the computer with an unlike sign addition control signal (FUL), so that the difference $\theta_a - \theta$ appears in the accumulator. On step 1338 this difference $\theta_a - \theta$ is classified against the constant $\pi$ and at 1339 the value of $2\pi$ is subtracted (unlike sign addition) from $\theta - \theta_a$ if the latter quantity is equal to or greater than $\pi$ radians. Thus, the accumulator now holds a number which is equal to $\theta_a - \theta$ as an angle between zero and $\pi$ radians; and on steps 1340 and 1341, the flip-flop FFC is cleared and this angular value is written into the 2BETA register. The angle 2BETA as labeled in FIG. 7 is simply the path transition angle between the two successive programmed path segments. It is to be noted that on step 1341, the flip-flop FFC is set if the 2BETA number is negative. It will be positive or negative when the angle of transition in progressing from the block 1 to the block 2 segment is one which involves a clockwise or a counterclockwise rotation, and in FIG. 7, it is positive.

On step 1342 the computer is cleared and the value of Q is read from the SPQ register. On step 1343, flip-flops FFE, FFB and CCD are cleared, and one of two possible numbers is read into the computer along with a classification signal $cx$. If the $\overline{CCA}$ signal exists, the SPR register is read, and if the CCA signal exists, the SPRF register is read. Thus, the tool radius Q is classified against either the block 2 circular radius if no fillet is programmed, or the fillet radius if a fillet is programmed.

On step 1344, the flip-flop FFE is set in response to G41·FFC or G42·$\overline{FFC}$; and this means that the FFE signal will thereafter exist if (a) the angle 2BETA is negative (FFC) and the cutter is on the left of the path (G41), or (b) the angle 2BETA is positive ($\overline{FFC}$) and the cutter is moving along the right of the part path (G42). Thus, by this combination of control signals, the FFE signal will exist only if the transition is one involving an inside corner. The $\overline{FFE}$ signal means there is an outside corner.

On step 1345, the flip-flop FFD is set if a fillet has been programmed (i.e., the CCA signal exists), and if the FFE signal exists (an inside corner) and if the $\overline{ALB}$ signal exists to indicate that the cutter radius is greater than the programmed fillet radius. In significance, this means that the flip-flop FFD is set at this time if the path transition involves an inside corner and the tool radius is greater than the fillet radius.

On the other hand, both the flip-flops CCD and FFD are set during steps 1345 only if no fillet has been programmed ($\overline{CCA}$), block 2 is circular (G02 or G03) the starting block 2 radius is not greater than the tool radius ($\overline{ALB}$), and if the corner transition is one which involves an inside corner (G41·G03 or G42·G02). Therefore, if the programmed block 2 circular arc is smaller in radius than the tool for an inside transition, both the flip-flops CCB and FFD are set to signal that block 2 cannot be properly executed and should be replaced simply by a "sharp" corner which will leave a fillet which is equal in radius to the tool radius.

These last two opertions result in the signaling of the fact that the cutter radius is larger than (a) a programmed fillet, or (b) the block 2 circular arc radius. In the first case, FFD alone is set; in the second case both FFD and CCB are set. Corrective action is taken to recompute the data so as to replace the programmed fillet radius with a "sharp" transition, or to simply omit the programmed block 2 and let the cutter form a fillet junction between block 2 and block 3, as next described.

On steps 1346 and 1347, the accumulator is cleared and the zero value therein is written into the R register if the FFD signal exists. Thus, the R register is cleared to hold zero by writing zero therein if the programmed fillet radius is less than the tool radius (FFD). Then, on step 1351 if only the FFD signal (not CCB) exists, the HD counter is cleared by a CHD signal (the DP3 Mode ends), and on step 1352, a pulse is entered (by EHD) into that counter, so DP1 begins and the sequence of data processing modes will be started over with block 2 treated as if it contained no programmed fillet. See Table IV and note that CCA is not set (because NDR is reset) when the DP2 Mode is repeated.

On the other hand, if the cutter radius is larger than the block 2 radius (So FFD·CCB), register R is cleared to zero, the NDR, NDI and NDJ flip-flops are cleared, and the IB, JB registers have zero written therein (steps 1346–1348). On step 1349, the numerical constant of 1 is written into the computer, and on step 1350 this value is in effect "written" into the G Buffer storage as a result of the "enable G store" EGST signal if the CCB signal exists to indicate that block 2 is circular but with a programmed radius less than the tool radius. In other words, the originally effective G02 or G03 code for block 2 is changed to a linear G01 code. This converts block 1 to a linear block, and its end point (stored in XEP, YEP and SPX, SPY registers) can be reprocessed as if the block 2 segment were a linear line drawn from block 1 end point XCEP, YCEP to the end point XEP, YEP. For this purpose, on step HD 1351 the HD counter is cleared to zero and on step 1352 it is advanced to state one, so that the DP3 Mode ends, Mode DP1 begins and Mode DP2 immediately follows. All of the sequences discussed above are repeated, therefore, except that block 2 is treated as a linear block with no programmed fillet. The I and J components of this linear block are computed anew and stored in SPI, SPJ at DP2, steps 0730 through 0734, the linear segment length is stored in SPR at step 1594.

By this sequence of steps from 1342 through 1352, the control system is caused to reject a programmed fillet or a programmed circular block 2 if the fillet radius or the circular arc radius is less than the tool radius then represented by the number in the SPQ register. It may be observed that this rejection may occur first because a programmed fillet in block 2 is less than the tool radius, and may then occur a second time if block 2 is circular and calls for an arc radius less than the tool radius. Thus, an impossible transition with a desired fillet is converted into a "sharp" corner; and a block 2 circular arc witn an impossibly small radius is simply converted into a linear block.

On step 1351, the several designated flip-flops are simply cleared. During steps 1352 through 1364 in Table V, operations are performed to produce signals which correctly identify the nature of the transition which is defined by the programmed block 1 and block 2 data, one of the several possibilities shown and described with reference to FIGS. 6a–m therefore being identified. It will be recalled that the flip-flop FFE was enabled on step 1344 only if the transition is one which involves an inside corner; and it will similarly be recalled from step 0121 in the DP2 Mode (Table IV) that the flip-flop CCA was set only if a fillet has been programmed. On step 1352, therefore, one of the four flip-flops XQ, OSS, YR, XRO will be set according to the following classification:

Inside corner with no fillet: Set XQ to designate inside sharp

Outside corner with fillet: Set OSS to designate outside sharp

Inside corner with fillet: Set XR to designate inside fillet

Outside corner with fillet: Set XRO to designate outside fillet

From a review of FIGS. 6a–m it will be apparent that the particular one of these four flip-flops which is set properly identifies the nature of the transition which is defined by the block 1 and block 2 data, the key to this residing in the fact that the flip-flop FFE is either set or left cleared at step 1344 by a combination of logic control signals which indicate that the transition is or is not an inside corner. And an inside corner is detected if the transitional angle 2BETA is negative with the cutter on the left of the path or if the transitional angle 2BETA is positive with the cutter on the right of the path.

On step 1353, the flip-flop FS is enabled to designate that foreshortening is required if any of the signals XRO, XR or XQ exists. Again, from a review of FIGS. 6a–m, it will be apparent that the flip-flop FS is set because foreshortening is required in any type of corner transition excepting an outside sharp, i.e., an outside corner without a fillet as represented in FIGS. 6c, 6k, 6g, and 6l. Thus, the control signal FS may be used to create certain computational sequences later if foreshortening is required.

On step 1354 in Table V, the flip-flop TANG is set if the segment transition involves two tangent segments. This is done in response to the simultaneous existence of signals $\overline{FS}$ and $\overline{OSS}$. And, in the event that the tangent situation exists, then the execution of an internal block or a "jump transfer" is unnecessary, and the subsequent data processing modes may be skipped up to DP9. By reference to Table III and Chart A, it will be seen that when the tangent case exists and the TANG signal appears at step 1354 in Mode DP3, then when the DP3 Mode is completed, the HD counter is advanced rapidly beginning during the next period ΔT until it reaches the DP9 Mode.

On steps 1355 through 1357, the flip-flops RHS and RCW are cleared, the 2BETA register read to bring in the number 2β, and the flip-flop RCW is set if 2β is not negative, i.e., positive. Thus, the flip-flop RCW is enabled whenever the transition from the first to the second path segments involves a "rotation clockwise" as the cutter changes direction in moving from the first to the second segment. On the other hand, during step 1358, the flip-flop RHS is enabled only if the transition is an outside corner with a fillet and cutter is traveling along the left side of the part edge (XRO·G41); or the transition is an inside corner, or an outside sharp, with cutter traveling along the right of the part edge ($\overline{XRO}$·G42). A moment's study of these conditions will confirm that flip-flop RHS is set only if the center of a fillet (either programmed or to be inherently formed by the cutter) is on the "right hand side" of the path as one looks in the direction of cutter travel.

At steps 1360 and 1361, operations are performed to determine if the angle of transition is so small that it can be disregarded, and the junctions of the block 1 and block 2 segments treated as if they were tangent. It will be recalled that the numerical value for the angle $2\beta$ is at this time still in the answer register, and on step 1360 the numerical constant representing .0002 radians is read in along with classification signal cx. Thus, $2\beta$ is classified against a very small angle expressed in radians but equalling appproximately 0.01° or 0.6 minutes. If the comparison produces an ALB signal, indicating that $2\beta$ is less than 0.6 minutes, then on step 1361 the TANG flip-flop is enabled, and the flip-flops XR, XRO, XQ and OSS are cleared. This produces the same results described above as a consequence of the flip-flops TANG being set, and the transition will be executed as if the two path segments were tangent because they make such a negligible angle with one another.

At steps 1362-64, the transition angle $2\beta$ is classified against a predetermined constant 0.16 radians or approximately 8°. The purpose of this is to determine if an inside sharp transition involves such a small change in direction of the cutter travel that one can cause the tool radius to "jump around the corner" without decelerating the cutter from its normal path velocity. Thus, on step 1363, if $2\beta$ is less than about 8° and the transition is an inside sharp (XQ), the JCX flip-flop is enabled to indicate that a "jump corner transfer" may be effected. Conversely, on step 1364, if the transition is an inside sharp (XQ) and the JCX flip-flop has not been set ($\overline{JCX}$) so that the angle of transition is greater than about 8°, the flip-flop ZVX is set to designate that the cutter should be decelerated to zero as it reaches the end of the block 1 segment, and then re-accelerated to the programmed path velocity during execution of block 2.

Referring for a moment to FIG. 7, it may be noted that the fillet which is to be interposed between the two path segments is tangent at its juncture to each segment, and therefore the angle $2\beta$ which is formed by the two path segments will also be subtended by the fillet arc. It is desirable to compute one-half of the angle $2\beta$, i.e., the angle $\beta$ as labeled in FIG. 7 so as to define the angle between the vector V drawn from the fillet center to the programmed transition point XCEP, YCEP. For this purpose, the numerical value of $2\beta$ is, in effect, divided by two during program steps 1550 through 1560, as shown in Table V. More particularly, on step 1550 through 1554 the $2\beta$ number is read in and added to itself four times, producing a sum of 5 × $2\beta$ or $10\beta$. Then at step 1555 the computer answer register number is shifted right by one decimal place, dividing the number therein by 10, and on step 1559 the result is written as a numerical value for angle $\beta$ into SP30. Also, on step 1560 if there is an LXL transition, the value of $\beta$ is written into SP18.

The steps 1562 through 1598 next shown in Table V are effective only for a situation involving a CXL, LXC or CXC transition. Since FIG. 7 shows an LXL transition, these steps will be skipped for the moment and later described in connection with the example of FIG. 8 which is an LXC transition. This completes the operations performed in the DP3 Mode for the linear-to-linear example of FIG. 7, and thus it will be understood from Table III that early during the next iteration period $\Delta T$, the HD counter will be advanced from its three count state to its four count state, so that the DP4 signal will be produced in FIG. 4, and the operations for the DP4 Mode as designated in Table VI will thus be carried out during the remaining steps of that period $\Delta T$.

C. DP4 Mode (Table VI)

Referring next to Table VI, during steps 0153 through 1368, the cosine of the angle $\beta$ is computed by the performance of a "cosine" computer routine. Since the details of the cosine routine performed by computing a converging power series are well known to those skilled in the computer art, they will not be treated in detail here, and it will suffice to note that the flip-flop COS is set at step 0100 in those cases other than a CXC. Thereafter, on step 0153 with the COS signal present, the number in SP30 (which is the previously stored $\beta$) is read into the computer. By subsequent computations which are not here detailed, the cosine of the angle $\beta$ is thus computed according to the formula set out in Table VI. It will be observed that a quantity X equal to $2\beta/\pi$ is first computed and then a summation of a power series is performed. In any event, on step 1199 the cosine of the angle $\beta$ (at least for the LXL transition here being considered) appears in the computer accumulator, and this is written for storage into SP33.

The following steps from 1334 through 1371 in Table V have no significance for the LXL transition being considered as an example in FIG. 7, and they will be described subsequently with reference to FIG. 8. Referring to the lower portion of Table VI, during the 1300 time column in the LXL case, the DVA flip-flop will be set so as to enable a division sub-routine of the nature previously described. The numerator for this division operation is read in on step 1380 and is the tool radius Q if the transition is inside sharp (XQ) or is the radius of the fillet if the transition is not an inside sharp. On step 1384 the denominator, which is cos $\beta$ is read from SP33 into the computer, and the subsequent division operation result in the answer being produced in characteristic plus mantissa form, with the mantissa appearing in the answer register of step 1592 and the characteristics appearing in the answer register on step 1593. A convert signal CONV is supplied to the computer on step 1593 so that it then operates (by a routine here not detailed) to convert the characteristic and mantissa of the quotient into decimal form; and on step 1596 the quotient is written into the register SPVV, while the DVA flip-flop is cleared. It will be understood, therefore, that the register SPVV now holds either $Q/\cos\beta$ or $RF/\cos\beta$, the latter being applicable in the XQ example of FIG. 7. It will be seen that this quotient numerically represents the length of the vector V lying between points Cx, Cy and XCEP, YCEP (FIG. 7). In other words, looking at the right triangle which is formed by the lines RF and V separated by the angle $\beta$, it is apparent that $V = RF/\cos\beta$.

This concludes the operations performed during the DP4 Mode and no further data processing occurs during the remainder of the $\Delta T$ period which is in progress. Then, when the next $\Delta T$ period begins and time step 0020 is reached, the HD counter will be advanced from its four to its five state, so that the DP5 signal will appear, and the DP5 Mode operations designated in Table VII will take place during the remaining time steps of that particular $\Delta T$ period.

D. DP5 Mode (Table VII)

Referring next to Table VII, steps 0320 and 0321 have no significance with respect to the LXL example of FIG. 7, and will be treated later with respect to the LXC example of FIG. 8. As indicated in Table VII, however, during the DP5 Mode and the 1300 time column the flip-flop DVA is enabled to begin a division routine, and in the LXL case here being considered with reference to FIG. 7, the fillet radius RF is read in as the numerator on step 1380 while the block 2 program segment path length (labeled R or D in FIG. 7) is read in as a denominator on step 1384. On step 1592 and step 1593 the resulting quotient appears as a mantissa and a characteristic in the answer register and these are respectively written into SP12 and SP13, whereupon the DVA flip-flop is cleared to end the division routine. It will be seen, therefore, that in the LXL case, SP12 and SP13 now hold the quotient of RF/R.

In a similar fashion, it will be seen that between steps 17xx and 1994 in Table VII, the number RF representing the fillet radius is divided by a number representing the first block programmed path segment length RA (FIG. 7) and the resulting quotient RF/RA is written for storage in mantissa plus characteristic form in SP16 and SP17. This ends the operations performed during the DP5 Mode and the two quotients RF/R and RF/RA which have been computed and stored will be employed later in the sequence of operations.

E. DP6 Mode, (Table VIII)

When the next iteration period $\Delta T$ begins, the HD counter of FIG. 4 will be advanced by one count state, and thus the DP6 signal will appear and the operations set out in Table VIII will thus be carried out during the remaining time steps of that iteration.

Referring to Table VIII which shows the computations performed in the odd-hundred time columns while the DP6 Mode is in effect, those operations between steps 0170 and 1548 have no significance with reference to the LXL example of FIG. 7, and they will be treated later in relation to the LXC example of FIG. 8. In Table VIII, however, beginning at step 1550, a numerical value for $\theta V$, i.e., the angle of the line V in FIG. 7, is derived. At step 1550 the numerical value of the angle $\theta$ is read from THETA register into the computer, and on step 1551, the value $\pi/2$ is added, — but if the center of the fillet arc is on the left hand side of the path ($\overline{RHS}$) the value of $\pi/2$ is subtracted. With reference to FIG. 7, it will be seen that this operation (where the signal RHS does not exist) results in the accumulator holding an angle which is labeled $\theta = \pi/2$. On step 1553 the number held in SP18 (which is the number for $\beta$ stored therein during the DP3 Mode) is read in additively, and the sum $\theta V = \theta + \pi/2 + \beta$ is written into Scratch Pad register SP30 during step 1554. Thus, a numerical value for $\theta V$ is now stored in SP30. During the time column 1500 the RANG subroutine is carried out to reduce the numerically signaled angle $\theta V$ to an equivalent value which lies between 0 and $\pi/2$. This is done because the angle $\theta V$ as previously computed may involve an angle which is greater than 90°, it is desired to reduce it to a numerical value of an angle lying between 0° and 90° but with a stored half quadrant code to symbolize the actual quadrant of the angle. The "reduce angle" or RANG subroutine is detailed in Table V, and will be explained hereinafter with reference to FIG. 8, but for the present it will be sufficient simply to note that during steps 1582 through 1598 the angle $\theta V$ is read from SP30, converted into a value lying between 0 and $\pi/2$ and restored in SP30, with the HQ register being set to hold the appropriate quadrant code.

The "reduce angle" routine ends on step 1598. Thereafter, during step 1700 of the DP6 Mode, a divide routine is carried out (as hereinbefore explained) to compute the quotient of Q/R. The result is obtained in characteristic plus mantissa form, with the mantissa being stored in SP10 and the characteristic stored in SP11. This ratio will be employed at a later time in the computational sequence. This ends the operations performed during the DP6 Mode for the LXL example of FIG. 7.

F. DP7 and 8 Modes (Table IX)

During an early portion of the next period $\Delta T$, the HD counter will be advanced from its six to its seven count state, and the DP7 signal in FIG. 4 will appear. Correspondingly, the DP78 signal will appear from the OR circuit 42 which is shown in FIG. 4. Thus, during the DP7 or the DP8 Mode, the DP78 signal exists and is used to cause certain common computational steps to occur. Essentially, during the DP7 Mode iteration period, computations are performed which relate to the X axis, while during the DP8 Mode period $\Delta T$, similar computations are performed which relate to the Y axis data. Accordingly, Table IX and the DP7 Mode will first be described, and the operations which thereafter take place in the DP8 Mode will be readily understood.

Referring to Table IX, and remembering that both the DP7 and DP78 (but not the DP8) signals exist, on step 0149 the COS flip-flop will be enabled and the cosine routine previously described will be carried out, with the numerical value of $\theta V$ being read in negatively during time steo 0153. Thus, on step 1199 the cosine of the angle $-\theta V$ (which is equal to the cosine of $+\theta V$) is written in SP33.

At steps 1321 through 1355 a multiplication routine is performed to compute $V \cos \theta V$, the result being the horizontal or X axis component of the vector V which is labeled VI in FIG. 7. On time step 1355, the numerical value of VI is written into SP20. On time step 1360, the adder is cleared, the flip-flop FFC is cleared, and the quadrant code for the previously stored angle $\theta V$ is read in from HQ. If the sign of that half quadrant code is negative on step 1361, the flip-flop FFC is enabled; and further on that same step the quadrant code is written into the BR register of the computer. Thereafter, the quantity VI is read in negatively (AIM) on time step 1663, but under three possible conditions this negative sign is counteracted by an overriding AIP (adder input positive) control signal. First, if the signal $\overline{BR72}$ exists, it means that the quadrant code (which can only be 0, +2, −2 or −4 after the previous RANG routine) is not of the absolute value 2, 3, 6 or 7 (and thus 0 or −4) the adder input is forced positive. Secondly, if the signal BR72 exists simultaneously with the signal FFC indicating that the stored half quadrant code number is negative and 2, then the adder input is forced positive. Finally, if the $\overline{BR74}$ and $\overline{BR72}$ signals simultaneously exist, indicating that the stored half quadrant code number is 0, 1 or 8 (i.e. is 0) the adder input is forced positive. Thereafter on step 1364, the quantity VI with a power sign is rewritten into SP20. Review of the foregoing steps with reference to the fact that the quadrant code is 0 for $0 = \alpha < 90°$, $-2$ for $90° \leq \alpha < 180°$, $+2$ for $180° \leq \alpha < 270°$, and $-4$ for $270° \leq \alpha < 360°$ will confirm that VI is given the proper sign based on the previously stored quadrant code for the angle $\Delta V$ and the fact that VI is derived from the cosine of the angle $\Delta V$.

Having computed VI which is the X axis component of the vector V in FIG. 7 and rewritten it into SP20 on step 1364, steps 1370 through 1376 are utilized to find the X coordinate of the center of the next circular arc which is to follow the block 1 segment, whether that circular arc be a programmed fillet, or a fillet formed merely by the diameter of the cutter. The computations at steps 1370 through 1376 are used for the LXC and CXL cases, and thus are not applicable in the FIG. 7 example but they will be briefly treated here. On step 1370 and 1371, the block 1 programmed end coordinate XE is read in and the I value for block 2 is read in from SPI and subtracted, with the result XE − I being written into SP18. Thereafter, on step 1372, the block 1 end coordinate XCEP is read in and the block 1 X axis component IE from SPIE is subtracted with the result XE − IE being written into SP1 on step 1374. With reference to the LXC example in FIG. 8, therefore, it will be seen that SP18 now holds the X coordinate $R_x$ of the circular block 2 center; and it may be visualized that in a CXL case, SP1 now holds the X coordinate $RA_x$ for the circular block 1 center.

On step 1374, the value VI is read in from SP20, and in a LXC case (like FIG. 8) the coordinate $R_x$ is read in from SP18 additively, with the sum $VI + R_x$ being written into SP14 on step 1376. From inspection of FIG. 8 it will be seen that SP14 now holds the numerical value for the coordinate $C_x$. On the other hand, in a CXL case, the contents of SP18 are not read, but the contents of SP1 are read; and the result $VI + RA_x$, which is equal to $C_x$ for the CXL case, is written into SP14.

In the LXL case exemplified by FIG. 7, however, the number previously written in SP14 on step 1376 is superseded by a new number during step 1380, as noted below.

On step 1377 in Table IX, the value J is read from SPJ if block 2 is not circular, or the value JE is read from SPJE if the transition is of the LXC type. Then, on step 1378, this value is transferred to SP21 for later use, and it is to be recalled that SP21 holds the numerical value J in an LXL or CXL case, or the value JE in an LXC case.

On step 1378, the computer is cleared, and the value is read from SPXE, followed by the subtractive reading of the value VI from SP20, the result obviously being the numeral value of the XCEP − VI coordinate $C_x$ as shown in FIG. 7, recognizing that VI as there shown is a negative quantity. Thus, on step 1380 the coordinate $C_x$ is written into both Scratch Pads SP14 and SP18.

There follow in Table IX a duplication of the previous time steps 1370–1380 during which operations are designated for the DP8 mode. These operations are precisely the same as those described above except that they occur later when the DP8 MOde is in effect, and they involve quantities which relate to the Y axis rather than to the X axis.

Confining the discussion for the moment to the LXL example of FIG. 7, during steps 1520 through 1558, computations are made to determine the distance RFIE which is the X axis component of the fillet radius when it reaches the end of the fillet arc. As indicated for step 1520 and step 1521, the mantissa and characteristic of the ratio RF/R (previously computed and stored at DP5, steps 1592, 1594) are read into the computer with a CONV control signal so that in effect the decimal form of that ratio is obtained on step 1523. On step 1524, a multiplier J is read in from SP21 where it was previously stored and multiplied in the computer by the ratio RF/R. The result appearing in the answer register on step 1540 is RF/R times J which is equal to RFIE by the law of similar triangles applied to triangles R, I, J and RF, RFIE, RFJE in FIG. 7. Thus, the quantity RFIE is written into SP31 on step 1558 because steps 1541 through 1557 apply only to the $\overline{LXL}$ cases. It is to be remembered that SP31 now holds the quantity RFIE for the LXL example of FIG. 7.

The ensuing steps of 1561 through 1598 are not applicable to the LXL case, but on the contrary are utilized to compute the components RI and RJ for the ending fillet radius vector in the CXL case. Accordingly, the next operations which apply to the FIG. 7 example are steps 1720 through 1757 in which the X component of the starting fillet radius RFI is determined. As indicated, on steps 1720 and 1721, the ratio RF/RA (previously computed and stored in characteristic plus mantissa form in SP16 and SP17) is read into the computer and converted into decimal form where it appears on step 1723. Thereafter, in the LXL case and in the DP7 mode, the quantity JE is read into the computer with a multiplication control signal, so that the product of RF/RA times JE appears in the answer register during step 1557 and is written into SP33. By the law of similar triangles applied to triangles RA, IE, JE and RF, RFJ, RFI in FIG. 7, it will be apparent that this product equals the value RFI, and such value is now held in SP33.

Next, it is desired to compute the value of QI (which is the X axis component of the cutter radius Q which is perpendicular to the work surface along the ending fillet radius as shown in FIG. 7) and this is done at steps 1760 through 1797. As shown in Table IX, on step 1760 and step 1764, the ratio Q/R (previously stored in SP10 and SP11 in characteristic plus mantissa form) is read into the computer and converted into decimal form. On step 1765, the computer is put into a multiplication mode, and one of three numbers (from SP21, SPJ or SPI) is read in as a multiplier. In the FIG. 7 example, foreshortening is required (cf. FIG. 6b) so that the signal FS will exist, and only the number from SP21 will be read in. As noted above, SP21 presently has stored in it the quantity J, so there appears in the answer register on step 1796 the product of Q/R times J. By the law of similar triangles applied to triangles R, I, J and Q, QJ, QI in FIG. 7, this product is equal to the X axis component QI of the tool radius Q when the latter is disposed along the ending radius of the fillet. On step 1797, because the $\overline{NBC}$ signal exists for FIG. 7, this quantity QI is written and stored in SP32.

At steps 1920 through 1924, the sign of the number RFI in SP33 is either changed or left alone in order that it will be proper in relation to the sign of the quantity VI stored in SP20. As noted, on step 1920, the quantity VI is read in from SP20 and on step 1921, FFC is set if VI is negative. Then, on step 1923, the quantity RFI is read into the cleared computer from SP33, and along with an sx control signal which reverses its sign only if FFC is set, meaning that VI is negative. Thereafter, on step 1923 the quantity RFI is rewritten into SP33 with its sign changed or the same as before, depending on whether VI was negative or positive.

On steps 1922–23 and 1924–25, the sign of the number held in SP35 is correctively adjusted; this is of significance only in an NBC case (like FIG. 8, not FIG. 7).

On steps 1925 and 1926, the sign of RFI previously stored in SP33 is again correctively adjusted. It is reversed if block 1 is circular counter-clockwise and the center of the fillet is on the left side of the path (G41·CCW), or if block 1 is circular clockwise and the center of the fillet is on the right of the path (G42·CW). Thus, with reference to FIG. 7, the sign of the number RFI is not reversed and the number RFI restored in SP33 has a negative sign.

It will be recalled that the quantity RFI was computed as simply a magnitude as if the hypotenuse RF were parallel to the hypotenuse RA. It becomes necessary, therefore, to rotate the vector constituted by the starting fillet radius RF, i.e., to adjust the signs of RFI and RFJ depending upon the angle at which the block 1 segment RA lies and the signs of IE and JE, so that the starting fillet radius RF lies at right angles to the block 1 segment RA. This is accomplished at steps 1926 through 1929 in Table IX where only the component RFI will be discussed for the DP7 Mode. As there shown, the answer register and FFc are cleared on step 1926, and the quantity JE is read in. FFC is set on step 1927 if JE is negative. Thereafter on step 1928 the answer register is cleared, and the quantity RFI is read in from SP33 with a negative sign (because of the AIM signal), but that negative sign is reversed and forced to be positive by an AIP signal if the sign of JE is positive and the transition is one which causes a counter-clockwise rotation along the path ($\overline{FFC}\cdot\overline{RCW}$), or the sign of JE is negative and the transition is clockwise (FFC·RCW). In FIG. 7, the transition is clockwise but JE is positive so that the number RFI is rewritten into SP33 with a negative sign on step 1929. From inspection, this is the correct sign for RFI in FIG. 7, and in the LXL case this supersedes the previous sign control performed on the RFI number.

From the more detailed explanations which have been given above, it will now be readily seen from steps 1930 through 1933 in Table IX that the sign of the quantity QI held in SP32 is correctively adjusted depending upon the sign of the quantity VI stored in SP20 (or upon the sign of I in the case of an outside sharp when the signal OSS exists). Thus, the sign of QI is properly adjusted. Similarly, at steps 1933 and 1934, the sign of RFIE held in SP31 is correctively adjusted.

Finally, at steps 1934 and 1935, the sign of QI held in SP32 is correctively adjusted, while at steps 1935 through 1938, the sign of QI in SP32 is adjusted according to the sign of the quantity J and the direction of the path transition change. Likewise, on steps 1938 through 1939, the sign of RFIE is correctively adjusted; and at steps 1939 through 1940 the sign of QI is further correctively adjusted. The details and the correctness of these sign adjustments will be apparent upon study of the directions of the various X and Y axis components here treated, and simply from making a few sketches of different possible relationships with different types of transitions.

Beginning at step 1940 in Table IX, the calculations are made to determine the coordinates and the various vector components which are numerically required to cause termination of the block 1 path segment at an artificial end point XCEP', YCEP' instead of at the programmed end point XCEP, YCEP as shown in FIG. 7. The computations which are indicated at steps 1940 and 1941 result in new values for the quantities QXE abd QYE only in the case where the LBC signal exists and block 1 is circular. This does not apply to the FIG. 7 example but in a case where block 1 is circular, the X and Y axis components QIE and QJE for the tool radius when the tool lies at the programmed end point for block 1 are substituted into the QXE and QYE registers to establish the Q components which will exist when the cutter lies at the foreshortened end point for block 1.

For the example of FIG. 7, on steps 1941, 1942 in Table IX, the SP32 number (which is QI) is written into the QX buffer register QXB where it will be ready for use as the value of QX at the end of the fillet and the beginning of the actual execution of the programmed block 2. On step 1943, this same value QI is written into SP23 for future use.

At steps 1945 through 1947, the numerical values stored for the end point of block 1 are changed so as to foreshorten that block and cause its execution to be terminated before the programmed end point XCEP, YCEP is reached. For this purpose, and in the DP7 Mode pertaining to X axis components, on step 1945 the coordinate value $C_x$ is read from its previous storage in Sp14. Then, on step 1946, one of four values is read into the computer, the last three being applicable only if the signal XQ exists to indicate that an "inside sharp" transition is being treated. Thus, on step 1946 for the example of FIG. 7, the number RFI is read from SP33 because the $\overline{XQ}$ signal exists, and it is added to the coordinate $C_x$ because a subtraction command does not appear in the absence of an XQ signal. Thus, on step 1947, the sum $C_x + RF$ is written as a new value into the end point register XCEP. Recalling that RFI is a negative number, it will be seen that the XCEP register now holds the coordinate XCEP' at which block 1 is to be terminated with foreshortening, and at which the fillet is to begin. Thus, while block 1 is being executed its termination or end point is foreshortened, and the "lock ahead" operations described in Case A now take place with a new or artificial X axis end point XCEP' being used. Of course, in the DP8 mode a similar foreshortening occurs with respect to the YCEP coordinate and an artificial value YCEP' is substituted in the YCEP register.

At steps 1950 and 1951, a substitution is made for the X and Y axis components of the starting radius of the fillet which is to be executed by generation of an "internal block." More particularly, in the DP7 mode the quantity RFI previously stored in SP33 is read into the computer if the transition is not "sharp" (i.e., $\overline{OSS}\cdot\overline{XQ}$), and the result is written IB register. Similarly, in the DP8 mode, the quantity RFJ is written into the JB register, so that when the execution of block 1 is completed at the foreshortened end point and the data in buffer storage is transferred to active, the next block will be executed with starting I and J values which are the components of the starting fillet radius.

At steps 1960 through 1962, new values are placed in the XEP and YEP registers (which are buffers for the end points of the next block to be executed) so as to define the end point of the internally generated block which, in the example of FIG. 7, is the circular fillet. As shown in Table IX at step 1960, and treating only the DP7 mode, one of two values stored either in SP14 or SP18 is read into the cleared computer. SP14, as previously noted, holds the fillet center coordinate $C_x$. SP18, as previously noted, also holds the fillet center coordinate $C_x$ for the LXL case, or holds the block 2 circular arc center coordinate $R_x$ if LXC, or holds the quantity XE − I for the CXL case. On step 1960, the SP14 number is read if there is an inside sharp (XQ), or it is read if the transition is CXL and there is a fillet ($\overline{XQ} \cdot \overline{OSS}$). On the other hand, on step 1960 the SP18 number will be read if there is a fillet ($\overline{XQ} \cdot \overline{OSS}$) and the transition is not one which is CXL. Thus, in the example of FIG. 7, the number held in SP18 (which, as noted, is the coordinate $C_x$) is read into the cleared computer because of the presence of the XQ signal. Then, on step 1961 in the DP7 mode, one of three values is read from SP31, SP32 or SPXE. SPXE is read only if there is an outside sharp (OSS), whereas SP32 is read subtractively only if there is an inside sharp (XQ), but SP31 is read if there is a programmed fillet ($\overline{XQ} \cdot \overline{OSS}$). Thus, in the example of FIG. 7, the number RFIE previously stored in SP31 is read into the computer and added to the value of coordinate $C_x$. The sum ($C_x$ + RFIE) appears in the answer register on step 1962 and is written into both the XCP and SPXE registers. It will be recalled that the XEP register is a buffer which holds the X end point coordinate for the next block to be executed when transfer to active storage begins. Thus, instead of the XEP coordinate number shown for block 2 at the extreme right in FIG. 7, the XEP register now holds the number for the coordinate XEP' representing the end point of a path segment which is constituted by the fillet arc. This same number is also now held in the SPXE register. It will be seen therefore, that the control system is beginning to assume that the next block which it is to execute is not the programmed block 2 but instead is the "internally generated" block for the connecting fillet. The change of the XEP number to XEP' also is similarly made with respect to the YEP number, but during the DP8 mode.

As noted earlier herein, at the time the block 2 command data were read from the punched tape, the registers SPIE and SPJE contained the X and Y axis components for the block 1 linear segment or for the starting radius of a block 1 circular segment. Thus, when the internal block has been fully executed, and what is here designated as block 2 is transferred to active storage and is being executed, so that the tape reader is restarted to read the next succeeding block of data, the present block 2 will then be treated as block 1. Thus, it will be desirable to have in storage the X and Y components of the block 2 linear segment or of the ending radius for the block 2 circular segment at the time that a third block of data is read from the punched tape. This objective is accomplished by the operations designated at steps 1966 through 1968 in Table IX. More specifically, on step 1966 in the DP7 mode either the number SPI or the number in SP31 will be read into the computer, the latter only in the case of ($\overline{OSS} \cdot \text{NBC}$) and the former in the case of (OSS-$\overline{\text{NBC}}$ or NBC). In the example of FIG. 7 where block 2 is linear and thus the signal $\overline{\text{NBC}}$ exists, the value I is read from SPI on step 1966, and on step 1967 it is temporarily stored in SP40 so as not to destroy the existing value of SPIE which is necessary for the computations to be performed during the DP8 Mode. Then, however, near the end of the DP8 Mode on step 1967, the value I stored in SP40 is read into the cleared computer and written into the SPIE register on step 1968. Thus, at the end of the DP7 and DP8 Modes, the SPIE register holds the I component value for block 2 shown in FIG. 7, but when the next exceeding block of data is read into the computer, this number will be treated as the block 1 I component, then to be called IE. In like manner, it will be seen that during DP8, the value J is read into the computer and on step 1967 it is rewritten into SPJE, for the same purpose.

The operations designated at steps 1970 through 1979 of Table IX occur only in the DP8 Mode, but it will be helpful to discuss them at this point. Their objective is to enable the JCX flip-flop and eliminate the internal block so as to produce a "jump transfer" if the transition is an outside sharp which involves such a very small displacement of the cutter center as it "rolls around the corner" (see FIG. 6c) that it is negligible and can be "forced." For this purpose, the change in the X axis component and the change in the Y axis component of the cutter radius as it swings around the corner on an outside sharp are computed, and the larger one is compared with the distance through which the cutter will move, at the programmed velocity, in a period of six $\Delta T$'s, i.e., a very short distance.

The details of this will be apparent from Table IX beginning at step 1970 where the block 1 ending X component of the tool radius is read into the cleared computer from the register QXE. The value of QI (which is the X component of the tool radius at the beginning of the execution of block 2, see FIG. 6c) is read in subtractively. The difference QXE − QI is then written for storage in SP1. Thereafter, on step 1973 the value QYE is read into the cleared computer, and on step 1974 the value QJ is read in subtractively from SP25. The difference QYE − QJ thus appears in the accumulator on step 1975, and it is "classified" against the difference QXE − QI read from SP1. If on step 1976 the signal AGB exists, indicating that QYE − QJ is greater than QXE − QI, then the larger of these is written into SP1, replacing the smaller. On step 1977, the effective path velocity number PVC (which is described in Case B) is read into the cleared adder, and on step 1978 it is read in again and added to itself, forming the sum of 2 PVC. Then on step 1979, the number appearing in the computer answer register is shifted to the right three decimal places, forming the quantity 0.002 PVC; and the larger of the two differences previously stored in SP1 is read in along with a classification signal $cx$. Then, on step 1980 if the AGB signal exists and an OSS signal exists (to indicate that the transition is an outside sharp) the JCX flip-flop is set. In this way, the JCX flip-flop is set if there is an outside sharp transition which requires such a small change in the X or Y components of the tool radius that an internal circular block to move the tool center around the corner is not required.

Finally, it will be recalled that data have been prepared and placed in buffer storage for any required internal block so that when the execution of block 1 is completed and the next transfer of data to active storage occurs, data for the internal block will go into the active registers. But the internal block (in all cases a circular block) must also be properly designated as to its nature, i.e., circular clockwise or circular counterclockwise, in the G code buffer register. Accordingly, on step 1980 the G buffer is driven to contain the code G02 or G03. as is required by the direction which the cutter must swing in order to execute the internal block. In essence, if an internal block is required, the signal $\overline{JCX}$ will exist simultaneously with the signal OSS, or either of the signals XRO or XR will exist. And, if the path of the internal block or fillet is clockwise, the signal RCW will exist. Thus, when the RCW signal exists and an internal block is required, the G buffer and decoder are enabled or driven to produce the code signal G02. On the other hand, when the $\overline{RCW}$ signal exists and an internal block requiring counterclockwise motion of the cutter is required, the G buffer and decoder are driven to produce the signal G03. Thus, signals have now been prepared and stored so that the next transfer to active will be numerical information which the system requires to execute, not programmed block 2, but instead, the internal block.

After the DP7 computations are completed in a given $\Delta T$, the HD counter in FIG. 4 is advanced to its 08 count state and the DP8 Mode-establishing signal appears during the early portion of the following $\Delta T$. The operations generally described for the DP7 case are thus carried out during this following $\Delta T$, but for the DP8 case (in which quantities pertaining to the Y axis are processed rather than the quantities pertaining to the X axis). Accordingly, the reader will be able to review Table IX with particular reference to those steps qualified by DP8 or DP78 signals, and he will be able readily to understand the computations which are performed during the DP8 Mode. It will only be noted briefly here that in the DP8 Mode shown in Table IX for the FIG. 7 example, the sine of $\theta V$ (rather than the cosine of $\theta V$) is produced during the cosine routine of steps 0419 through 1199 because of the 90° addition which is made to the angle $-\theta V$ before the cosine routine is performed. Then, the quantity VJ is computed as VI sin $\theta V$ and written into SP20 on step 1355. The sign of this quantity is adjusted during steps 1360 through 1364; and during the second group of steps labeled 1370–1389 in the DP8 Mode, the numerical value of the fillet center coordinate $C_y$ is written into SP15 (and also into SP19 if the transition is LXL).

In the LXL case on steps 1520–1540 the product of RF/R times I is computed to derive RFJE, and this is written into SP31 on step 1558. Thus, in the DP8 case for LXL, the Scratch Pad SP31 holds RFJE instead of RFIE as previously for the DP7 Mode. Similarly at steps 1541 through 1558 for an $\overline{LXL}$ case the quantity QJ is computed and stored in SP32, and also in SP35 for the specific CXL transition.

Further in the DP8 Mode, the LXL case, the quantity RFJ (as shown in FIG. 7) is computed and stored in SP33 on step 1757. Then, the quantity Q/R times I is computed and stored representing QJ in Sp32 for the LXL case on step 1797. Then, the sign control procedures previously described with reference to DP7 are carried out during steps 1920 throough 1940, but they relate to the QJ, RFJE and and RFJ quantities previously computed. Thus, beginning at step 1940 calculations are made to determine the Y axis coordinate YCEP' for the foreshortened end point, and this is written into the YCEp register on step 1947. On step 1951, the number held in the JB register is changed to the previously computed RFJ value to define the Y axis component of the starting radius for an internal block defining the programmed fillet, as shown in FIG. 7.

At step 1960 through 1962, a new value is written into the XEP register to define the Y axis end point coordinate YEP' for the ending location of the internal block, this number being written into the YEP register on step 1962.

Next, the operations shown in steps 1966 through 1968 are performed with the results that in the LXL case shown in FIG. 7, the value for J for block 2 is written into the SPJE register where it can become the starting y axis component at the time that block 2 is transferred into active storage, and the value SPI previously written into SP40 is now written into SPIE where it serves the same purpose.

At steps 1970 through 1980, as previously described, the flip-flop JCX is set if the transition is an outside sharp and the largest change to be made in an axis component of the tool radius vector Q is less than a predetermined small amount.

Finally, as previously described, a G02 or G03 signal is produced in the Dp8 Mode on step 1980 to be effective during the time that the data for the internal block is in buffer storage and ready for transfer into active storage.

This completes the description of operations in the Dp7 and Dp8 Modes. After DP8 has been finished, early in the next period $\Delta T$ the HD counter will simply be advanced on successive steps through the DP9, 10 and 11 Mode states, and will end up in the DP12 Mode. As noted above, if the transition is not tangent and the internal block is not active ($\overline{IBA}$), the logic shown in Table III results in the HD counter advancing quickly to its DP12 state after the DP8 Mode has been carried out. See Chart A.

G. DP12 Mode, (Table XIII)

Thus, for the present the operations shown in Tables X, XI and XII for the DP9, DP10 and DP11 Modes will be skipped, and those operations which are set out in Table XIII for the DP12 Mode will be described. It may be noted generally that the operations performed in the DP12 Mode supplement and replace the "data process" calculations which are shown in Column X600 of Table I in Case B. One purpose of that "data processing" is to comput the time factor number to be stored in the TFB register, as described in Case B. However, prior to that, and as indicated in Table XIII, calculations are performed to produce and store the correct total effective linear path segment or circular radius for the cases where the next block of data is linear or circular.

It will be recalled that at the end of DP8, the proper code G02, designating that the radius fillet shown in FIG. 7 is a clockwise arc, was set into the G buffer register, so that the G02 and NBC signals now exist for the example of FIG. 7.

Referring specifically to Table XIII and DP12 Mode on step 05xx (i.e., during time column 0500) the SQS flip-flop is set to enable a square root of the sum of the squares routine, and the path segment axis components (which in this example are RFI and RFJ now held in registers IB, JB) are read into the computer from registers IB and JB. As a result, on step 1994, the SQS flip-flop is cleared, and the result is written into SP5. This result is the square root of the sum of the squares of I and J (i.e., D or R in terms of the part edge) for the next block to be executed. The I and J values are the X and Y axis components for the starting fillet radius RF.

At step 1120, this value R (which is RF as labeled in FIG. 7) is read from Scratch Pad 5. It may be noted parenthetically that this value is written into the D register if the next block is not circular on step 1121, but when the next block is circular, the value of Q (the effective tool radius) is read in with a positive sign if the tool and circular block centers are on opposite sides of the path, or subtractively if the tool and circular block centers are on the same side of the path. This is the significance of the qualifying signals (G42·G02 + G41·G03) for step 1121. It will be seen from FIG. 7 that the tool center and the fillet center are on opposite sides of the work path, so that the starting radius vector R (which is RF as labeled in FIG. 7) is added to the effective tool radius Q, and the result R + Q is written into Scratch Pad 6 on step 1122. The quantity R ± Q is equal to the effective total radius $R_t$ from the center of the arc to the cutter center path CCP. On step 1522 is the next block is circular, this value $R_t$ is written into the D register where it will be available for later use in the computation of the time factor TF.

On step 1123, the SQ flip-flop is enabled to condition the computer to carry out a straight square root routine, the details of which need not be described here. It will suffice to note that on step 1127 the value $R_t$ is read in from SP6 and on step 1140 the square root of $R_t$ is written into SP7, after which the answer register is cleared and the SQ flip-flop is cleared. On step 1141, a multiplication operation is enabled by an emx signal, and on steps 1142 and 1143 the square root of $R_t$ and an arbitrary constant 44.7 (which is equal to the square root of 2000) is read in. Accordingly, on step 1175 the product — which is equal to $\sqrt{2000\,R_t}$ — is written into a CULLV register where it serves as a "circular upper limit velocity" number. It may be shown by mathematical analysis that the path velocity of the cutter in going around a circular arc is proportional to $\sqrt{A \times R}$, where A is the acceleration experienced along the X or Y axis, and R is the radius of the arc. By choosing a value of 2000 for the acceleration A which is roughly equal to the servo acceleration (in inches/min.2) which the servo drives can produce along either the X or the Y axis, the value in register CULLV becomes a maximum path velocity (with dimensions of inches/minute) which can be safely accommodated in causing the cutter to go through a circular arc having the total radius $R_t$.

Then, on step 1176, the next block programmed feed rate (in inches per minute) stored in the register FB is read into the computer along with a classification signal cx. On step 1177 if the ALB signal exists (to indicate that the programmed path velocity, in the register FB for the next block, is greater than the upper limit circular velocity), then the flip-flop MODF is set. On the other hand, on step 1178, the flip-flop MODF is cleared if the next block is linear (G01 exists) or the $\overline{ALB}$ signal exists to indicate that the programmed velocity for the next block is less than the upper limit value previously computed. The control signal MODF will be used later on in the Mode 3 transfer operations to reduce the velocity of the cutter during the execution of the next block (i.e., the fillet arc as shown in FIG. 7) if the programmed velocity is excessive.

At steps 1330 through 1399 in the DP12 Mode of Table XIII, essentially the same "data processing" operations are performed as set out in Column *x*600 of Table I in Case B, —their purpose being to compute the time factor ratio ΔT/D, which will be applicable when the next block is executed. Thus, it will be necessary here only to observe that at step 1330 through 1391 (and unless the DP12 operations have previously been performed) the division ΔT/D is performed where ΔT is one-fiftieth of a second as the assumed length of the iteration periods and is here expressed as the constant $3.33 \times 10^{-4}$. The correct time factor for the next block is therefore written into the TFB register on step 1391. On step 1397, the data ready flip-flop DR is enabled, and the data process required flip-flop DPR is cleared. Then, on step 1398, the DTZ flip-flop (fully described in Case A) is cleared if the $\overline{ICDTZ}$ and the $\overline{ZVX}$ signals simultaneously exist. Therefore, if the ZVX flip-flop has previously been enabled (as above described with reference to step 1364 in DP3) then the DTZ flip-flop is left set on step 1398 and (as explained in Case B) the cutter will be decelerated to a zero velocity as it approaches and reaches the end point (or the foreshortened end point) of block 1. In this way, the ZVX control flip-flop causes a deceleration to zero during the execution of the block 1 segment if a zero velocity transfer is required.

On step 1399 in the DP12 Mode, the data process flip-flop DP is cleared, and if the end of block counter described in Case A and Case B is then in state S2, it is automatically advanced to state S3.

This concludes a summary of the operations carried out in the DP12 Mode. It will be seen that the MODF flip-flop has been cleared or set if the programmed velocity for the fillet segment of FIG. 7 is excessive in relation to the machine tool servo drive capabilities; that the total effective radius or the total effective linear segment length for the next block to be executed has been computed and stored in the D register, that the correct time factor ΔT/D for the next block has been computed and stored in the TFB register, and that the execution of block 1 is caused to include a deceleration to zero if the flip-flop ZVX has previously been set.

When the next ΔT begins, the control gating for the HD counter as shown in Table III simply rapidly feeds successive enabling pulses to that counter, and it therefore automatically steps from count state twelve to count state nineteen. It there remains until some further count pulse is injected to advance it to its zero count state. At this time the block 1 path segment is still being executed by motion of the cutter, but all of the data for an internal block defining the fillet radius in FIG. 7 have been computed and stored in the buffer registers of the system so that when the block 1 is fully executed and transfer to the active registers occurs, the cutter will be caused to follow around the fillet path segment shown in FIG. 7, i.e., execute the required "internal block" which the programming technician called for merely by specifying a fillet radius in the block 2 data applied to the punched tape.

H. The Principal And Auxiliary Interpolations To Move The Cutter Center Along The Offset Path CCP At this point the actual interpolation operations will be summarized and described, initially with the assumption that the cutter is still moving along the path CCP in FIG. 7 with its peripheral point of contact at the part edge moving along the linear block 1 segment. The principal interpolation operations (for the programmed part edge) are the same as those described in Cases A and B, and thus it is necessary here only to explain how the auxiliary interpolation for the X and Y components of the tool radius is performed and the results added to those of the principal interpolation. It will be recalled from Case A that the X and y axis servo drives respond to dynamically changing, digitally signaled command numbers XSC and YSC to keep the cutter center positioned substantially instantaneously, physically located (in machine coordinates) at the values of those changing command numbers. In Case A, the numbers XSC and YSC are changed by amounts of $\Delta X/10$ and $\Delta Y/10$ times during each period $\Delta T$, the tenth change in each $\Delta T$ assuming that the total changes are $\Delta X/\Delta T$ and $\Delta Y/\Delta T$.

1. Linear Interpolation While Blk. 1 of FIG. 7 is Executed

Table XVI supplements, and is to be added to the bottom (after step 64) of Table VIII in Case A, the latter table not being reproduced here. It will suffice to note briefly that the operations shown in Table VIII of Case A are those which are required to compute the quantities of $\Delta X$ and $\Delta Y$ through which a point is to be moved during each period $\Delta T$ in order to follow along the programmed path segment i.e., the programmed part edge. In addition and as described in Case A, during the circular interpolation mode, the values of I and J are continually changed to signal the components of a moving radius vector which swings along the programmed path arc.

For the example of FIG. 7 when the first linear block 1 is being executed, Columns 400A and 900A of Case A Table VIII (in the present case, during Columns 0800A and 1800A of Table XVI) are effective, and thus values of $\Delta X$ and $\Delta Y$ (which remain uniform during successive $\Delta T$'s) are computed by operations which are fully set out in Case A. But with the further operations shown in supplementing Table XVI in the present case, it will be seen that in the linear mode and in Columns 0800A and 1800A very similar operations are performed to compute the values of $QX\Delta$ and $QY\Delta$, i.e., the changes which must be made in each $\Delta T$ in the X and Y axis components QX and QY such that they dynamically represent an effective tool radius Q which is always perpendicular to the programmed work surface at the point of the cutter periphery tangent to the programmed work surface. This involves a secondary interpolation, and in the linear case for Column 0800A, the values of QX and Q' are multiplied (step 0867 to 8882, Table XVI, Col. 0800A), with the product being added to a previously stored remainder QXR (step 0884) and the result being written (step 0886) in the storage register $QX\Delta$. Note: Q' is the factor designated in Cases A and B as Q, which as detailed in Case B is computed each $\Delta T$ as $Q' = TFA \cdot PVA$, where PVA is the desired path velocity (derived from the active feed rate FA) and TFA is the active time factor equal to $\Delta T/D$ as determined during DP12 in the present case. Thus Q' is a changeable number which during every $\Delta T$ is signaled as being equal to $PVA \times \Delta T/D$. Thereafter, by shifting of the decimal point (step 0888), the new remainder QXR is written (step 0889) into the QXR register so it can be used when the next computation of the value $QX\Delta$ is made during the following $\Delta T$. In the linear mode, the value $QX\Delta$ will not change (even though it is recomputed) as the cutter moves along a linear path because the components of an effective cutter radius Q always perpendicular to the path segment do not change (as will be apparent from FIG. 7); and the value QX remains equal to the starting value QIE signaled at the beginning of the block 1 segment.

Then, in the servo updating sequences which occur for each micromove, the values of the changing servo command number XSC are progressively changed by the amount $(X\Delta + QX\Delta)/10$ during each time period $\Delta T/10$. This is shown at step 17 in all columns except Column 0800 of Table XVII. Table XVII is essentially a reproduction of Table VII from Case A and differs therefrom only in that each time the quantity $\Delta X$ is used for micromove updating, the quantity $QX\Delta$ is added to its —with the result that the servo drive for the X axis, responsive to the changing command number XSC, will move the center of the cutter along the path shown in FIG. 7 which is offset from the workpiece path by the perpedicular distance Q. Moreover, in Column 0800 of Table XVI, after the target point coordinate XCP is updated by the amount $\Delta X$ (steps 04, 05, 06), the value QX is added to it to arrive at a value of the X coodinate lying on the offset path CCP. This is shown at step 0807 after which the machine offset XOFF is added to produce the coordinate number XMP valid in servo machine coordinates; and XSC is newly written to the same value on step 0820. The reader may review Table VII in Case A to fully understand that, in effect, the principal interpolation is supplemented so that the changing coordinates of a point moving along the path CCP are generated, and the X servo system responds to the number XSC in a fashion to keep the cutter center moving along the path CCP, i.e., with its center moving parallel to the programmed part edge but offset therefrom by the perpendicular distance which is equal to the effective tool radius Q.

Substantially the same operations take place in Column 1800A of Table XVI for the linear mode (old Column 900A of Table VIII in Case A) for Y axis quantities as those described above with respect to X axis quantities in the Column 0800A of Table XVI. Also in Table XVII it will seen that the value $QY\Delta$ is added to the value $\Delta Y$ each time that the latter is used for the micromove updating of the servo command number YSC during each period $\Delta T$. For tenth update in Column 1800, the value QV is added to the new YCP number (step 1807) to arrive ultimately (step 1826) at the machine Y coordinate value for the offset path CCP.

2. Look-Ahead, Prorate, And Transfer To The Next Block

As the cutter is moving to execute the block 1 segment of FIG. 7, the "look-ahead" operations set out in Table IX of Case A are performed during the 000 column for Case A (the 0000 time column of Mode 1 for the present case), and when the foreshortened end point XCEP', YCEP' (FIG. 7) whose coordinate values are now stored in the XCEP and YCEP registers is approached, the system is converted from Mode 1 to Mode 2 by advancement of the end of block counter. Meanwhile, during each Mode 1 ΔT, all the computational steps which are shown in Table II of Case B are also carried out. Thus, just before the artificial or foreshortened end point is reached, the system goes into Mode 2 which is a "transfer mode."

At this point, all of the Mode 2 steps which are designated in Table X of Case A (and which is not here reproduced) are carried out, although it is to be understood that the quantity shown as Q in that table of Case A is called Q' in the present application. It will suffice to observe that Table X in Case A described "prorate calculations" for the principal interpolation involving the programmed part edge, and these operations are not reproduced in present Table XIX dealing with Mode 2. Rather, such prorate operations are indicated generally in present Table XIX as occurring during time steps 0670 to 0676 and 1670 to 1676 during the Mode 2 iteration. Prior to such proration for the principal interpolation, however, and as indicated in Table XIX hereof, similar prorate computations are carried out for the auxiliary circular interpolation quantities QY and QX. Because the details of these smaller prorations are unessential to the understanding and practice of the present application, and because one skilled in the art will, by analogy from the teachings of Case A, be able to provide for auxiliary proration, those details are not here described. It will suffice to note that, as shown in Table XIX, "prorate" operations are carried out for QX and QY at steps 37 to 69 in Columns 2-0600 and 2-1600. The principal prorate operations are then conducted during steps 70 to 76 in those same time columns, as fully detailed in Table X of Case A. Thereafter, the steps shown at 76 through 82 for Columns 2-0600 and 2-1600 of present Table XIX are identical to the steps which are shown in Table 111 of Case B (i.e., identical to the steps shown in Table X of Case A as supplemented by Case B). Thus, these Mode 2 steps involving transfer of buffer G and I values to active registers will not be described here.

As shown at the bottom (steps 96 to 99 in the two columns) of Table XIX herein, at the very end of the Mode 2 operations a control flip-flip QEPZ is either cleared or enabled, in order that the signal QEPZ may be used later for the purpose of modifying end point look-ahead operations. More specifically, during the time step indicated at 97 in either time column of Table XIX, the QEPZ flip-flop is normally cleared, and the number held in SP5 is read into the cleared computer. This latter number is the length of the programmed linear path segment for the next block, or the length of the starting radius for the programmed circular next block. It was stored in SP5 during the operations previously described for the DP12 Mode (Table XIII). Then, on step 98 as shown in Table XIX, the value of the effective tool radius Q is read in the SPQ along with a classification signal cx; and on step 99 the QEPZ flip-flop is set if (i) D or R for the next block is greater than the effective tool radius, (ii) the next block is circular, and (iii) the OM signal exists to indicate that the system is in the envelope offset mode. Thus, the existence of the QEPZ signal after the end of Mode 2 operations signifies that the radius for the next circular block is greater than the effective cutter radius.

Thereafter at step 0699 or 1699 in Table XIX and during Mode 2, the end of block counter is advanced from state S7 to S8, and the system goes into its Mode 3 transfer operations which are similar to those set out and described in Table IV of Case B. The present case Table XVIII Mode 3 transfer operations are also quite similar to those set out in Table XI of Case A, although present Table XVIII shows the transfer of the buffer time factor from TFB to TFA as described in Case B. Moreover, Table XVIII herein shows the manner in which the MODF signal (which as described above was set to a logic 1 or 0 level during DP12 operations) is utilized.

In order not to repeat the transfer operations which are described with reference to Table XI in Case A and Table IV in Case B, it my simply be noted with reference to Table XVIII herein that during time step 38 in Column 3-0600 or Column 3-1600, the value of the programmed feed rate for the next segment to be executed is read from the register FB is the signal $\overline{MODF}$ exists. This means that the programmed feed rate will be used if it is not greater than the circular upper limit value previously computed during the DP12 Mode. But on the other hand, during those same time steps, if the MODF signal exists then instead of the next programmed feed rate from FB, the value of the maximum permissible feed rate for circular path arc is read from the register CULLV. Then, when the number in the answer register is written into FA on step 39, the active feed rate becomes the smaller one of (a) the programmed feed rate from the register FB or (b) the maximum permissible feed rate from the register CULLV. It is a feature of the present invention, therefore, that when circular arcs of relatively small radius are called for by the program, or when a circular arc is internally generated as a result of a programmed fillet radius number which may be relatively small, the feed rate of the system is automatically slowed down (and with the automatic deceleration and subsequent acceleration provided in accordance with the teachings of Case B) if the circular arc would result in axis accelerations which are impossible for the machine tool servos to produce.

It will be realized that pursuant to the operations designated in Table XVIII, the XCEP and YCEP registers are updated to contain the end point coordinates XEP', YEP' for the fillet radius in the example of FIG. 7, because these coordinate numbers were previously stored in the buffer registers XEP and YEP. In addition, however, it is necessary to make similar transfers related to the changing data which are being processed for the auxiliary circular interpolation based upon the effective tool radius. These supplementary Mode 3 transfer operations are designated in detail by Table XV herein which, as indicated in Table XVIII, may be considered as an integral, terminal part of Table XVIII.

Referring to Table XV, a normal Mode 3 transfer of tool radius data involves the steps 3—X666, through 3—X668 and the steps 3—X676 through 3—X678. As shown at 3—X666, when the $\overline{G40}$ signal exists (i.e., envelope offset mode in effect), the quantity QXB is read from the buffer and rewritten as the new value of QXE in the QXE register. The quantities QX and QXB are left unchanged because in the offset mode when $\overline{G40}$ and OM simultaneously exist, the write gates for QX and QXB are not enabled. Similarly it will be seen at steps 3—X676 and 3—X678 that the buffer quantity QYB is read into the computer during normal envelope offset operations and then written as the new value in the QYE register. This merely switches the values of QI and QJ as labeled in FIG. 7 into the QXE and QYE registers so that they will constitute the correct values of the tool radius X and Y axis components when the cutter has moved around to the end point of the next block, i.e., to the end of the fillet in FIG. 7.

On the other hand, if the transition to be executed from one path segment to the next does not involve a programmed fillet and if the transition is such that either a zero velocity transfer or a jump corner transfer is posssible, then certain operations set out in Table XV will be performed during a Mode 3 transfer. More specifically and when ZVX or JCX signals exist, at step ×660, the value of the target end point X coordinate XCP is read into the cleared adder; on step 3—×663, QX is read in additively; and on step 3—×664, the value of QI (previously stored in SP23) is read in subtractively, with the result XCP + QX − QI then being rewritten into the XCP register. This causes the principal interpolation target point XCP coordinate to be "jumped" from its previous value to a new value which corresponds to the starting point for the next block. Similarly, on step 3—×670 the value of YCP is read in, and if a ZVX or a JCX signal then exists, QY is read in additively; the value of QJ (previously stored in SP25) is read in subtractively, with the result YCP + QY − QJ being written back into the YCP register on step 3—×675. This causes the Y coordinate of the target point to "jump" to the value required to define the starting point for the block 2 segment. It will be recalled that when a ZVX or a JCX signal exists, no internal block is required, and the IBA flip-flop is not subsequently set. It should also be noted that on steps 3—×668, 3—×669 and 3—×678, 3—×679, the values for QX and QY are "jumped" to the values QI and QJ if a ZVX or a JCX signal exists. That is, in the first instance the value of QI stored in SP23 is simply read in and rewritten in the QX register as the new number for QX; and similarly in the second case the value of QJ (previously stored in SP25) is read in to the computer and then transferred directly as a new value into the register QY. This causes the values of QX and QY to immediately assume the proper starting values for the next block to be executed when there is a "jump transfer." Thus, Table XV not only makes it clear how the QXE and QYE registers are updated during a normal Mode 3 transfer to an internal block, but it also demonstrates how the principal interpolation target end point XCP, YCP and the QX and QY numbers are jumped to new values either with or without a preceding deceleration to zero.

At steps 3—×683 through 3—×699 in Table XV, certain flip-flops are controlled, and the system is caused to end its Mode 3. More particularly, the flip-flop FRDP is cleared, and it is then reset only if the $\overline{G40}$ and the $\overline{OM}$ signals both exist, i.e., if a G41 or G42 code has been read from the punched tape in a block of data but there has not been a "first rear data process" sequence, so that the flip-flop OM is not yet set. The signal FRDP is employed in the control of the HD counter, as indicated by Table III, and it causes the HD counter during the execution of the very block after entering the envelope offset mode to quickly skip through the DP3–DP8 Modes, thereby only computing the block 1 numbers required for use in the first corner transition. Also, in Table XV for Mode 3 it is seen that the flip-flop OM is enabled (step 3—×685) if a G40 code does not exist, meaning that a G41 or G42 code has been received to call for the envelope offset mode. Conversely, if the G40 code does exist, the OM flip-flop is cleared.

Further, as shown in Table XV for Mode 3, on step 3—×697 the IBA flip-flop signal is enabled if either the FS or the OSS signal exists. From the figures FIG. 6a–m, it will be apparent that an internal block is required if foreshortening is to take place, or if the transition is an outside sharp. Thus, when the system has fully executed block 1 as shown in FIG. 7 and the internal block data are being transferred to active use, the IBA flip-flop is set to signal that an internally generated block constituted by a fillet is being transferred into active storage, and will be executed next. This means, therefore, that block 2 will not be executed until the internal block has been completed and until the IBA flip-flop is cleared. The IBA signal is used in the control of the HD counter as shown by Table III and Chart A.

Once the block 1 has been fully executed, it is necessary to step the HD counter out of its "parked state" which signals DP19. Thus, as shown in Table XV on step 3—×697 if the DP19 signal exists, the HD counter (FIG. 4) is supplied with a pulse (EHD) to make it advance to that state which produces a DP0 signal. Then, on the following time step if the IBA signal exists, the HD counter is immediately advanced to its 01 count state so that the DP01 signal appears. This is done to prevent the tape reader from being restarted as a consequence of the transfer of data into active storage, when that data is for an internal block, and the previously read block 2 data must be retained in buffer storage. Of course, once the HD counter is in its DP01 state, it will thereafter advance to the DP02 state early in the next period ΔT, and with the IBA signal existing, it will thereafter advance quickly to the DP9 state. Thus, when the internal block is active and is being executed, the operations designated for DP9, 10 and 12 will take place.

3. Execution of the Internal Block For FIG. 7 - Circular Interpolation

Finally, in Table XV, the operations which are shown at the bottom of Table IV in Case B are performed, namely, the end of block counter is advanced from state S8 to state S9 so that the system is taken out of Mode 3 and in a shortly following time column (see Table I in Case B or Table VII in Case A) the end of block counter will step forwardly until it reaches its S1 state and the system is placed again in Mode 1. Thus, the system then begins processing the active data for the internal block (which is the fillet arc shown in FIG. 7) and the cutter moves around the arc with its center offset by the distance Q from the fillet surface of the work.

It is during the circular interpolation operations that the quantities QX and QY are dynamically changed so as to always represent the components of an effective tool radius which is perpendicular to the work surface, and thus which may be added to the changing XCP and YCP values in order to establish the location of the tool center, and thus so that the servo command numbers XSC and YSC can be given the proper values to keep the tool center moving along the desired offset path CCP.

Thus, while the internal block is being executed in the example of FIG. 7, the radius for the principal circular interpolation is numerically equal to RF as shown in FIG. 7, and the starting components for that principal circular interpolation are numerically equal to RFI and RFJ (which were transferred first into the IB and JB registers and then to the active I and J registers, see Table XIX). These values will result in the computation of changing values of ΔX and ΔY, and changing values of the active numbers for I and J, as clearly set out and described with reference to Table VIII in Case A. But in addition, it is necessary to "interpolate the effective tool radius," and this is done by operations which are shown in present Table XVI which is to be taken as a supplement to Table VIII in Case A. Referring to the clockwise part path interpolation required for the fillet arc in FIG. 7, it will be seen in Table XVI that Columns 0800B and 1800B are effective, because the CIRC signal (meaning active block circular) is present. This means that after the operations performed in Column 400B of Table VIII in Case A are complete (and they will be understood from Case A), the supplemental steps shown in Table XVI of this case for Column 0800B are performed.

More specifically, during Column 0800B, the values of QY and Q' are first read and multiplied together, and the result shifted in the accumulator four places to the left to properly locate the decimal point. Thereafter, the "remainder" QXR is read in and added, and the sum is shifted to the right four places. The result is a new or updated value of QXΔ based upon the previously changed value of QY, and it is written (step 0886) into the QXΔ register. In this fashion, during the circular interpolation mode, the value of QXΔ progressively changes, and it represents the amount by which the X component of the effective tool radius vector Q must change during each iteration period ΔT as the cutter progresses around the arc shown in FIG. 7. Next, the least significant digits for the new value of QXΔ are written (step 0889) into the QXR register to form a new remainder, and the computer is cleared. Thereafter, the QX value is read in and the QXΔ value read in so that the difference QX − QXΔ is written as a new value in the QX register. This new value can then be used in the operations of Column 1800B where a new value of QYΔ and a new value of QY are computed in an entirely parallel fashion. Therefore, while the principal circular interpolation is taking place in accordance with the operations set out in Table VIII of Case A, the auxiliary circular interpolations with respect to the effective tool radius Q are also carried out. Thus, during successive periods ΔT, progressively changed values of QXΔ and QYΔ (and changing values of ΔX and ΔY) are employed for the servo input number XSC and YSC micromove updating operations which are set forth in Table XVII heretofore described. The resulting micromove updating during each ΔT is performed by adding ΔX and ΔY to the target coordinates XCP and YCP, and the values QX and QY are added to produce values of coordinates on the offset path CCP. Since XSC and YSC are based upon these latter coordinates (plus any machine offsets) the two servo command numbers XSC and YSC progressively change such that the cutter center moves along the offset fillet arc portion of the path CCP, as shown in FIG. 7.

I. Supplemental Data Processing Just After the Internal Block Becomes Active

It will be recalled that just prior to the start of the execution of the internal block for the fillet of FIG. 7 began (i.e., in Mode 3, Table XV), the flip-flop IBA was set. Accordingly, the following ΔT after IBA is set, the HD counter advances from its state one to its state nine as indicated by the control logic of Table III and Chart A.

1. DP9 Mode (Table X)

Referring to Table X and the DP9 Mode, steps 0120 through 0126 are employed to make the values of XCEP and YCEP "jump" to the new end point values for block 2 in those situations where there is an outside sharp transition and a jump corner transfer so that the flip-flop JCX has been previously set as indicated at the end of the DP8 Mode in Table IX. In other words, it is possible to have the IBA flip-flop set even though an outside sharp transition angle of change is so small that it can be "jumped." Thus, at the beginning of Table X it is indicated that the quantity SPXE is read, the quantity QI (previously stored in SP23) is added thereto, the quantity QXE is subtracted from the result, and the final result is written into the register XCEP if the JCX and OSS signals simultaneously exist. Corresponding operations are performed for YCEP during steps 0123 through 0126 in Table X. These operations have no effect in the XRO example of FIG. 7, but are described here to explain how an outside "jump" can occur. When the block 2 end point coordinates are written into XCEP and YCEP, the system immediately begins operating to move the cutter toward those end points, and therefore does not execute the internal block (i.e., the external fillet) for which data had been previously computed and stored.

At steps 0520 and 0521 in Table X, the value of I for the next block (block 2) is put into the register IB. If the transition is not tangent (TANG), then the number held in SPIE is read and written as a new number in IB. It will be recalled from Table IX at step 1968, for the example of FIG. 7, that SPIE holds the value I for block 2 and thus represents the X component of the block 2 linear segment. On the other hand, if the transition is tangent, the block 2 value for I is written from SPI into the IB register. In either case, if the next block is linear (NBC) as in FIG. 7, the value from SPIE or SPI is rewritten (step 0522) into the register SPIE. Thus in the FIG. 7 example, IB and SPIE both hold numbers which in magnitude represent I for block 2, and which can be treated as the X component of "block 1" after block 2 is active and treated as "block 1."

Next, for the tangent case, the value of SPXE − SPI is written into Scratch Pad SP18.

Next, at steps 0524 through 0528, the value of SPX is first written into the XEP register so that the latter (which originally held the block 2 end point coordinate XEP, but which for purposes of the internal block was temporarily filled with the internal block end point coordinate number XEP') is restored to hold the original block 2 end point coordinate value. Then, the quantity SPXE is read and the quantity XE − I (previously stored in SP18) is subtracted so that the result is written into SPIE as the difference IE = YEP − (XE − I). In an NBC case (like FIG. 8) SPIE now holds the I component of the ending radius vector for block 2.

The steps 0530 − 0532 correspond to the steps 0520 − 0522 except that they deal with the Y axis component values. It may be summarily stated, therefore, that in a non-tangent case the value of J for block 2 in FIG. 7 (previously stored in SPJE) is written as the new number in the buffer JB. The same quantity is written into SPJE. In a tangent case, however, JB and SPJE are caused to hold the J value from SPJ.

The operation for steps 0532 through 0537 correspond to those previously described for 0523 through 0528, and they result in the originally programmed end point coordinate YEP for block 2 being restored to the YEP register, and in the case of the next block being circular, they result in the quantity JE = YEP − (YE − J) being placed in the SPJE register.

At steps 0540 and 0541 in Table X, the old value of R is put in to the RA register so that it will be treated as the block 1 R value when the following block of data is read from the punched tape and presently considered block 2 is treated as block 1.

Without detailing the individual steps involved, because the symbolism in Table X will, by this time, be readily understandable to the reader, it may be noted that during steps 0542 through 0963, the multiplication of Q/R x IE is performed, and the resultant is written into register QXB, if the next block is circular (NBC). This does not apply to the FIG. 7 example. It does, however, create a new value for QXB by the law of similar triangles which (as may be observed from FIG. 8) is the X component of the tool radius when the cutter reaches the end point for block 2, if block 2 is circular.

Similarly, if once the ratio Q/R has been stored in SP7 and SP8 on steps 0792 and 0794, then steps 1120 through 1163 constitute substantially the same operations as steps 0920–0963, except that the product of Q/R × JE is derived and written into QYB on step 1163 if the next block is circular. This means with reference to FIG. 8 that the Y component of the effective tool radius Q when the tool radius is at the end point of block 2 is placed in QYB — if block 2 is circular. This applies to FIG. 8 but not to FIG. 7.

In Table X at 1759–1764, a half quadrant routine is performed to derive a half quadrant code for the angle formed by the components SPIE and SPJE, — with the objective of arriving at a new value of $\theta_a$ which will be the angle along the path at the end of the block 2. At steps 1780 through 1993, the tangent of an angle is formed by a dividing process (JE/IE or IE/JE), with the result appearing in SP7 and SP8 as a mantissa and a characteristic.

This concludes the operations carried out during the DP9 Mode, and since it has been assumed that the IBA signal exists while the internal block of FIG. 7 is being actively executed, then during the next ΔT, the HD counter will advance to count state 10 and the DP10 signal will appear in FIG. 4. Thus, during that particular ΔT, the operations designated for the DP10 Mode in Table XI will be performed.

2. DP10 Mode (Table XI)

Referring to Table XI, it will be seen that during steps 0192 through 1329 an arctan and a develop angle subroutine (heretofore described) are performed with respect to the tangent of the angle previously stored in SP8 and SP7, such angle being formed by the ratio of the quantities IE and JE. These are the components of the path segment or the ending radius for block 2. They will be used as block 1 values after a third block of data has been read in and the present block 2 is treated as block 1. On step 1329, therefore, a new value of $\theta_a$ is written into the THETA$_a$ register. However, as thus far computed, it numerically designates either the exiting angle for a linear block 2 or the angle of the ending radius for a circular block 2. Accordingly, during steps 1330 through 1335, the value of 90° is either added or subtracted to the previously derived angle $\theta_a$, if the next block is circular. Also, the magnitude of $\theta_a$ is compared with $2\pi$ and it is increased by $2\pi$ if originally negative, or decreased by $2\pi$ if originally greater than $2\pi$. The final value of $\pi_a$ thus lies between 0 and $2\pi$, and is stored in the THETA$_a$ register where it is ready for use as indicating the angle of exist from "block 1" during the next sequence of operations after a third block is read from the punched tape and the presently considered block 2 becomes considered as "block 1."

Finally, on step 1399 the flip-flops FS and OSS are cleared, so they cannot cause IBA to be set again when in Mode 3 (Table XV) the block 2 data is transferred to the active registers.

It will be recalled that the foregoing operations are carried out while the IBA signal exits and the internal block of FIG. 7 is being executed. When the DP10 Mode computations are finished, then the control reflected by Table III and Chart A causes the HD counter to advance through its count state 11 and stop in its count state 12 during the early portion of the following period ΔT. Thus, the operations previously described with reference to DP12 and Table XIII are repeated, so that D or R (for that portion of the block 2 segment which is to be executed after the internal block is finished) is computed. Based upon this D or R (stored in register D), a new time factor is computed and stored in TFB, so that it will be ready for use when the internal block is finished and transfer of data for block 2 to the active registers takes place. If block 2 should be circular, then the computations for CULLV will be made, and the MODE flip-flop will be set or cleared depending upon whether the block 2 feed rate in FB is greater or less than the upper limit value CULLV.

Thereafter at the end of the ΔT in which the DP12 Mode is performed, the control of the HD counter as set out in Table III and Chart A causes that counter to advance rapidly to its DP19 state where it will rest until the next Mode 3 transfer (which will replace the internal block data with the block 2 data in active storage) is completed.

J. Completion of Internal Block and Transfer of Block 2 to Active

The internal block of FIG. 7, namely the fillet, is now being executed by the cutter with "look ahead" to the end point coordinate values disposed in the XCEP and YCEP registers. When that end point is closely approached, the system will go into Mode 2, as previously described, so that some data will be transferred to active; and it will then go into Mode 3 so that the steps here set out in Table XVIII as supplemented by Table XV will again be performed. In consequence, all of the data held in buffer registers and applicable to the block 2 segment will be transferred to the active registers (I, J, XCEP, YCEP), and the execution of block 2 from the end point to the fillet (labeled XEP′, YEP′ in FIG. 7) to the end point of block 2 will begin.

When this occurs, there is a need for additional data defining the next block on the path which follows the segment here designated block 2. Accordingly, it may be noted that at the bottom of Table XV for Mode 3, the IBA flip-flop is cleared on step 3−X696. Then, on step 3−X697 the HD counter is advanced to state zero (DPO) but it is not advanced a second time on step 3−X698. Mode 3 then ends when the end of block counter advances from S8 to S9.

Upon reference to Table I in Case B, however, it may be seen that with the end of block counter in state 9, the punched tape reader is restarted on step 990 as designated in Case B (step 1890 as designated in this case). The gating logic in Case B is such that the tape reader is started by setting flip-flop TRR if the S9 and CYST signals exist. In the present case an additional qualifying signal is used, and the TRR flip-flop is set to start the tape reader if the S9 signal exists, the CYST signal exists and the DPO signal exists (i.e., S0·CYST·DPO). Thus, as block 2 in FIG. 7 begins to be executed, the tape reader will be restarted and a succeeding block of data will be read into the buffer registers. When the reading of that next block of data from the punched tape ends and an EL signal appears, then the tape reader is stopped (as explained in Case B) and the appearance of the EL signal also causes the HD counter to advance (by a gating circuit not here shown). Thus, the HD counter is placed in its DP01 state, and during the early portion of the next ΔT, it will advance to its DP2 state. Therefore, all of the sequences of operations heretofore described will be repeated with the previously designated block 2 now designated "block 1" and the last-read block being designated as "block 2". This last-read block may be either linear or circular, and yet all the operations heretofore described will be carried through in order to determine the nature of the corner transition which will next take place unless modified, to compute the data for an internal block, to execute the internal block, or to decelerate to zero before "jumping" on an inside sharp, or to "jump" around the corner if the transition is an inside or outside sharp under conditions such that slowing down is not necessary.

3. The Example of FIG. 8; Sequential Operations

The example of a LXC transition as shown in FIG. 8 will next be described, although for brevity those things now made clear by the preceding description of FIG. 7 will not be repeated. In treating FIG. 8, it will be assumed that the cutter is moving along the block 1 segment, i.e., block 1 data is being processed in the active registers; that the tape reader has just finished reading block 2 data; and that the HD counter has just advanced to its 02 state so that the DP2 signal has just appeared during the early portion of a period ΔT. It is assumed further that the system is operating in the envelope offset mode, so that G41 and OM signals exist. It will be observed that no fillet (no R word) has been programmed with the block 2 data, so that the NDR flip-flop has not been set. The block 1 data being actively processed calls for a linear path segment, and the block 2 data just read calls for a circular counterclockwise path segment as shown in FIG. 8; and thus the signals G03, NBC, LIN, $\overline{CW}$, $\overline{CCW}$, LXC exist.

A. DP2—(Table IV)

Since the system is now beginning in the DP2 Mode, reference to Table IV will confirm that the flip-flop CCA is not set on step 0121, but the flip-flop CCC is enabled at that time because the next block is circular, and its starting radius has been defined by new values of I and J therefor which have been read into the IB and JB buffers.

The SPR and SPRF registers are intially set to zero (0126 and 0127); the block 2 end joint coordinate XEP is transferred into the SPX register and the end point coordinate YEP is transferred into the SPY register (0130–0132); the X component of the block 2 starting radius is transferred from the IB to the SPI register and the block 2 starting radius Y axis component is transferred from the JB register to the SPJ register (0132–0134).

While the contents of the R register are read during step 0134, they are not written into the SPRF register on step 0135 because the CCA signal does not exist, and the computer is cleared. Then, on steps 0138 to 0139, the G code mode signals are transferred into the MG register where they remain for memory purposes. Steps 0732 through 0734 are not effective when the next block is circular, as is true in the FIG. 8 example.

In the 0700 time column a square root of the sum of the squares subroutine is performed with the values from SPI and SPJ, in order to compute the length of the starting radius R for the block 2 circular segment. The result is written into the SPR register and also the R register on step 1594. The NDR flip-flop is enabled.

Next, the angle at which the starting radius for block 2 lies is determined by first finding the tangent of that angle which is represented by the ratio of the components I and J which are stored in SPI and SPJ. For this purpose, a "half quadrant" subroutine (as previously described) is performed in the 1700 time column of the period ΔT which is in progress. This results in a half quadrant code (according to the diagram of FIG. 5) written into the HQ register on time step 79 of the 1700 time column. For the example of FIG. 8, the starting radius R for the part edge block 2 segment lies at an angle θR which from inspection is roughly 60°, so that the HQ register will now hold a code number of −2. Moreover, the flip-flop FFJ will have been set inasmuch as the starting radius component J is larger than the component I in FIG. 8.

Beginning at step 1784 and continuing through step 1993, a division routine is performed to compute the ratio I/J (or J/I) which is the tangent of an angle, but not the true tangent of θR because the quotient stored in SP7 and SP8 will always be less than 1.00. This completes the DP2 Mode operations, and as explained above, the HD counter will be advanced early during the following period ΔT so that the DP3 Mode begins.

B. DP3—(Table V)

Referring next to Table V and the DP3 Mode operations, initially the angle defined by the ratio I/J is computed by the performance of an arc tan subroutine, and this angle (90° − θR) in radians is written into SP33 on time step 1199. Then a "develop angle" subroutine is performed (as hereinbefore described) in order to compute the true value for the angle θR, whose tangent is J/I (not I/J). The value of θR is written into SP21 on step 1329. It will be observed that the path angle at the start of block 2 is defined by a line which is perpendicular to the block 2 starting radius R, and is thus equal to θR + 90°. The angle of 90° is added at step 1329 when the next block is circular in a CCW direction (NBC is true, but G02 · NBC is not true) so that on time step 1331, the value of the entering path angle θ for block 2 is written into the THETA register.

The number so written may, however, be represented by a negative number or a number which is larger than 2π. Accordingly, during time steps 1331–1336, the presently existing stored number for the angle THETA is sensed and converted into a number which is positive and lies between 0 and 2π.

Beginning at step 1337 the angle 2β is computed as $\theta_n - \theta$, reduced to an angle between 0 and 2π, and written into the 2BETA register on step 1341. 2β, as shown in FIG. 8, represents the angle of change in the direction of the programmed path between block 1 and block 2. On step 1341, the flip-flop FFC is set if 2β is negative, i.e., if the angular transition is in a counter-clockwise direction. This is true in the example of FIG. 8.

It is to be noted that no fillet has been programmed so that the CCA signal does not exist. Thus, on step 1343 there is no comparison made between the tool radius and the fillet radius, but on the contrary, the block 2 radius R is read in on step 1343 and compared with the tool radius Q which has been read from SPQ on step 1342. Then, at step 1345, the flip-flops CCB and FFD are enabled if the tool radius is greater than the block 2 radius. This, of course, is not applicable in the example of FIG. 8, but the setting of the flip-flops CCB and FFD would, if that occurred, result in changing of certain stored numbers and reprocessing the data by beginning the DP2 Mode anew. This has been previously explained, and need not be repeated here.

For the example of FIG. 8 the next pertinent time steps in Table V begin at 1351 when the designated flip-flops are all cleared. Then, on step 1352 one of the four flip-flops XQ, OSS, XR and XRO is set to designate the type of transition which is to be effected between block 1 and block 2. The particular flip-flop which is set depends upon whether or not a fillet has been programmed (CCA or $\overline{CCA}$) and whether or not the transition involves an inside or an outside corner (FFE or $\overline{FFE}$). In the example of FIG. 8, the transition is an inside corner without a fillet and thus the XQ flip-flop will be enabled, designating that the transition is an "inside sharp."

Thus, on step 1353 the flip-flop FS will be enabled to designate that foreshortening of block 1 is required. The example of FIG. 8 is not a tangent transition, and the TANG flip-flop is not set on step 1354 because signal $\overline{FS}$ does not exist.

On step 1356, the 2β angle is read into the computer, and the flip-flop RCW (meaning rotate clockwise) is set if 2β is positive. In the example of FIG. 8, 2β is negative, so that the RCW flip-flop is not set and the $\overline{RCW}$ signal exists from that point forward in time. On step 1358 the RHS flip-flop is set if an outside fillet is called for when the envelope offset mode is G41 (meaning that the cutter is on the left side of the work edge) or if the transition is not an outside fillet and the G42 code exists (meaning that the cutter is disposed on the right side of the part edge). Since neither of these conditions is true in FIG. 8, the RHS flip-flop is not set, and the $\overline{RHS}$ signal thus exists to designate that the center $C_x$, $C_y$ of any fillet (whether programmed or formed by the tool radius) is located on the left hand side of the part edge.

At steps 1360 and 1361, the transition angle 2β is compared against the very small value of .0002 radians, and if the transitional angle 2β is less than that, then the segment transition is treated as tangent by enabling the TANG, and clearing the XR, XRO, XQ and OSS flip-flops. This obviously does not occur in connection with the example of FIG. 8.

At step 1362 the small angle of 0.16 radians (approximately 8°) chosen as an arbitrary constant is compared against 2β. If 2β is less than that, the JCX flip-flop is enabled for an inside sharp transition, and on step 1364 the ZVX flip-flop is enabled for an inside sharp transition (XQ) is $\overline{JCX}$, i.e. if 2β is greater than 0.16 radians. Obviously, the transitional angle 2β in FIG. 8 is larger than about 8°, so that the JCX flip-flop remains cleared, but the ZVX flip-flop is set. The signals $\overline{JCX}$ and ZVX thus now exist. As will be noted later, the ZVX signal will cause the cutter velocity to be reduced from the programmed path velocity to zero as the cutter approaches the foreshortened end point XCEP', YCEP' in FIG. 8—and so that the cutter does not overrun beyond that and remove metal beyond the desired block 2 path segment.

At steps 1550 through 1560, the angle 2β is divided by two and the mantissa is written into SP30 while the characteristic is written into SP18 but only in a LXL case. Thus, β is not required or used in the data processing for an LXC case such as shown in FIG. 8.

It will be recalled from step 1329 in Table V that the angle θR has been written into SP21. On step 1563, θR is read from SP21, and written into SP10.

Next, the angle 2β is classified against π/2 (step 1565); the signal AGB will appear if 2β > π/2, or the signal $\overline{AGB}$ if 2β ≤ π/2. On step 1566, $θ_a$ is read into the cleared computer, and the quantity π/2 is read in on step 1567, but with a subtraction control signal only under certain conditions. The addition represented at step 1566 for the CXL or LXL case does not occur. It will be seen that subtraction occurs only if (i) block 1 is circular counterclockwise with block 2 linear and 2β less than 90°, (ii) block 1 is linear with block 2 circular counterclockwise and 2β less than 90°, (iii) block 1 is circular clockwise with block 2 linear and 2β greater than 90°, and (iv) block 1 is linear with block 2 circular clockwise and 2β greater than 90°. Under any of these conditions, the flip-flop FFC is set.

For the FIG. 8 example, condition (ii) is satisfied, so the subtraction $θ_a$ − 90° occurs, with the sum being written into SP20 on step 1568. The flip-flop FFC is set. The number $θ_a$ − 90° defines the angle θP as labeled in FIG. 8.

During time steps 1570–1573, the previously written number θP is classified agaiηst 2π, and FFD is set of θP is then negative. In FIG. 8 where θP is roughly 25°, this leaves flip-flop FFD cleared, and the $\overline{ALB}$ signal does not exist, so that neither the sx signal nor the 2π signal is read into the adder on step 1572. Therefore, on step 1573 the orginal number written into SP20 as θP is rewritten into Sp20 as an angle between 0 and 2π, which lies at $θ_a$ − 90° as shown in FIG. 8.

It will be recalled from step 1564 in the example under consideration that the angle θR was written into SP10. Then, on step 1573 θR is read and subsequently classified against 2π, and the FFD flip-flop is set if θR is negative. In FIG. 8, θR is positive so that FFD remains cleared, and the classification will reveal that θR is less than 2π so that $\overline{ALB}$ signal required at step 1575 is not present.

Thus, neither the imput number 2π nor the sx control signal shown at step 1575 are produced, and thus the original value of θR is written back into SP10 on step 1576. On that same step, the value of θP is read in subtractively from SP20, and the difference θR − θP, here called θM, is written (step 1577) into SP30. The angle θM is labeled in FIG. 8.

In the 1500 time column the "reduced angle" subroutine RANG is enabled, and its operations are carried out during steps 1582 through 1598. The purpose of this is to reduce the angle θM (which has been written into SP30 temporarily) to a value which lies between 0 and 2π, and at the same time to enter a number into the half quadrant code register which when taken with the reduced $\theta M$ number will indicate the actual direction of a line drawn at the angle $\theta M$. More specifically, it will be seen that on step 1582 the angle previously stored as $\theta M$ in SP30 is read into the cleared computer, and next theh flip-flop FFJ is set if that angle is negative. If it is negative, then the value of $2\pi$ is added in on step 1584 and FFJ is cleared. If the result is still negative, the flip-flop FFJ is set on step 1585. Then, on step 1586, the value of $2\pi$ is again read in (step 1587) subtractively if FFJ is set. But if that result is positive ($\overline{FFJ}$), $2\pi$ is read in along with a classification signal $cx$ on step 1586. The result in the accumulator then has $2\pi$ subtracted from it if FFJ is set and the classification during step 1586 produced an $\overline{ALB}$ signal. The result in the accumulator is $\theta M$ expressed as a value between 0 and $2\pi$. This is written into SP30 on step 1588, and also classified against $\pi$. If $\theta M$ is written in SP30 is greater than $\pi$, the value of $\pi$ is subtracted as a result of the control signal FUL on step 1589. Thus the orginal value in SP30, minus $\pi$, is written back into SP30 on step 1590 if SP30 was greater than $\pi$. Thus, the number held in SP30 now represents $\theta M$ as a magnitude lying between 0 and $\pi$ radians.

One step 1590, the value of 2.0 is read into the computer if the number then held in the computer answer register on step 1588 was greater than $\pi$. Then, the result is written (step 1591) in the HQ register, and the value of $\pi/2$ is read into the cleared computer. On step 1593, the value of $\theta M$ then held in SP30 is read in and classified against $\pi/2$; and next the computer is cleared and the value of $\pi$ is read in. If the value of $\theta M$ in SP30 at this time is greater than or equal to $\pi/2$, that value is read in and added to $\pi$ with unlike sign addition (FUL). And if on step 1596 the result is written into SP30 as a new and corrected value of $\theta M$ lying between 0 and $\pi/2$ radians.

Also on step 1596 the computer is cleared and the number $-2$ read into the computer if the classification performed at 1593 shows that the number then in SP30 was greater than $\pi/2$, and on step 1597 the number in the HQ register is read in with a $\overline{FUL}$ control signal, forcing like sign addition. Accordingly, on step 1598, either the orginal number in HQ, or a negative 2 plus the absolute value of the original number is written back into the HQ register so that the latter is set to hold a quadrant code of 0, $-2$, $+2$ or $-4$. The meaning of these codes has been set forth earlier.

This completes the operations in the DP3 mode for the example of FIG. 8, and it will be realized that the Scratch Pad S30 now holds a decimal number which represents the magnitude of THETA M when the latter is considered as an angle between 0 and $\pi/2$, and the HQ register holds a code which designates the quadrant in which $\theta M$ actually lies. That is the end result of the "reduce angle" sub-routine RANG. In the fashion previously described, the HD counter and decoder of FIG. 4 will be advanced to produce DP4 signal early during the following $\Delta T$, and therefore the DP4 mode shown in Table VI with begin to be carried out.

C. DP4 (Table VI)

At the beginning of the DP4 Mode, an E Cos signal is produced to set a Cos flip-flop and the computer then functions to calculate the cosine of the angle which is read into the computer on step 0153. That angle, as read from SP30, in the example of FIG. 8 is $\theta M$ and at the end of the cosine routine, the cosine of the angle $\theta M$ is written into SP33 on step 1199.

There follows a multiplication routine in which the Cos $\theta M$ is multiplied by the radius R in order to obtain the length of the line P labeled in FIG. 8. More specifically, on step 1331 an emx signal is fed to the computer to establish a multiplication mode, and on steps 1332 and 1334 (in the LXC case for FIG. 8) the value of the starting radius R for the block 2 segment is read from SPR and the value of cos $\theta M$ is read from SP33. The product $P = R \cos \theta M$ is written into SP19 on step 1368.

On step 1368, the signal XQ is present so the effective tool radius Q is read from SPQ. On that same step, the sx control signal appears because the condition $\overline{RHS} \cdot FFC$ is satisfied in the FIG. 8 example (remember that FFC was set at DP3, step 1567). Thus, Q is subtracted from P then remaining in the accumulator, and the result $P - Q = E$ is written into SP19 on step 1369. From inspection of FIG. 8, E is the perpendicular distance to the "inherent" fillet center $C_x$, $C_y$ from a line which passes through $R_x$, $R_y$ and is parallel to the block 1 path segment RA.

On step 1369, the computer is cleared and the starting radius R is read from SPR. The effective tool radius Q is next read additively from SPQ, but with a subtract signal $sx$ if $G03 \cdot \overline{RHS}$ or $G02 \cdot RHS$. Thus, the result of $R \pm Q$ is obtained, and it will be seen that the subtraction operation is actually performed because in FIG. 8 the transition is not circular-to-linear ($\overline{CXL}$), block 2 is circular counterclockwise (G03) and the fillet radius center $C_x$, $C_y$ is on the left side of the part edge ($\overline{RHS}$). Therefore, on step 1371 the value of the vector V is labeled in FIG. 8 has been determined as $R - Q$ and it is written into the SPVV register. It may be noted in FIG. 8 that the distance from $R_x$, $R_y$ to the point labeled XEP', YEP' is R, so the distance V from $R_x$, $R_y$ to $C_x$, $C_y$ clearly $R - Q$.

The division operation shown for steps 1380 through 1596 in Table VI does not occur in the FIG. 8 example because the LXL signal is not present, so the register SPVV continues to hold the value of V as labeled in FIG. 8. This ends the DP4 Mode, and DP5 next begins.

D. DP5 Mode (Table VII)

In the DP5 Mode at steps 0320 to 0322 a number is computed and stored in SPVA. The VA number is used only for a CXC case, and thus it need not be considered for the LXC example in FIG. 8.

At steps 13xx through 1394 in Table VII, a division is performed wherein the two numbers read in on steps 1380 and 1384 are the value of $E = P - Q$ from SP19 (because of the control signals $\overline{CXC} \cdot \overline{LXL}$) and V from the register SPVV. The resulting quotient has its mantissa written into SP12 on step 1592 and its characteristic written into SP13 on step 1593. Thus, the ratio of E/V is now computed and stored. From inspection of FIG. 8, E/V is equal to cos $\theta G$.

On steps 17xx through 1794 of Table VII another division operation is performed. It will be seen that the two numbers read in are the fillet radius RF from SPRF (which is zero in the FIG. 8 example) and RA from SPRA. Therefore, the ratio of RF/RA = 0 is stored in SP16 and SP17, for the example of FIG. 8, but is not later used.

This completes the DP5 Mode operations, and during the next time period $\Delta T$ the DP6 Mode operations (Table VIII) are performed.

E. DP6 (Table VIII)

As there shown, the characteristic and mantissa of the ratio $E/V = \cos \theta G$ are respectively read from SP13 and SP12 and transfered into SP8 and SP7 in order to prepare for the performance of an arc cos sub-routine.

Then, during the 0100 time column an arc cos sub-routine is performed with the cosine of $\theta G$ being read in from SP8 and SP7 on time steps 0180 and 0181. Although the details of the successive individual calculations are not here shown, and are familiar to those skilled in the computer art, a converging series of computed and the angle whose cosine is represented by the number held in SP7 and SP8 is written in radians into the SP33 register on step 1361.

At steps 1532 and 1533 in Table VIII, the value of $E = P - Q$ is read in from SP19, and the flip-flop FFD is set if this value is positive. This value is positive in the example of FIG. 8, so that FFD is set.

Next in point of time at step 1542, the value of $\pi/2$ is read into the computer and then classified against the value of $2\beta$ during step 1544. In the FIG. 8 example $\pi/2$ is greater than $2\beta$ so that signals of AGB and $\overline{ALB}$ are produced by the computer. Then the computer is cleared and the value of $\theta G$ is read in from SP33. On this same step 1545, the adder input trunk is made negative (AIM) only if one of a large plurality of conditions (as set out in Table VIII) exists. Recalling that at the present time the FFD signal exists, the $\overline{ALB}$ signal exists, the G03 signal exists, the G02 signal does not exist, the $\overline{RCW}$ signal exists, and the LXC signal exists but the CXL signal does not exist, a moment's inspection will reveal that none of these conditions specified to produce the "drive adder input minus" signal AIM on step 1545 is satisfied. Thus the value of $\theta G$ is read into the computer with its normal or positive sign during step 1545.

Then, on step 1546, the value of $\theta P$ is read into the computer additively from SP20, so that the computer accumulator holds $\theta G + \theta P$.

One step 1547 the value of $-\pi$ is read into the computer only if one of a large plurality of conditions exists. Since, as noted above, the FFD signal exists, and all of these conditions require $\overline{FFD}$, the value of $-\pi$ is simply not read in. Accordingly, on step 1548 the sum $\theta G + \theta P$ is written into SP30 where it represents the value of the angle $\theta V$ (see FIG. 8).

In Table VIII at steps 1550–1554, the operations are only for the LXL case and may be ignored with reference to FIG. 8.

In time column 1500 of Table VIII and beginning at step 1582, a "reduce angle" RANG sub-routine is performed to reduce the angle $\theta V$ held in SP30 to value between 0 and $\pi/2$, with a quadrant code being stored in the register HQ. This sub-routine has been previously described. At step 1596, $\theta V$ is written into SP30 again as a value in radians between 0 and $\pi/2$ and a quadrant code is written into HQ.

In the 1700 time column for DP6, a division routine is carried out, with Q being read from SPQ as the numerator on step 1780 and R being read in from SPR as the denominator on step 1784. The ratio or quotient Q/R is written in mantissa plus characteristic form into SP10 and SP11 on steps 1992 and 1994, and is ready for later use.

This completes the operations performed in the DP6 Mode and thus the DP7 Mode of processing will be effected during the following period $\Delta T$.

F. DP7/8 (Table IX)

During the first portion of the DP7 Mode as shown in Table IX, the component VI is computed and stored in Scratch Pad SP20. That is, a COS sub-routine is enabled, the value of $-\theta V$ is read in on step 0153. On step 1199 the cosine of $-\theta V$ (which is equal to the cosine of $+\theta V$) is written into SP33.

Briefly stated, during steps 1321–55 the multiplication of $V \cos \theta V$ is performed to derive the value VI which is stored in SP20 on step 1355.

During steps 1360 through 1364, the value of VI is read from SP20 and the stored quadrant code from HQ is used to confirm, or if necessary to change, the sign of VI. Thus, on step 1364 the value of VI is rewritten into SP20 with its proper sign (which in FIG. 8 will be positive).

The operations at steps 1370–80 have been previously described, and it will suffice to note that in the LXC case of FIG. 8, the coordinate value XCEP is read in from SPXE, and the value I is subtracted by reading it from SPI. The difference XCEP − I represents the value of the X coordinate $Rx$ for the center of the block 2 circular arc. This value $Rx$ is added to VI from SP20 on steps 1373 and 1374, and the result $VI + Rx = C_x$ is written into SP14 on step 1376. Thus, for the LXC case of FIG. 8, SP14 now holds the coordinate $C_x$ of the cutter center when the latter reaches a position tangent to both programmed block 1 and block 2 path segments.

At steps 1377 and 1378 in the LXC case, the quantity JE is written into SP21, this being the Y axis component of either the linear path segment for block 1 (as in FIG. 8) or the starting radius for a circular block 1. The operations for steps 1379 and 1380 in Table IX are effective only in the LXL case and do not apply to FIG. 8.

Of course, at steps 1370–1380 for the DP8 Mode the same operations are performed with respect to Y axis quantities, and thus on DP8 step 1372 the value of the coordinate Ry is written into SP19, on DP8 step 1376 the value $C_y$ is written into SP15, and on DP8 step 1378 the value IE is written into SP21.

Next, on steps 1341 through 1558 of the DP7 Mode, the multiplication of Q (from SPQ) and $\cos \theta V$ from SP33 is performed to compute the value of $QI = Q \cos \theta V$ which is written into SP32 on step 1558. In the DP8 Mode, the multiplication is $QJ = Q \sin \theta V$ which is written into SP32 on step 1558.

On steps 1561 through 1598, a further multiplication routine is performed. The value of starting block 2 radius R is read in from SPR, and the value of $\cos \theta V$ is read in from SP33 so that the product $R \cos \theta V = RI$ (recalling that $V + Q = R$) is written into register SP31 on step 1598. Of course in the DP8 Mode, SP33 holds $\sin \theta V$ and in this case SP31 will be conditioned to hold the quantity RJ as labeled in FIG. 8.

At steps 1720 through 1757, another multiplication routine is performed. However, in the inside sharp case which is the example of FIG. 8, the product which is written into SP33 on step 1757 is not later used, so this entire multiplication can be here ignored.

At steps 1760 through 1797 for DP7, a multiplication routine is performed wherein the ratio of Q/R stored in SP10 and SP11 (see DP5, steps 1992, 1994) is read into the computer, converted into decimal form and then multiplied by the quantity JE from SP21, the product being written into SP35 on step 1797, —but not written into SP32 because neither of the conditions $\overline{NBC}$ (or $\overline{FS} \cdot NBC$) holds true for the FIG. 8 example. The product thus stored in SP35 is not subsequently used in the example of FIG. 8 and it can be ignored. And because the number stored in SP32 is not changed, it continues to hold the value of QI or QJ stored therein on previous step 1558 in the DP7 or the DP8 Modes respectively.

Steps 1920 through 1923 involve sign control of the number stored in SP35, and which is not subsequently used for the FIG. 8 example.

From step 1923 through 1929, the signs of the numbers stored in SP33 and SP35 are controlled, and the details will not be related here since they have been discussed above. The sign control of the SP35 and SP33 numbers is of no significance in the FIG. 8 example.

At steps 1930 through 1940 in the DP7 and DP8 Modes of Table IX, further sign adjustments are made, as may be required, but these will be self-explanatory. Thus it may be noted simply that on step 1934 in the DP7 or the DP8 Mode, SP31 holds RI or RJ as those distances are labeled in FIG. 8, where it will be apparent that they are the X and Y axis components of a radius, drawn to the block 2 circular part edge path at a point where the joining fillet ends. In other words, the quantities RI and RJ are the components of the starting radius for block 2 in FIG. 8 after the block 2 segment has been "foreshortened" as a consequence of the fillet which is left inherently by the radius cutter making an inside sharp transition between block 1 and block 2 segments. Further, after step 1940 in the DP7 or the DP8 Mode the registers SP32 holds the correctly signed values of QI and QJ, which are the X and Y axis components of the effective cutter radius Q at the time that block 2 will begin to be executed after foreshortening block 2. Moreover, after step 1940 in the DP7 or DP8 Modes, the register SP21 will respectively hold the quantities JE or IE. Also, the registers SP18 and SP14 will respectively hold the coordinate values $R_x$ and $C_x$ during the DP7 Mode; and the registers SP19 and SP15 will respectively hold the coordinate values $R_y$ and $C_y$ in the DP8 Mode.

The operations shown at steps 1940 through 41 of Table IX are not performed for the LXC example of FIG. 8, except that upon step 1941 the value of QI or QJ is read in from SP32 in the DP7 or the DP8 Mode. Thereafter, QI is written (steps 1942 and 1943) into both the QXB and the SP23 registers, and the value QJ is written into both the QYB and SP25 registers.

At step 1945, the operations are begun for computing the artificially shortened block 1 end coordinate XCEP'. From inspection it will be seen that during the DP7 Mode the value $C_x$ is read in from SP14, and the value of QXE is read in from QXE register along with a subtraction control signal on step 1946. The result which is $C_x - QXE$ is written into the XCEP register on step 1947, and it will be seen from FIG. 8 (recalling that QXE is a negative number) that this newly written value is the artifical or foreshortened XCEP' coordinate as labeled in FIG. 8. Similarly, in the DP8 Mode the value $C_y$ is read from SP15, and the value QYE for block 1 is read from the QYE register subtractively so that the foreshortened or artifical block 1 end point coordinate YCEP' is written into the YCEP register on step 1947.

The I and J values in IB and JB are written to zero value on step 1951 in the DP7 and DP8 Modes because $\overline{OSS} \cdot \overline{XQ}$ is not true for FIG. 8 on step 1950. This differs from the FIG. 7 example in which the starting radius components for the internal fillet radius block were placed in IB and JB, and is in preparation for either an OSS transition by successive iteration, an OSS "jump," or an XQ transition with JCX or ZVX.

At steps 1960 through 1962, operations are carried out to compute the value of the new block 2 part edge starting coordinates, or more particularly the end point coordinates for the fillet created by the cutter when it is in the position shown by FIG. 8. Inspection of the designations in Table IX will show that the values of $C_x$ or $C_y$ are read from SP14 or SP15 during the DP7 or DP8 Mode, and the subtractions $C_x - QI$ or $C_y - QJ$ are performed in order to compute the values of the coordinates XEP' or YEP'. These values are written into the XEP and the YEP registers (and also into the SPXE and SPYE registers) on step 1962. Thus, block 1 will be terminated at the point XCEP', YCEP' sooner than called for by the regular programmed data read from the punched tape, and an artificial end point XEP', YEP' is now in buffer storage.

The steps in Table IX at 1966 through 1968 have been previously described. In the case of FIG. 8, however, the value read into the cleared computer on step 1966 (because of the qualifying signals $\overline{OSS} \cdot NBC$) is RI from SP31 during the DP7 Mode or RJ from SP31 during the DP8 Mode. During the DP7 Mode this RI value is written into Scratch Pad 40. But then, during the DP8 Mode, Scratch Pad 40 is written into the register SPIE, and the value of RJ is written into SPJE. These registers thus hold numbers representing RI and RJ as labeled in FIG. 8; but these represent the components of the starting radius for block 2 when the latter begins to be actively excuted.

The operations described at steps 1970 through 1980 have been described above, and will not be again treated in detail here. It will suffice to note that the flip-flop JCX is enabled for an outside sharp transition if the largest transitional change along either axis, in moving from the block 1 ending tool radius position to the block 2 starting point tool radius position, is smaller than a predetermined distance (represented by .002 PVC).

Also, the segment mode signal G02 or G03 is created to apply for any "internal block" to be executed, and in the FIG. 8 example the signal G03 will thus appear — although because ZVX has been signaled beginning at DP3, a circular internal block is not actually executed, as will appear below.

In the examples of FIG. 8 the transition is "inside sharp" (XQ) and a zero velocity transfer is called for as a consequence of the ZVX flip-flop being set during the DP3 Mode. It has been explained, however, that when the ZVX signal appears, the active data for block 1 is manipulated in a fashion fully explained by Case B such that the cutter is decelerated to a zero path velocity as it reaches the foreshortened block 1 end point called XCEP', YCEP'.

When the cutter is so decelerated to a zero velocity, it is not necessary to consume successive iteration periods ΔT in order to "rotate the cutter radius" around the corner for an inside sharp transition. And similarly, for an outside sharp transition, if the path angle change is very small, or the tool radius is very small, or the programmed path feed rate is very small, it may not be necessary to "rotate the cutter radius" during successive ΔT's in order to end up with the proper new values for QX and QY before the execution of block 2 begins. Accordingly, when either a zero velocity transfer (ZVX) or a jump corner transfer (JCX) is found to be feasible by the detection described heretofore, and either the JVX or the ZVX flip-flop is set during the DP3 or DP8 Mode, then the execution of the computed "internal block" is simply skipped, and the proper new values for the tool radius components QX and QY are forced into the system so that the execution of the programmed block 2 can begin almost immediately.

It will be observed from Table III and Chart A that when the ZVX or the JCX flip-flop has been set, then at the conclusion of the DP8 Mode, the HD counter is controlled so that it causes the DP9 and the DP10 Modes to be carried out during the following two iteration periods ΔT. Thus, DP9 and DP10 are not skipped (as for the FIG. 7 example) in the example of FIG. 8. After the DP8 Mode is finished the system goes into the DP9 Mode.

G. DP9 Mode (Table X)

The operations shown in Table X have been previously described, but it may be noted briefly here that since the computed internal active block (which will not be executed by successive iterations) is circular counterclockwise, the signals G03 and NBC will exist on time step 0538 in Table X. On steps 0520–21 and 0530–31 in the $\overline{TANG}$ case, the registers SPIE and SPJE which were set (on steps 1967, 1968 in DP8) to hold RI and RJ (shown in FIG. 8) have their contents transferred to registers IB and JB. Thus, the components of the block 2 starting radius (from Rx, Ry to XEP', YEP' as shown in FIG. 8) are ready to be transferred to active registers. The "next block" will not be an internal block but the foreshortened block 2.

It will be apparent that the orginally stored X coordinate end point value XEP for block 2 will be read from register SPX on step 0524 and written into the XEP register (replacing the number XEP') so that it is ready for transfer to active register XCEP during the next Mode 3 operations. The same number is written into register SPXE. Then, Rx is read subtractively from SP18 on step 0527 and the difference XEP − Rx = $IE_{new}$ will be written into the register SPIE so that the latter register will contain a number representing the X component of the ending radius when block 2 data is transferred to active storage (and after which block 2 is treated as block 1).

In like fashion, at steps 0534 through 0537 in Table X, the orginal end point coordinate YEP for block 2 is read from SPY and placed in the register YEP as well as the register SPYE. By subtraction of the coordinate value Ry previously stored in SP19, the correct value YEP − Ry = $JE_{new}$ is written into the register SPJE to represent the Y axis component of the ending radius for the block 2 segment. This is the value labeled $JE_{new}$ in FIG. 8.

At steps 0540 and 0541, the value stored in SPR is transferred to SPRA, where it will represent the radius $RA_{new}$ of the active "block 1" after block 2 has been transferred into the active registers and is being executed, and therefore is being treated as block 1.

Beginning at step 0542 in Table X, the ratio Q/R of the effective tool radius Q (read from SPQ) to the block 2 programmed radius R (read from SPQ) is computed by a division routine, and then multiplied by the number held in the register SPIE (such number being $IE_{new}$). By the law of similar triangles, this computes the X axis component QXB of the tool radius which will exist when the tool periphery reaches the block 2 end point XEP, YEP. The product QXB = Q/R × IE is written into SP1 on step 0956. Its sign is left alone or correctively reversed according to the sign of the $IE_{new}$ number stored in SPIE aas well as the direction of rotation for the now active circular block and the G41 or G42 code. This number is therefore written with the correct sign into the QXB register on step 0963 in readiness to serve as the new QXE number when the block 2 data are transferred to the active registers. Similar operations are carried out at steps 1120 through 1163 of Table X so that the QYB register receives a new number representing the Y axis component of the effective tool radius which will exist when the tool reaches the end point of block 2, this number in QYB being properly computed so that it can be transferred to the QYE register when block 2 becomes active.

Beginning at step 1759 the ratio of IE to JE (which are the components of the ending radius for block 2) are used in a "half quadrant" sub-routine so that a half quadrant code is stored in the HQ register for the angle which that ending radius makes with the X axis. Then, beginning at step 1780 in Table X the tangent of that angle (but in a form for an angle of less than or equal to 45°) is computed and stored in characteristic plus mantissa form in Scratch Pad registers SP7 and SP8. This completes the DP9 Mode operators and during the following ΔT, the DP10 operations will be carried out.

H. DP10 Mode (Table XI)

As noted previously with respect to Table XI, the DP10 operations invole an arctan sub-routine to compute an angle whose tangent is represented directly or indirectly by the ratio IE/JE or JE/IE stored in SP8 and SP7. A "develop angle" sub-routine DANG (details previously given) results in that angle being written into $THETA_a$ on step 1329 as a value between 0 and 2π. On step 1330, π/2 is added, but it is subtracted if the G02 signal exits to indicate next block clockwise. Then, at step 1331–1334 2π is added if the previous result is negative, or 2π is subtracted if the previous result was positive and greater than 2π. The result is the new angle $θ_a$ written as a value between 0 and 2π into the $THETA_a$ register on step 1335. This is $θ_{a\ new}$, as labeled in FIG. 8, ready for use as the departing path angle for the block 2 segment after the succeeding block of data has been read from the punched tape and block 2 is the active block then treated as block 1. Observe that on the final DP10 step 1399, flip-flops FS and OSS are cleared, so later during the next Mode 3 operations IBA will not be set and the "internal block" will be skipped.

I. DP12 Mode (Table XIII)

After the operations in the DP10 Mode have been completed, the HD counter in FIG. 4 is advanced (see Table III and Chart A, recalling that a ZVX signal exists) to its twelve count state, and the operations of Table XIII for the DP12 Mode are carried out with respect to the data then held in buffer storage for the next block following the active block which is block 1 as labeled in FIG. 8. These operations will now be fully understood, and therefore it may be noted briefly with respect to the FIG. 8 example that when D is computed, the values of the block 2 starting radius components (shown in FIG. 8 as RI, RJ and previously stored during DP9 in IB and JB) are read from IB and JB. The value D thus becomes the radius length for block 2 which is next to be transferred to the active registers. The value $Rt$ is computed as $R - Q$, and the CULLV upper limit velocity is based upon that. Then in DP12 (Table XIII) at step 1398, the $\overline{ZVX}$ signal does not exist (because flip-flop ZVX has been set) so the DTZ flip-flop described in Case B is not cleared. As explained in Case B, the cutter velocity is thus decelerated to zero as the cutter approaches the foreshortened block 1 end point XCEP', YCEP' in FIG. 8.

After the operations in the DP12 Mode have been completed, all is in readiness for transfer of the buffer-stored data into the active registers once the artificial end point XCEP', YCEP' for block 1 is closely approached, as detected by the "look-ahead" operations described in Case A with reference to Table IX therein. The system then goes into its Mode 2 operations (as herein previously described with reference to Table XIX) and it thereafter proceeds to go through the transferring operations of Mode 3, as set out and previously described with reference to Table XVIII as supplemented by Table XV.

J. Mode 3 Transfer Operations

Referring only generally to the main Mode 3 transferring operations designated in Table XVIII, the FIG. 8 example results in straightforward transfer of block 2 data, rather than transfer of "internal block" data, because of the numbers previously stored in the buffer registers XEP, YEP, TFB. That is, registers XCEP and YCEP receive numbers representing the block 2 end point coordinates labeled XEP, YEP in FIG. 8. The TFA register receives a time factor number computed during the DP12 Mode as $\Delta T/D$ where D is the radius R for block 2 less the tool radius Q, i.e., $(R - Q)$.

In the supplemental Mode 3 operations of Table XV, at step 3—X660, the servo target coordinate number XCP is read; on step 3—X663 the value QX is read in additively; and on step 3—X664 the SP23 register (which holds QI from the DP7 Mode) is read subtractively. The result $XCP + QX - QI = XCP_{new}$ is written back into the XCP register on step 3—X665. In this way the coordinate active point for the principal interpolation is jumped from XCEP' to XEP' as labeled in FIG. 8, but the cutter center does not move because with the tool at zero velocity and $PVA = 0$ (as explained in Case B), the value Q' is zero and the incremental move $\Delta X$ for the current iteration is zero — and the number XSC does not change.

In a similar fashion at steps 3—X670 to 675 in Table XV, the number in the YCP register is jumped from the value at YCEP' to the value at YEP' as labeled in FIG. 8.

At steps 3—X666 and 3—X668 in Table XV, the QXB number (see FIG. 8) is transferred to the QXE register to represent the X axis tool radius component which will exist when block 2 is fully executed. See the value labeled $QXE_{new}$ in FIG. 8. Likewise at steps 3—X766 and 3—X768, QYB is transferred to QYE.

At steps 3—X668, 9 the SP23 register (holding QI) is read and its contents written into QX because the ZVX signal exits for the example of FIG. 8. Similarly, at steps 3—X778, 9, the SP23 register contents (QJ) are transferred to the QY register. This "jumps" the tool radius (represented by its components) from the line $C_x$, $C_y$ to XCEP', YCEP' (as labeled in FIG. 8) to the line $C_x$, $C_y$ to XEP', YEP'. Thus, the starting values of QX and QY components, for a radius Q normal to the work path at the begiinning of foreshortened block 2, are correctly established in the QX, Qy registers.

At step 3—X696 in Table XV, the flip-flops IBA, JCX and ZVX are cleared (if they were previously set). Thus, the ZVX flip-flop is now reset. The IBA flip-flop is not set on step 3—X697 because flip-flop FS was cleared at the end of the DP10 Mode. Thus, while the HD counter is advanced (by EHD) from its DP19 to its DP0 condition on step 3—X697, it is not advanced a second time on step 3—X698 because $\overline{IBA}$. Therefore after Mode 3 ends, the end-of-block counter is advanced to S9, and the tape reader will be restarted near the end of the current $\Delta T$ — so that the next block of data (to follow block 2 now being actively executed) will be read into the receiving registers. Thereafter all of the foregoing DP Modes and classifications will be repeated — to determine the nature of the next path transition and to effect it as may be required, with or without a programmed fillet. In other words, once block 3 has been read from the punched tape, the operations herein described are repeated, with original block 2 being treated as the current block 1 and the newly read block 3 being treated as the current block 2.

3. Entering or Leaving the Envelope Offset Mode

As noted above, the method of the present invention can be carried out in the numerical control system by including either a G41 or a G42 code in any given block of command information. Without having received such a code, it is assumed that the G40 code exists, and the system will therefore operate in its normal fashion without the effective tool radius envelope offset action. In order to convert the system from opertion in the G40 or non-offset mode into operation in the G41 or G42 envelope offset mode, it is necessary initially to establish X and Y axis component values for a tool radius vector which is perpendicular to the programmed part edge path. As indicated by Chart A, supra, and Table III, when the system is operating in the non-offset or G40 Mode, the HD counter of FIG. 4 is controlled such that only the steps indicated for the DP12 Mode are performed. DP2 through DP11 are rapidly skipped. On the other hand, if the combination of $\overline{OM}$ and $\overline{G40}$ signals simultaneously exist, this means that a G41 or a G42 code has been received with the last-read block of command data, but a transfer of new data into active storage has not yet taken place because, despite the fact that the $\overline{G40}$ signal exists, the OM flip-flop has not yet been set on time step 3—X685 of a Mode 3 transfer (see Table XV). However, when the first transfer after reading a G41 or G42 code does occur, the flip-flop FRDP will be enabled, and then will be cleared when the next transfer transpires. Thus the FRDP signal, standing for "first real data process," exists during the execution of one block of information after an enabling offset code G41 or G42 has been received.

In any event, when the signals $\overline{Om}$ and $\overline{G40}$ simultaneously exist, the Hd counter of FIG. 4 is controlled (as indicated by Table III and Chart A) such that it skips the data process Modes DP2 through DP10 after the reading of the data block containing the G41 or G42 code is completed. The HD counter than stops in its eleven state, resulting in the signal DP11 and causing DP11 Mode operations to occur during one period $\Delta T$. Thus, the DP11 Mode is used only for "entering into" the envelope offset mode of operation.

Referring to Table XII where the DP11 Mode is treated, after the last-read block of data has been received from the tape reader in the reader buffer registers (and this data includes a G41 or a G42 code), the I and J values for the path segment defined by that last-read block of data are written from the IB and JB registers into the Scratch Pad registers SP31 and SP32. This occurs on steps 0120 through 0122. Then, if the block of data also contains a supplementary numerical H word designating a path offset distance which is to be added to the cutter radius diameter (the latter being manually dialed into the system by a machine operator who sets the digit switches 26 of FIG. 1a to signal the actual tool radius Q), the H word is read into an H active register HA on step 0123. This H word number represents a supplementary envelope offset distance which may be employed, for example, to cause a tool first to take a roughing cut along the desired final part edge contour, and thus so that the same overall program tape might be used with an H delete code in order to effect the final finishing cut.

Then, the computer is cleared, the value of Q is read from the digit switches 26 in FIG. 1a, and the value of H is read additively from the active register HA. The sum, representing (Q + H) is written as the total, effective value of Q into the SPQ register during step 0125. Thus, in the entire description which has been set forth above, the number Q which has been referred to as being stored in the SPQ register need not necessarily represent the actual physical radius of a cutter, but it may represent a ficticious radius in order to make the cutter take an offset roughing pass along a programmed part edge path.

During steps 0126 through 0129, the flip-flops FFC and FFD are set if the respective values of I and J for the last-read block of data are negative, as will be apparent from Table XII.

The computer is cleared on step 0129 and a value of zero is written into the registers SPX, SPY, SPI, SPJ — simply for the purpose of clearing them. On this same time step, the programmed end point coordinate XEP for the block in question is read from the XEP register and transferred on step 0131 into the SPXE register. In similar fashion, the end point coordinate YEP is transferred into the SPYE register on step 0132.

Then, beginning at step 0179, a square root of the sum of the squares routine is performed with the values of I and J read from SP31 and SP32. On time step 0194 the result which is equal to $\sqrt{I+J}$ is written into SP30 where it represents the segment path length (herein previously called R or D) for the block of data last read by the tape reader.

During the 1100 time column of Table XII, a division routine is effected by reading in (step 1180) the value of Q from SPQ as a numerator and the value of R (step 1184) from SP30, with the quotient being written in mantissa plus characteristic form in SP7 and SP8 during steps 1392 and 1394. Beginning at step 1520, a multiplication operation is performed by first converting the quotient Q/R to decimal form, and reading in (on step 1523) the value of J from SP32 as a multiplier. The resultant value of Q/R × J is written into SP32 on step 1558.

In similar fashion, the product of Q/R × I is written into SP31 following a multiplication routine which ends at step 1598.

During the 1700 column, the signs of the numbers held in SP32 and SP31 are correctively changed by leaving them alone or reversing them depending upon whether the cutter is to move along the left or the right side of the path (G41 or G42) and depending upon whether the segment components I and J are negative or positive. A moment's study will confirm that this sign control produces final values written into QXB and QYB during steps 1721 and 1723 which are the X and Y axis components of an effective tool radius Q which is disposed perpendicularly to the path segment defined by the components I and J. These values in the QXB and QYB registers are ready for transfer into the QX and QY registers when the next transferring operation occurs. More specifically, it will be seen from Table XV that when the next Mode 3 transfer of data from buffer to active storage occurs, and if the signals $\overline{G40}$ and $\overline{OM}$ simultaneously exist on step 3—X663, then the dynamically updated target position number XCP has subtracted from it the previously computed value of the tool radius component QXB, and a new value of XCP is rewritten on step 3—X665 into the XCP register. Then, the value of QXB is written into the QX register during steps 3—X666 and 3—X667 (if, as assumed, $\overline{G40}$ · $\overline{OM}$), so that QX takes on an initial value and is ready for use in the interpolation sequences previously described.

In like fashion under the condition that the envelope offset mode is being entered (and thus the $\overline{G40}$ and $\overline{OM}$ signals simultaneously exist) the Y axis servo target point number YCP has subtracted from it the Y axis component of the path-perpendicular tool radius stored in QYB (see steps 3—X670, 4, 5 in Table XV); and further, the number held in the QY register is written to agree with the initially computed Y axis component of the cutter radius previously stored in QYB (see steps 3—X676, 7). Thus, the system is ready to begin operation in the offset mode, and during the entire time of such operation the QX and QY numbers will be dynamically changed so that they represent the X and Y axis components of an effective tool radius which lies perpendicular to the programmed part edge.

With reference to Table XV, when the offset mode of operation is terminated (after having been in effect) by the reading of a new G40 code, then the quantities QX and QY then existing must be added to the dynamically changing target end points XCP and YCP toward which the servos are continually moving the tool center. Thus, it will be apparent from time steps 3—X663 and 3—X673 in Table XV that if a G40 code is newly read after the envelope offset mode has been in effect, then the signals G40 and OM will simultaneously exist until the end of the next Mode 3 transfer, and the values of QX and QY will be added to the then existing path coordinate values XCP and YCP, to effectively transfer (or jump) the XCP and YCP values to represent the tool center location. With the signals G40 and OM existing, the registers QX, QXB, QXE, QY, QYB, and QYE are all written to hold zero, as will be apparent from Table XV and the system removed from the offset mode.

5. Modified Look-Ahead Operations to Anticipate End of, and to Terminate, the Active Block Path Segment Reference is made to Table IX in Case A where the "look ahead" operation for detecting the close approach to the end point of a path segment under execution is set out. Case A (see especially Columns 115–118) makes it clear that in order to determine the proper instant at which the system should be converted from its Mode 1 normal interpolation operation into the preliminary Mode 2 transfer operation, it is necessary for the dynamically changing actual position (as represented by the target point XCP, YCP in part coordinates) of the cutter along the programmed path (or more precisely the actual position of the cutter's tangency point with the programmed path) be compared on the fast axis with the stored end point XCEP, YCEP. When, however, circular interpolation is taking place with the envelope offset method here described, it may happen that the commanded position along the path is moving by very small amounts during each $\Delta T$ (or is even remaining stationary) while the auxiliary circular interpolation of the cutter radius (as set forth in Tables XVI and XVII, treated above) is in progress. Indeed, the tool center may actually remain stationary for several iteration periods (because the numbers $\Delta Y$ and $\Delta X$ may be zero) during execution of an internal block segment for an outside sharp while the effective cutter radius Q is being "rotated" by changes $QX\Delta$ and $QY\Delta$ during each $\Delta T$. Therefore, it has been discovered that the "anticipation" of reaching the end point, and the instant in time at which the transfer sequences should begin, can be more accurately determined if the actual position of the cutter radius components is monitored vis-a-vis the values which are to be reached at the end of that block. This is particularly so when the effective cutter radius is larger than the programmed circular path segment radius.

In keeping with one of the advantageous features of the present invention, therefore, provision is made to switch the "look-ahead" operations — as described in Case A with reference to Table IX therein — from the principal interpolation values to the auxiliary interpolation values involving the effective cutter radius and its components.

The selection of which type of look-ahead calculation is performed is controlled by a flip-flop QEPZ which is selectively set or reset during the Mode 2 transfer sequence set forth in Table XIX. Present Table XIX supplements and is basically like Table X in Case A or Table III in Case B. Referring to step 96 for Column 2-0600 or 2-1600 as shown in Table XIX, the flip-flop QEPZ is cleared, and the number stored in SP5 is read into the cleared computer. This number, as indicated in Table XIII, is computed and stored during the DP12 Mode to represent the linear path segment length or the circular path radius length for the block of data held by buffer storage in readiness for transfer and execution. Thus, when transfer of that prepared block of data begins during Mode 2, the value of D or R is read into the computer on step 96 of Columns 0600 and 1600. On the following time step the value of the effective tool radius Q is read from the SPQ register with a classification signal; and on the following step 98, the QEPZ flip-flop is enabled if (i) the next block D or R is less than the effective tool radius Q, (ii) the block of data is for a circular path segment, and (iii) the system is in the offset mode (ALB·NBC·OM). Thus, in essence, the $\overline{QEPZ}$ flip-flop is set whenever a programmed circular arc next to be executed has a radius which is less than the effective cutter radius Q.

Table XIV supplements essentially all of the successive time steps for "look ahead" shown in Table IX of Case A by the shorthand symbolism of asterisks for each of those steps and operations. It will be realized that step 1-0236 in Table XIV, for example, corresponds to the step 36 shown in Table IX of Case A. Thus it will be seen that so long as the flip-flop QEPZ is cleared and the $\overline{QEPZ}$ signal exists, the normal look-ahead operations of Table IX in Case A will be carried out. On the other hand, during those same time steps set out in Table IX of Case A when the QEPZ signal exists, then the look-ahead operations are performed with the quantities which involve the circular interpolation of the tool radius. In essence, the quantity QX corresponds to XCP, the quantity QY corresponds to YCP, the quantity QXE corresponds to XCEP, and the quantity QYE corresponds to YCEP. Likewise, the quantity $QX\Delta$ corresponds to $\Delta X$ and the quantity $QY\Delta$ corresponds to $\Delta Y$. Therefore, if the X axis is the fast axis during steps 1-0036 to 1-0042 when the QEPZ signal exists, a two macromove (actually 1.5 macromove) look-ahead first test is made to compare $QX + 2QX\Delta$ with QXE; and thereafter a second test may be made to compare $QX + 2.5\ QX\Delta$ with QXE. In other words the approaching end of the block segment in progress is made by determining when the auxiliary interpolation changing value QX is about to reach the end point value QXE for that block. Similar operations are conducted if the Y axis is the "fast axis". And in either case, when "look ahead" reveals that transfer to the next block should begin, the end-of-block counter is advanced. From comparison of Table XIV in this case with Table IX of Case A it will be seen, therefore, that the very same sort of look-ahead operations are performed when the QEPZ flip-flop is set (and the effective cutter radius Q is greater than the programmed circular path radius) except that the corresponding quantities associated with the cutter radius are used for the look-ahead operation instead of the quantities associated with generation of the programmed part edge. Therefore, the end of block counter will be advanced from state 1 to state 2, or from state 2 to state 3, in any Mode 1 period $\Delta T$ if the cutter radius quantities reveal that the end point of the active block being executed is about to be reached. In this fashion, the end of block counter causes the system to terminate its Mode 1 operations and to begin the preliminary transfer operations of Mode 2. The end of block counter and its control of the transfer from mode to mode will, of course, be clear from Case A.

RESUME

From the examples of FIGS. 6a-m, and the specific examples of FIGS. 7 and 8 treated in detail, it will now be apparent that the present invention brings to the art of numerical control a full "envelope offset" capability in methods and apparatus by which linear and circular interpolation are effected through iterative operations carried out during successive, equal short time periods $\Delta T$. Completely eliminated is the need for a programmer to know or assume the radius of a cutting tool which will be employed in the machine tool when any given parts program is physically executed in the machine tool. The programmer may prepare data totally in part coordinates. The machine operator need only "dial in" the actual cutter radius. Moreover, the operator may dial in a fictitiously large cutter radius, or the programmer may provide a supplementary offset number H, in order to have the part edge actually machined be uniformly offset from the programmed part edge — either to produce a part which is expanded or shrunk in relation to the programmed part, or to take an initial roughing pass before the final part edge is machined through the use of the same program tape without the supplemental offset.

A fillet of a desired radius may be called for at the junction between any two path segments simply by programming the fillet radius number (R Word) in the block 2 data for the second segment. The method and apparatus as here described will completely generate the necessary data for an internal block, and the connecting fillet will be physically created tangent to both of the two programmed segments.

If no fillet is programmed, an "inside sharp" transition is effected by causing the cutter to leave a fillet tangent to each of the two programmed segments and equal in radius to the cutter radius. In this case, the cutter is automatically decelerated to zero velocity at the end of the block 1 segment and just before execution of the block 2 segment begins, — thereby to avoid requiring impossibly high deceleration or acceleration which the X and Y axis servo drives cannot produce. If transition angle is small enough such that the servos can be "forced" without losing accuracy, then the automatic deceleration to zero is omitted, and the changeable numbers in the active registers are "jumped" at the end of the block 1 segment.

Although to avoid extending the already lengthy description, only two specific examples of LXL and LXC transitions (respectively outside and inside and with and without programmed fillets) have been treated in detail with reference to FIGS. 7 and 8, it will be understood by those skilled in the art that the method and apparatus may be applied equally well to other types of transitions shown by FIGS. 6a–m (and including CXC transitions with programmed fillets, not there shown). The several tables in the present application will make most of the details for LXL inside, LXC outside, CXL inside or outside transitions (and each with or without a programmed fillet) apparent.

By looking back at the foregoing description, one may see the other notable features here brought into being. The nature of a transition is classified as "inside" or "outside" by the processing of signals which represent whether the tool is to move along on the left or right of the path (G41 or G42) and the sign of the transition angle ($2\beta$) in going from one segment to the next. The specific nature of the transition (XQ, OSS, XR, XRO) is determined by the inside/outside classification and the presence or absence of a programmed fillet radius word. Each case is caused to produce different specific data processing steps but in different cases such steps have much in common. Foreshortening is automatically accomplished by the creating and use of artificial end point coordinate numbers and artificial beginning block 2 segment, or beginning radius component, numbers — as required in the XR, XRO and XQ types of transitions. And, very importantly, the dynamically changed numbers representing the coordinates to be reached by the tool center during each iteration period are produced and signaled by a principal path interpolation (linear or circular) and a "cutter radius interpolation", the changes in each during each $\Delta T$ being summed. Yet the programmed path velocity is maintained since the time factor $\Delta T/D$ is computed for circular segment cases as a total radius from the arc center to the tool center, $R + Q$ when the plus or minus sign is used if the cutter is moving respectively along the outside or the inside of the part edge arc.

And among the features just noted, there are others which yield significant advantages. It will now be understood that if a programmed fillet or a block 2 arc is scheduled to have a radius less than the dialed-in tool radius, the programmed data will be rejected and modified — so that a fillet or arc, having a radius equal to that of the cutter, will be formed. Moreover, in a situation where an internally generated or programmed circular segment will result in the X or Y axis component velocity changing at such a high rate as to exceed servo drive acceleration/deceleration capabilities if executed at the programmed feed rate, the effective feed rate is reduced to the safe upper limit value CULLV which is computed as a function of the total radius Rt for the path segment in question. And finally, when a circular path segment is being executed and the programmed radius is less than the tool radius, precision of the "look-ahead" and timing of the transfer sequences is enhanced by comparison of the end point values (QXE or QYE) with the existing but changing values (QX or QY) associated with the auxiliary cutter radius interpolation.

There follow, as an integral portion of the present specification, pages containing Lists A – E and the Tables I – XIX discussed above, and which, as previously suggested, may be temporarily removed from the sequential assembly of specification pages for convenient reference during study of the foregoing detailed description.

LIST A

Buffer Registers To Receive Numerical Words In One Block of Program Data
 XEP ≡ X—Segment End Point, X Coordinate, Blk. 2
 YEP ≡ Y—Segment End Point, Y Coordinate, Blk. 2
 IB—X Component of Blk. 2 Linear Path Segment Or of Starting Radius for Blk. 2 Circ. Path Segment
 JB—Same as IB, except Y Component
 FB—Path Feed Rate, Blk. 2
 G—Mode Designation. Blk. 2
 M—Auxiliary Function Code
 R—Fillet Radius
 H—Path Offset Distance
 PCF—Dialed In Percent Feed Override
 Q—Dialed In Cutter Radius

LIST B

Registers Into Which Numerical Words Can Be "Written" From Computer and From Which Such Words Can Be "Read" Into the Computer
 XCEP—Active Segment End Point, X Coordinate
 YCEP—Active Segment End Point, Y Coordinate
 I—Active X Component of Linear Path Segment Or of Changing X Component of Radius for a Circular Path Segment
 J—Same as I, except for Y Component
 $\Delta X$—X Axis Macromove Per $\Delta T$
 $\Delta Y$—Y Axis Macromove Per $\Delta T$
 XCP—Changing Target Point, X Coordinate
 YCP—Changing Target Point, Y Coordinate
 XOFF—X Axis Offset Between Part and Machine Coordinate Origins
 YOFF—Same as XOFF But for the Y Axis XMP—Changing Target Point, X Coordinate, Machine
YMP—Changing Target Point, Y Coordinate, Machine
XSC—Dynamically Changeable Commanded X Coordinate, Forming Input Command to X Axis Servo Drive
YSC—Same as XSC, except for Y Axis
XR—Remainder Carried Over in ΔX Updating
YR—Remainder Carried Over in ΔY Updating
Q'—Feed Number $Q' = V \cdot \Delta^{T/D}$
TFB—Time Factor TFB = ΔT/D for Next Block
TFA—Time Factor TFA = ΔT/D for Active Block
FA—Commanded Feed Rate for Active Block
D—Block Segment Length for Linear Block or Radius Length for Circular Block in Part Edge Coordinates
PVA—Path Velocity Actual
PVB—Path Velocity Number
PVC—Path Velocity Computed and Desired
SPRA—D or Radius for Blk. 1
SPR—D or Radius for Blk. 2
SPRF—Fillet Radius
SPX—X Coord. End Point for Blk. 2
SPY—Y Coord. End Point for Blk. 2
SPXE—X Coord. End Point for Blk. 1
SPYE—Y Coord. End Point for Blk. 1
SPI—I for Blk. 2
SPJ—J for Blk. 2
SPQ—Envelope Offset = Q +
SPIE—I for Blk. 1
SPJE—J for Blk. 1
SPVV—Vector V
MG—G Code Memory
HQ—Half Quadrant Class. No.
THETA—Entering Angle for Blk. 2
THETA a—Departing Angle for Blk. 1
2 BETA—Angle of Transition (θ—θa)
QXE—Blk. 1 X End Point for Tool Radius
QYE—Blk. 1 Y End Point for Tool Radius
QXB—Next X End Point for Tool Radius
QYB—Next Y End Point for Tool Radius
QX—Tool Rad. X Component (like I)
QY—Tool Rad. Y Component (like J)
QXΔ—Tool Radius X Macromove (like ΔX)
QYΔ—Tool Radius Y Micromove (like ΔY)
RI—X Component of Radius R
RJ—Y Component of Radius R
HA—Path Offset, Active
HR—Active Tool Radius
CULLV—Circular Upper Limit Velocity
SP1—Scratch Pad Register 1
⋮
SP40—Scratch Pad Register 40
QXR—Radius Component Remainer
QYR—Radius Component Remainer
MG—Segment Mode Storage

LIST C

Flip-Flops Controlled By PGA's To Provide One Bit Control Signals For Sequencing Logic
FAX—Fast Axis X
TRR—Tape Reader Run
READ—Read Tape
CYSP—Cycle Stop
CYST—Cycle Start
DPR—Data Process Required
DP—Data Process
DR—Data Ready
VDA—Velocity Difference Ranging
VDB—Velocity Difference Ranging
VDC—Velocity Difference Ranging
VDM—Velocity Difference Minus
DTZ—Decelerate To Zero
TAD—Time to Start Acc/Dec
SAV—Deceleration Control
SAD—Deceleration Control
ANR—New Rate
OM—Envelope Offset Mode
IBA—Internal Block Active
FRDP—First Real Data Process
TANG—Tangent Transition
JCX—Jump Corner Transition
ZVX—Zero Velocity Transition
CCA—Blk. 2 Includes Programmed Fillet
CCB—Blk. 2 Has No Fillet and is Circular
CCC—Blk. 2 has Programmed Fillet and is Circular
CCD—Miscellaneous Control Flip-Flop
FFB—Miscellaneous Control Flip-Flop
FFC—Miscellaneous Control Flip-Flop
FFD—Miscellaneous Control Flip-Flop
FFE—Miscellaneous Control Flip-Flop
FFZ—Miscellaneous Control Flip--Flop
FFJ—J Component > I Component
DVA—Divide Subroutine
HQC—Half Quadrant Subroutine
ATAN—Arc tan Subroutine
ACOS—Arc cos Subroutine
COS—Cosine/Sine Subroutine
DANG—Develop Angle Subroutine
RANG—Reduce Angle Subroutine
SQS—Sq. Root of Sums Subroutine
SQ—Sq. Root Subroutine
FS—Foreshortening Required
XQ—Inside Transition w/o fillet (sharp)
XR—Inside Transition with fillet
XRO—Outside Transition with fillet
OSS—Outside Sharp Transition
RCW—Rotate Clockwise Transistion
RHS—Center on Right Hand Side of Work Path
MODF—Modified Feed Rate
QEPZ—End Point Zoning With Tool Radius Only
NDR—New Data for R
NDI—New Data for I
NDJ—New Data for J
NDX—New Data for X
NDY—New Data for Y
QEPZ—Control Look-Ahead Function
FRDP—First Real Data Process
OM—Offset Mode in Effect

LIST D

Computer Control Signals
sx—Subtract
SAR ≡ SAR1—Shift Answer Right One Place
SAR2—Shift Answer Right Two Places
SAL ≡ SAL1—Shift Answer Left One Place
SAL2—Shift Answer Left Two Places
FUL—Force Unlike Sign Addition
FP—Force Positive
AIP—Make Adder Input Positive
AIM—Make Adder Input Negative
cx—Classify by Comparing A against B
emx—Enable Multiply Routine cmx—Clear Multiply Routine
CONV—Convert no. from char. and mant. to decimal

LIST E

Miscellaneous Control Signals
G01 = $\overline{NBC}$—Linear Blk. 2
G02—C.W. Circular Blk. 2
G03—C.C.W. Circular Blk. 2
G40—Not Envelope Offset Mode
G41—Env. Offset, Cutter Left of Part Edge
G42—Env. Offset, Cutter Right of Part Edge
NBC = (G02 + G03)—Next Block (Blk. 2) Circular
CIRC = LBC = $\overline{LIN}$ = (CW + CCW)—Active Block (Blk. 1) Circular
LIN = $\overline{CIRC}$ = $\overline{LBC}$—Active Block (Blk. 1) Linear
CW—Active Block Circular Clockwise
CCW = $\overline{CW}$—Active Block Circular Counter C.W.
AOTM—Adder Output Trunk Minus
ALB—Classification Result: A less than B
AEB—Classification Result: A equal B
AGB—Classification Result: A greater than B
BRxx—Bit Signals From Auxiliary Answer Register in Computer
CND—Clear All New Data Flip-Flops
CHD—Clear HD Counter to Zero
LXL = $\overline{LBC}$ · $\overline{NBC}$—Linear to Linear Transition
LXC = $\overline{LBC}$ · NBC—Linear to Circular Transition
CXL = LBC · $\overline{NBC}$—Circular to Linear Transition
CXC = LBC · NBC—Circular to Circular Transition

TABLE I
HD COUNTER CODE

| HD Decimal Count | Flip-Flop State | | | | | |
|---|---|---|---|---|---|---|
| | HDA | HDB | HDC | HDD | HDE | HD10 |
| 0 | 0 | 0 | 0 | 0 | 0 | 0 |
| 1 | 1 | 0 | 0 | 0 | 0 | 0 |
| 2 | 1 | 1 | 0 | 0 | 0 | 0 |
| 3 | 1 | 1 | 1 | 0 | 0 | 0 |
| 4 | 1 | 1 | 1 | 1 | 0 | 0 |
| 5 | 1 | 1 | 1 | 1 | 1 | 0 |
| 6 | 0 | 1 | 1 | 1 | 1 | 0 |
| 7 | 0 | 0 | 1 | 1 | 1 | 0 |
| 8 | 0 | 0 | 0 | 1 | 1 | 0 |
| 9 | 0 | 0 | 0 | 0 | 1 | 0 |
| 10 | 0 | 0 | 0 | 0 | 0 | 1 |
| 11 | 1 | 0 | 0 | 0 | 0 | 1 |
| 12 | 1 | 1 | 0 | 0 | 0 | 1 |
| 13 | 1 | 1 | 1 | 0 | 0 | 1 |
| 14 | 1 | 1 | 1 | 1 | 0 | 1 |
| 15 | 1 | 1 | 1 | 1 | 1 | 1 |
| 16 | 0 | 1 | 1 | 1 | 1 | 1 |
| 17 | 0 | 0 | 1 | 1 | 1 | 1 |
| 18 | 0 | 0 | 0 | 1 | 1 | 1 |
| 19 | 0 | 0 | 0 | 0 | 1 | 1 |

TABLE II
HD DECODING

| Decimal State | HD Counter Output Signals | | | Decoder Output |
|---|---|---|---|---|
| HD2 | HDB | $\overline{HDC}$ | $\overline{HD10}$ | DP2 |
| HD3 | HDC | $\overline{HDD}$ | $\overline{HD10}$ | DP3 |
| HD4 | HDD | $\overline{HDE}$ | $\overline{HD10}$ | DP4 |
| HD5 | HDA | HDE | $\overline{HD10}$ | DP5 |
| HD6 | $\overline{HDA}$ | HDB | $\overline{HD10}$ | DP6 |
| HD7 | $\overline{HDB}$ | HDC | $\overline{HD10}$ | DP7 |
| HD7/8 | $\overline{HDB}$ | HDD | $\overline{HD10}$ | DP7/8 |
| HD8 | $\overline{HDC}$ | HDD | $\overline{HD10}$ | DP8 |
| HD9 | $\overline{HDD}$ | HDE | $\overline{HD10}$ | DP9 |
| HD10 | $\overline{HDA}$ | $\overline{HDE}$ | HD10 | DP10 |
| HD11 | HDA | $\overline{HDB}$ | HD10 | DP11 |
| HD12 | HDB | $\overline{HDC}$ | HD10 | DP12 |

TABLE III
CONTROL OF HD COUNTER

| | | | |
|---|---|---|---|
| 0020 | CYST·HDA·HDB·$\overline{HD10}$ | EHD | Advance from 1 to 2 |
| 002x | ($\overline{OM}$+G40)·HDB·$\overline{HD10}$ | EHD 2 to 7 | Advance from 2 to 12 if not in envl. offset mode. |
| 002x | ($\overline{OM}$+G40)·HDE·$\overline{HD10}$ | EHD 7 to 10 | |
| 003x | G40·HDE·HDB·HD10 | EHD 10 to 12 | |
| 0030 | $\overline{OM}$·$\overline{G40}$·HDA·HDE·$\overline{HD10}$ | EHD 10 to 11 | Stop in DP11 for one ΔT if initial move required |
| 0030 | $\overline{OM}$·$\overline{G40}$·HDA·HDB·$\overline{HD10}$ | EHD 11 to 12 | |
| 002x | OM·$\overline{IBA}$·(FRDP+TANG)·HDB·$\overline{HD10}$ | EHD 2 to 7 | Stop in DP9 for one ΔT, then go to DP10, if Int. block not active |
| 002x | OM·$\overline{IBA}$·(FRDP+TANG)·HDD·$\overline{HD10}$ | EHD 7 to 9 | |
| 0020 | OM·$\overline{IBA}$·(FRDP+TANG)·HDD· HDE·$\overline{HD10}$ | EHD 9 to 10 | |
| 002x | OM·IBA·HDB·$\overline{HD10}$ | EHD 2 to 7 | Stop in DP9 for one ΔT, then go to DP10, if int. block is active. |
| 002x | OM·IBA·HDD·$\overline{HD10}$ | EHD 7 to 10 | |
| 0020 | OM·IBA·$\overline{HDD}$·HDE·$\overline{HD10}$ | EHD 9 to 10 | |
| 0020 | $\overline{OM·IBA·FRDP·TANG}$·HDB·$\overline{HD10}$ | EHD 2...7 | Advance from DP2 through DP9 on successive ΔT's |
| 0020 | $\overline{OM·IBA·FRDP·TANG}$·HDE·$\overline{HD10}$ | EHD 7...10 | |
| 001x | OM·$\overline{IBA}$·FRDP· TANG·JCX·ZVX·HDC·HDE·$\overline{HD10}$ | EHD 8 to 10 | Advance from DP8 to DP10 |
| 001x | OM·HDB·HD10 | EHD 10-12 | Advance from DP10 to DP12 |
| 000x | HDB·HD10 | EHD 12 to 17 | Advance from DP12 to DP19 |
| 000x | HDD·HD10 | EHD 17 to 19 | |

TABLE IV
DP2 MODE

| | | | |
|---|---|---|---|
| 0120 | | DP2 CAR, CCCA, CCCC | |
| 0121 | | NDR·DP2 ECCA | |
| do. | (NDI+NDJ)·NBC·DP2 | ECCC | |
| 0126 | | DP2 W/SPR | Set SPR to zero |
| 0127 | | DP2 W/SPRF | Set SPRF to zero |
| 0130 | | DP2 CAR, R/XEP | Read BLK2 X ending coord. |
| 0131 | | NDX·DP2 W/SPX | Write X into SPX, Read Y |
| do. | | DP2 CAR, R/YEP | |

TABLE IV – Continued

DP2 MODE

| | | | |
|---|---|---|---|
| 0132 | | NDY·DP2 W/SPY | Write Y into SPY, Read IB |
| do. | | DP2 CAR | |
| do. | | NDI·DP2 R/IB | |
| 0133 | | DP2 W/SPI | Write I into SPI; Read JB |
| do. | | DP2 CAR | |
| do. | | NDJ·DP2 R/JB | |
| 0134 | | DP2 W/SPJ, CAR, R/R | Write J into SPJ; Read R |
| 0135 | | | |
| do. | | CCA·DP2 W/SPRF, CAR | Read R into SPRF |
| 0136 | | CCA·DP2 CNDR | If fillet, clear NDR |
| 0137 | | DP2 CAR | |
| 0138 | | G01·DP2 R/01 | Read in the G mode number |
| do. | | G02·DP2 R/02 | |
| do. | | G03·DP2 R/03 | |
| 0139 | | DP2 W/MG | Set MG. reg. to G number. |
| 0730 | | DP2 CAR,R/SPX | Read X into adder |
| 0731 | | DP2 sx, R/SPXE | Read XE subtractively |
| 0732 | | NBC·DP2 W/SPI, CAR, R/SPY | Write I = (X−XE) into SPI; Read Y |
| 0733 | | DP2 sx, R/SPYE | Read YE subtractively |
| 0734 | | NBC·DP2 W/SPJ,CAR | Write J = (Y−YE) into SPJ |
| 07xx | | DP2 ENABLE Sq.Root Routine: | ESQS |
| 0780 | | DP2 R/SPI | Read I |
| 0782 | | DP2 R/SPJ | Read J |
| 1594 | | DP2 W/SPR | Write $\sqrt{I^2 + J^2}$ into SPR |
| do. | | NBC·DP2 W/R, ENDR, CSQS | Write $\sqrt{I^2 + J^2}$ into R Reg.; enable NDR |
| 17xx | | DP2 EHQC | |
| xx60 | | HQC CAR,CFFZ,CFFJ,CFFC,CFFD | Clear flip-flops |
| xx61 | | HQC W/HQ | Set HQ Reg. to zero |
| 1762 | | DP2 R/SPI | Read I |
| xx63 | | HQC W/SP1 | Store I in SP1 |
| xx64 | | AT0M·HQC EFFC,CAR | Enable FFC if I is negative |
| 1764 | | DP2 R/SPJ | Read J |
| xx65 | | HQC W/SP2,CX,R/zero | Store J in SP2 |
| xx66 | | HQC CAR | Clear accumulator |
| do. | | AEB·HQC EFFZ | Set FFZ if J = 0 |
| do. | | FFC·AEB·HQC R/4 | Read no. 4 if J = D and I − |
| xx67 | | HQC W/HQ | Set no. 4 into HQ |
| do. | | HQC CAR,R/SP2 | Read J if |
| xx68 | | A0TM·HQC EFFD | Set FFD if J is minus |
| do. | | HQC CAR, R/SP1 | Read I |
| xx69 | | HQC CX, R/zero | |
| xx70 | | HQC CAR | |
| xx70 | | AEB·HQC R/2 | Read 2 if I = 0 |
| do. | | FFD·AEB·HQC R/4 | Read 6 if I = 0 & J is minus |
| do. | | FFC·FFD·AEB·HQC R/2 | Read 2 if I ≠ 0,J positive, I negative |
| do. | | FFC·FFD·$\overline{AEB}$·HQC R/4 | Read 4 if I ≠ 0,J negative, I negative |
| xx70 | | $\overline{FFC}$·FFD·$\overline{AEB}$·HQC R/6 | Read 6 if I ≠ 0,J negative I positive |
| xx71 | | $\overline{FFZ}$·HQC W/HQ, | Write 2,4 or 6 into HQ if J ≠ 0. |
| do. | | HQC CAR,R/SP1 | Read I if I  O |
| xx72 | | AEB·HQC EFFZ | FZZ now indicates if I or J = O |
| do. | | HQC CX, R/SP2 | Read J; classify against I |
| xx73 | | HQC CAR, R/HQ | Read HQ number |
| do. | | ALB·HQC EFFJ | Set FFJ if I<J |
| xx74 | | AEB·HQC R/1, EFFZ | Read 1 if I = J; set FFZ |
| xx75 | | HQC W/HQ, W/BR, CAR | Set HQ = 1 if I = J |
| xx77 | | BR72·AGB·$\overline{FFZ}$·HQC R/−2 | Read − 2 if in 2nd, 4th, 6th or 8th Half Quad. |
| do. | | $\overline{BR72}$·ALB·$\overline{FFZ}$·HQC R/−2 | |
| xx78 | | HQC FUL, R/HQ | Read HQ no. and add |
| xx79 | | HQC W/HQ, CAR, CHQC | |
| 17xx | | DP2 EDVA | |
| 1780 | | FFJ·DP2 R/SPJ | Read J if I>J |
| do. | | FFJ·DP2 R/SPI | Read I if I<J |
| 1784 | Divide Routine | $\overline{FFJ}$·DP2 R/SPI | Read I if I>J |
| do. | | $\overline{FFJ}$·DP2 R/SPJ | Read J if I<J |
| | | DIVIDE ROUTINE; STORE MANT. in SP7 | |
| | | STORE CHAR. in SP8 | |
| | | ↓ CDVA | |
| 1992 | | DP2 W/SP7 | Write quotient I/J or J/I in SP7 and SP8 |
| 1993 | | DP2 W/SP8 | |

TABLE V

DP3 MODE

| | | |
|---|---|---|
| — | DP3 EATAN | Enable arctan subroutine when DP3 starts at step 0020 |
| 0192 | ATAN R/SP8 | Read tan θ char. and mant. |
| 0193 | ATAN R/SP7 | |

Perform arctan subroutine to compute
arctan $m = C_1 m − C_3 m^3 + C_5 m^5 − C_7 m^7 + C_9 m^9$
On later time step 0399, the angle m in radians appears in accumulator as a seven place number x.xxxxxx.

TABLE V—Continued

DP3 MODE

| | | |
|---|---|---|
| 1199 | ATAN W/SP33, CATAN | Write $\theta$ into reg. SP33 |
| 13xx | DP3 EDANG | |
| xx20 | DANG CAR,R/HQ,CFFC | Read half quad code |
| xx21 | DANG W/BR | Write HQ no. into BR |
| do. | A0TM·DANG EFFC, CAR | Set FFC if HQ no. minus |
| xx23 | BR78·DANG R/2$\pi$ | Read 2$\pi$ if HQ no. = 8 |
| xx24 | BR74·DANG R/$\pi$ | Read $\pi$ if HQ no. = 4 |
| xx25 | BR72·DANG R/$\pi \div 2$ | Read $\pi/2$ if HQ no. = 2 |
| xx27 | BR71·DANG R/$\pi \div 4$ | Read $\pi/4$ if HQ no. = 1 |
| xx28 | FFZ·DANG FP/ R/SP33 | Add $\theta$ from SP33, but |
| do. | FFC·DANG sx, | Subtract $\theta$ if HQ no. was −. |
| 1329 | DP3 W/SP21, CDANG | Write $\theta$ as an angle between 0 and 2$\pi$ radians into SP21 |
| 1329 | NBC·DP3 R/$\pi \div 2$ | If next block is circular, add $\pi/2$ if CCW; subtract $\pi/2$ is CW |
| do. | G02·NBC·DP3 sx | |
| 1330 | DP3 CFFC | Clear FFC |
| 1331 | DP3 W/Theta | Write $\theta$ into Theta Reg.; |
| do. | A0TM·DP3 EFFC | Set FFC if $\theta$ is negative |
| 1334 | DP3 CX,R/2$\pi$ | Classify 2$\pi$ against $\theta$ |
| 1335 | FFC·DP3 R/2 $\pi$ | If $\theta$ negative, add 2$\pi$ |
| do. | ALB·DP3 sx, R/2$\pi$ | If $\theta \geq 2\pi$, subtract 2$\pi$ |
| 1336 | DP3 W/Theta,CAR,FP, R/Theta$_a$ | $\theta$ now is expressed as a number greater than zero but less than 2$\pi$. Read $\theta_a$. |
| 1337 | DP3 FUL, R/Theta | Sum = $\theta_a - \theta = 2\beta$ |
| 1338 | DP3 CX, R/$\pi$ | Classify 2$\beta$ against $\pi$ |
| 1339 | ALB·DP3 FUL, R/2$\pi$ | If 2$\beta \geq \pi$, subtract 2$\pi$ |
| 1340 | DP3 CFFC | Clear FFC |
| 1341 | DP3 W/2 Beta | Write 2$\beta$ into reg.2 Beta |
| do. | A0TM·DP3 EFFC | Set FFC if 2$\beta$ is negative |
| 1342 | DP3 CAR,R/SPQ | Read Q number |
| 1343 | DP3 CX,CFFE,CFFB,CCCD | |
| do. | CCA·DP3 R/SPR | Classify Q against R, or |
| do. | CCA·DP3 R/SPRF | Classify Q against RF |
| 1344 | G41·FFC·DP3 EFFE | |
| do. | G42·FFC·DP3 EFFE | |
| 1345 | CCA·FFE·ALB·DP3 EFFD | If Q $\geq$ fillet radius, and inside corner, set FFD |
| do. | G41·G03·CCA·ALB·DP3 ECCB,EFFD | Set CCB & FFD is no fillet, tool rad. greater than |
| do. | G42·G02·CCA·ALB·DP3 ECCB,EFFD | BLK2 radius. |
| 1346 | DP3 CAR | If FED=1, write zero into R |
| 1347 | FFD·DP3 W/R, CNDR | reg. and clear all new data ff's. |
| 1348 | CCB·FFD·DP3 W/IB,W/JB, CNDI, CNDJ | Set I and J to zero |
| 1349 | DP3 R/1.0 | Read 1 into accum. |
| 1350 | CCB·DP3 EGST | Set G mode to G01 |
| 1351 | FFD·DP3 CHD | Clear switch tail counter to zero |
| do. | DP3 CFS,CTANG,CXQ,CJCX, CXR,CXR0,C0SS,CZVX | Clear f-f's |
| 1352 | FFD·DP3 EHD | Set switch tail to state HD01 |
| do. | FFE·CCA·DP3 EXQ | Set XQff if inside sharp |
| do. | FFE·CCA·DP3 E0SS | Set 0SS ff if outside sharp |
| do. | FFE·CCA·DP3 EXR | Set XRff if inside fillet |
| do. | FFE·CCA·DP3 EXR0 | Set XR0ff if outside fillet |
| 1353 | (XR0+XR+XQ)·DP3 EFS | Set FSff if foreshortening required |
| 1354 | FS·0SS·DP3 ETANG | Set TANGff if not foreshortening or O.S.S. |
| | (NOTE: If TANG = 1, skip to DP9 mode; See HD chart) | |
| 1355 | DP3 CAR,CRHS,CRCW | Clear RHS & RCW ff's |
| 1356 | DP3 R/2BETA | Read 2$\beta$ |
| 1357 | A0TM·DP3 ERCW | Set RCW if 2$\beta$ positive |
| 1358 | [(XR0 G41)+(XR0 G42)]·DP3 ERHS | Set RHS if center is to right of pt. edge |
| 1360 | DP3 CX,RI·0002 | Classify 2$\beta$ against .0002 radian |
| 1361 | ALB·DP3 ETANG,CXR,CXR0, CXQ, C0SS | Set TANG & Clear ff's |
| 1362 | DP3 CX,R/0.16 | Classify 2$\beta$ against approx. 8° |
| 1363 | XQ·TANG·ALB·DP3 EJCX | Enable jump if angle is small |
| 1364 | XQ·TANG·JCX·DP3 EZVX | Enable zero velocity if inside sharp |
| 1550 | DP3 CAR,R/2Beta | |
| 1551 | DP3 R/2 Beta | |
| 1552 | DP3 R/2 Beta | Divide 2$\beta$/2 = 5 × 2$\beta$/10 =$\beta$ |
| 1553 | DP3 R/2 Beta | |
| 1554 | DP3 R/2 Beta | |
| 1555 | DP3 SAR1 | |
| 1559 | DP3 W/SP30 | Write $\beta$ into SP30 |
| 1560 | LXL·DP3 W/SP18 | Write $\beta$ into SP18 |
| 1562 | CXL·DP3 CAR,R/Theta$_a$, FP | $\theta_A \pm \pi/2 = \theta_R$ |
| 1563 | CXL·DP3 R/$\pi \div 2$ | |
| do. | CW·CXL·DP3 sx | |
| do. | LXC·DP3 CAR,R/SP21 | $\theta = \theta_R$ |
| 1564 | CXC·DP3 W/SP10 | Write $\theta_R$ into SP10 |

TABLE V—Continued

DP3 MODE

| | | |
|---|---|---|
| do. | DP3 CAR,CFFC,R/2Beta | |
| 1565 | DP3 cx, R/π÷2 | Classify 2β against π/2 |
| 1566 | CXL·DP3 CAR,FP,R/Theta | Read θ or $\theta_a$ |
| do. | $\overline{\text{LXC}}$·DP3 CAR,FP,R/$\text{Theta}_n$ | |
| 1567 | $\overline{\text{CW}}$·CXL·$\overline{\text{AGB}}$·DP3 sx, EFFC | Compute $\theta_p = \theta$ or $\theta_a \pm \pi/2$ |
| do. | G03·LXC·$\overline{\text{AGB}}$·DP3 sx, EFFC | or $2\beta \pm \pi/2$ |
| do. | CW·CXL·AGB·DP3 sx, EFFC | Set FFC if center of R is left |
| do. | G02·LXC·AGB·DP3 sx, EFFC | |
| do. | ___·DP3 R/π÷2 | |
| 1568 | $\overline{\text{CXC}}$·DP3 W/SP20 | Write $\theta_p$ into SP20 |
| 1570 | DP3 CAR,R/SP20, CFFD | Read $\theta_p$ |
| 1571 | DP3 cx,R/2π | Classify $\theta_p$ against 2π |
| do. | A0TM·DP3 EFFD | Set FFD if $\theta_p$ is negative |
| 1572 | $\overline{\text{ALB}}$·DP3 sx, R/2π | Subtract 2π if $\theta_p > 2\pi$ |
| do. | FFD·DP3 R/2π | Add 2π if $\theta_p$ is negative |
| 1573 | $\overline{\text{CXC}}$·DP3 W/SP20 | $0\ 0 \leq \theta_p \leq 2\pi$ |
| 1573 | DP3 CAR,R/SP10,CFFD | Read $\theta_R$ |
| 1574 | DP3 cx, R/2π | Classify $\theta_R$ against 2π |
| do. | A0TM· DP3 EFFD | Set FFD if $\theta_R$ is minus |
| 1575 | $\overline{\text{ALB}}$·DP3 sx, R/2π | Subtract 2π if $\theta_R > 2$ |
| do. | FFD·DP3 R/2π | Add 2π if $\theta_R$ is negative |
| 1576 | $\overline{\text{CXC}}$·DP3 W/SP10,sx,R/SP20 | $0 \leq \theta_R \leq 2\pi$ |
| 1577 | (CXL+LXC)·DP3 W/SP30 | Write $\theta_R - \theta_p = \theta_m$ |
| 15xx | $\overline{\text{CXC}}$·DP3 ERANG | |
| xx82 | RANG CFFJ, CAR, R/SP30 | Read $\theta_m$ |
| xx83 | A0TM·RANG EFFJ | Set FFJ if $\theta_m$ is negative |
| xx84 | FFJ·RANG R/2π, CFFJ | $-\theta_m + 2\pi$ |
| xx85 | A0TM·RANG EFFJ | |
| xx86 | RANG R/2π | If still negative, add 2π; |
| do. | $\overline{\text{FFJ}}$·RANG cx | otherwise classify against 2π |
| xx87 | FFJ·$\overline{\text{ALB}}$·RANG sx, R/2π | If $> +2\pi$, subtract 2π |
| xx88 | RANG W/SP30 | Write $\theta_m$, where $0 \leq \theta_m < 2\pi$ |
| do. | RANG cx, R/π | Classify against π |
| xx89 | $\overline{\text{ALB}}$·RANG FUL, R/π | If $\theta_m \geq$, reduce by π |
| xx90 | $\overline{\text{ALB}}$·RANG W/SP30, | Write $\theta_m$ into SP30, $0 \leq \theta_m < \pi$ |
| xx90 | RANG CAR | |
| do. | $\overline{\text{ALB}}$·RANG R/2 | Read 2.0 |
| xx91 | RANG W/HQ, CAR, R/π÷2 | Set 2.0 into HQ Read π/2 |
| xx93 | RANG cx, SP30 | Classify π/2 against $\theta_m$ |
| xx94 | RANG CAR, R/π | |
| xx95 | $\overline{\text{AGB}}$·RANG FUL, R/SP30 | $-\theta_m$ if $\theta_m \geq \pi/2$ |
| xx96 | $\overline{\text{AGB}}$·RANG W/SP30 | Write $\theta_m$, where $0 \leq \theta_m < \pi/2$ |
| do. | RANG CAR | |
| do. | $\overline{\text{AGB}}$·RANG R/-2 | Read -2 if $\theta_m \geq \pi/2$ |
| xx97 | RANG R/HQ, $\overline{\text{FUL}}$ | |
| xx98 | RANG W/HQ CRANG | Set HQ=0, -2, +2, or -4 |

TABLE VI

DP4 MODE

| | | | |
|---|---|---|---|
| | 0100 | $\overline{\text{CXC}}$·DP4 E COS | Enable COS subroutine when DP4 starts at step 0020, if $\overline{\text{CXC}}$ |
| 0153 | Cosine Subroutine | COS R/SP30 | Read β or $\theta_m$ from SP30 |
| | | Perform cosine routine to compute $\cos\theta = C_0X^0 - C_2X^2 + C_4X^4 - C_6X^6 + C_8X^8$ where X = 2θ/π | |
| 1199 | | COS W/SP33, C COS, CAR | Write Cos θ into SP33 |
| 1331 | | DP4 emx | Enable multiply routine |
| 1332 | | CXL·DP4 R/SPRA | Read RA if CXL |
| 1332 | | LXC·DP4 R/SPR | Read R if LXC |
| 1334 | | DP4 R/SP33 | Read Cos β or Cos $\theta_m$ |
| | | MULTIPLY | |
| 1365 | | cmx | |
| 1368 | | DP4 W/SP19 | Write P = R Cos θ into SP19 |
| 1368 | | $\overline{\text{XQ}}$·DP4 R/SPQ | Read Q |
| do. | | XQ·DP4 R/SPRF | Read RF |
| do. | | (RHS·$\overline{\text{FCC}}$+$\overline{\text{RHS}}$·FCC)·DP4 sx | |
| 1369 | | $\overline{\text{CXC}}$·DP4 W/SP19 | Write P±Q or P±RF into SP19 |
| do. | | CXL·DP4 CAR, R/SPRA | Read RA or R |
| do. | | $\overline{\text{CXL}}$·DP4 CAR, R/SPR | |
| 1370 | | XQ·DP4 R/SPQ | Read Q or RF |
| do. | | $\overline{\text{XQ}}$·DP4 R/SPRF | |
| do. | | (G03·$\overline{\text{RHS}}$+G02·RHS) $\overline{\text{CXL}}$·DP4 sx | |
| do. | | ($\overline{\text{CW}}$·$\overline{\text{RHS}}$+CW·RHS) CXL·DP4 sx | |
| 1371 | | DP4 W/SPVV | Write SPVV = R±Q or R±RF |
| 13xx | | LXL·DP4 EDVA | |
| 1380 | | XQ·LXL·DP4 R/SPQ | Read Q or RF as numerator |
| do. | Divide | $\overline{\text{XQ}}$·LXL·DP4 R/SPRF | |
| 1384 | Routine | LXL·DP4 R/SP33 | Read Cos $\theta_m$ or Cos β |
| 1592 | | LXL·DP4 W/SP7 | Write Q/Cosθ or RF/Cosθ mantis. in SP7 |
| 1593 | | LXL·DP4 CONV | Convert Characteristic |
| 1596 | | LXL·DP4 W/SPVV, CDVA | Write V =Q/M or RF/M into SPVV |

TABLE VII

DP5 MODE

| | | | |
|---|---|---|---|
| 0320 | | DP5 CAR, R/SPRA | Read RA |
| 0321 | | XQ·DP5 R/SPQ | Read Q or RF |
| do. | | $\overline{XQ}$·DP5 R/SPRF | |
| do. | | $(\overline{CW·RHS}+CW·RHS)$·DP5 | |
| 0322 | | LXL·DP5 W/SPVA | Write VA = RA±Q or RA±RF |
| 13xx | | DP5 EDVA | |
| 1380 | | $\overline{LXL}$·DP5 R/SPRF | Read RF numerator |
| do. | | $\overline{CXC}·\overline{LXL}$·DP5 R/SP19 | Read P±Q or P±RF |
| 1384 | | LXL·DP5 R/SPR | Read R divisor |
| do. | Divide Routine | $\overline{CXC}·\overline{LXL}$·DP5 R/SPVV | Read V divisor |
| 1592 | | $\overline{DP5}$ W/SP12 | Write mantissa of quotient |
| 1593 | | $\overline{LXL}$·DP5 W/SP13, CDVA, CAR | Write char. of quotient |
| 1594 | | LXL·DP5 W/SP13, CDVA, CAR | Write char. of quotient RF/R RF/R if LXL or LXC |
| 17xx | | DP5 EDVA | P±Q/V or P±RF/V if LXC or CXL |
| 1780 | | DP5 R/SPRF | Read Rf as numerator |
| 1784 | Divide Routine | CXL·DP5 R/SPR | Read R as denominator |
| do. | | $\overline{LBC}$·DP5 R/SPRA | Read RA as denominator |
| 1992 | | DP5 W/SP16 | Write quotient mantissa in SP16 |
| 1994 | | DP5 W/SP17 | Write quotient char. in SP17 RF/R if CXL RF/RA if LXL or LXC |

TABLE VIII

DP6 MODE

| | | | |
|---|---|---|---|
| 0170 | | DP6 CAR, R/SP13 | Read quotient from DP5, 1593-4 |
| 0173 | | DP6 W/SP8 | Write into SP8 |
| 0173 | | DP6 CAR, CFFZ | |
| 0174 | | DP6 R/SP12 | Quotient from DP5, 1592 |
| 0174 | | DP6 W/SP7 | |
| 0177 | | | Classify against |
| | | $\overline{ALB}$·DP6 EFFZ | |
| 0100 | | LXL·DP6 EACOS | Enable arc cos routine on 0020 |
| 0180 | Arccos Routine | ACOS R/SP8 | Read char. of cos θG |
| 0181 | | ACOS R/SP7 | Read mant. of cos θG |
| | | ARCCOS ROUTINE: Compute Arc Cos m = m =$(C_0-C_1m+C_2m^2-C_3m^3+C_4m^4)\sqrt{1-m}$ | |
| 1361 | | ACOS W/SP33, CACOS | Write θG in radians into SP33 |
| 1532 | | $\overline{DP6}$ CFFD, CAR, R/SP19 | |
| 1533 | | $\overline{A0TM}$·DP6 EFFD | |
| 1542 | | DP6 CAR, R/π÷2 | Read π/2 |
| 1544 | | DP6 cx, R/2Beta | Classify π/2 against 2β |
| 1545 | | DP6 CAR, RSP33 | Read θG |
| do. | | FFD·ALB·G02·RCW AIM $\overline{LXC}$·DP6 | |
| do. | | ALB·G03·$\overline{RCW}$·LXC·DP6 AIM | |
| do. | | FFD·ALB·G02·$\overline{RCW}$·LXC·DP6 AIM | Treat θG as negative |
| do. | | $\overline{ALB}$·G03·RCW·LXC·DP6 AIM | |
| do. | | $\overline{FFD}$·ALB·G03·RCW·LXC·DP6 AIM | |
| 1545 | | $\overline{FFD}$·ALB·G03·RCW·LXC·DP6 AIM | |
| do. | | ALB·CW·RCW·CXL·DP6 AIM | |
| do. | | FFD·$\overline{ALB}$·CW·$\overline{RCW}$·CXL·DP6 AIM | |
| do. | | $\overline{ALB}$·CW·RCW·CXL·DP6 AIM | |
| do. | | FFD·ALB·$\overline{CW}$·RCW·CXL·DP6 AIM | |
| do. | | $\overline{FFD}$·ALB·CW·$\overline{RCW}$·CXL·DP6 AIM | |
| do. | | FFD·ALB·CW·RCW·CXL·DP6 AIM | |
| 1546 | | DP6 R/SP20 | Read θP |
| 1547 | | $\overline{FFD}$·$\overline{ALB}$·G02·RCW·LXC·DP6 R/—π | |
| do. | | $\overline{FFD}$·ALB·G02·$\overline{RCW}$·LXC·DP6 R/—π | |
| do. | | $\overline{FFD}$·ALB·G03·$\overline{RCW}$·LXC·DP6 R/—π | Read in —π |
| do. | | $\overline{FFD}$·ALB·G03·RCW·LXC·DP6 R/—π | |
| do. | | $\overline{FFD}$·$\overline{ALB}$·CW·RCW·CXL·DP6 R/—π | |
| do. | | $\overline{FFD}$·ALB·$\overline{CW}$·RCW·CXL·DP6 R/—π | |
| do. | | $\overline{FFD}$·ALB·$\overline{CW}$·$\overline{RCW}$· CXL·DP6 R/—π | |
| do. | | $\overline{FFD}$·ALB·$\overline{CW}$·RCW·CXL·DP6 R/—π | |
| 1548 | | (LXC+CXL)·DP6 W/SP30 | Write $\theta_r$ for CXL or LXC |
| 1550 | | DP6 CAR, R/Theta | |
| 1551 | | $\overline{DP6}$ R/π÷2 | |
| 1551 | | $\overline{RHS}$·DP6 sx | |
| 1553 | | DP6 R/SP18 | Read θB |
| 1554 | | LXL·DP6 W/SP30 | Write $\theta_r$ for LXL |
| 15xx | | DP6 ERANG | |
| xx82 | | RANG R/SP30 | Reduce angle routine for $\theta_r$ from SP30 |
| xx96 | | RANG W/SP30 | Write $\theta_r$ for LXL |
| 1598 | | RANG W/HQ, CRANG | |

TABLE VIII – Continued

DP6 MODE

| | | | |
|---|---|---|---|
| 17xx | | DP6 EDVA | |
| 1780 | | DP6 R/SPQ | Read Q as numerator |
| 1784 | | | Read R as |
| do. | $\overline{(CXC \cdot FS)} + \overline{FS}$ | DP6 R/SPR | denominator |
| 1992 | | DP6 W/SP10 | Write quotient mantissa |
| | | | Write Quotient char. |
| 1994 | | DP6 W/SP11 | Q/R |

TABLE IX

DP7 and DP8 MODES

| | | | |
|---|---|---|---|
| 0149 | | DP78 E Cos | Enable Cos Routine |
| 0153 | | COS sx, R/SP30 | Read $-\theta_r$ |
| | Cosine Routine | | |
| 0161 | | DP8 R/$\pi \div 2$ | Read $\pi/2$ if DP8 to get sine |
| 1199 | | COS W/SP33, C COS. CAR | Write $\cos\theta V$ or $+\sin\theta V$ |
| 1321 | | DP78 emx | Enable multiply |
| 1322 | Multiply Routine | DP78 R/SPVV | Read V |
| 1324 | | DP78 R/SP33 | Read $-\cos\theta V$ or $+\sin\theta V$ |
| 1355 | | DP78 W/SP20, cmx | Write $V \sin\theta V = VI$ or $V \cos\theta V = VJ$ |
| 1360 | | DP78 CAR, CFFC, R/HQ | |
| 1361 | A0TM·DP78 EFFC | | |
| do. | | DP78 W/BR | |
| 1363 | | DP78 CAR, AIM, R/SP20 | Read VI or VJ |
| do. | $\overline{BR72}$·DP7 AIP | | |
| do. | $\overline{FFC \cdot BR72}$·DP8 AIP | | |
| do. | $\overline{BR74 \cdot BR72}$·DP8 AIP | | |
| 1364 | | DP78 W/SP20 | Write VI or VJ with proper sign |
| 1370 | | DP7 CAR, R/SPXE | |
| 1371 | | DP7 sx, R/SPI | |
| 1372 | | DP7 W/SP18, CAR, R/SPXE | Write XE−I=RX into SP18 |
| 1373 | | DP7 sx, R/SPIE | |
| 1374 | | DP7 W/SP1, CAR, R/SP20 | Write XE−IE=RAX into SP1 |
| 1375 | $\overline{CXL}$·DP7 R/SP18 | | |
| do. | CXL· R/SP1 | | |
| 1376 | | DP7 W/SP14 | Write CX=RX or RAX+VI |
| 1377 | $\overline{NBC}$·DP7 CAR, R/SPJ | | Read J or |
| do. | LXC·DP7 CAR, R/SPJE | | JE |
| 1378 | | DP7 W/SP21, CAR, R/SPXE | Write J or JE |
| 1379 | | DP7 sx, R/SP20 | Subtract VI |
| 1380 | LXL·DP7 W/SP14 W/SP18 | | Write CS into SP14, SP18 |
| 1370 | | DP8 CAR, R/SPYE | |
| 1371 | | DP8 sx, R/SPJ | |
| 1372 | | DP8 W/SP19, CAR, R/SPYE | Write RY = YE − J |
| 1373 | | DP8 sx, R/SPJE | |
| 1374 | | DP8 W/RSP1, CAR, R/SP20 | Write RAY = YE − JE |
| 1375 | $\overline{CXL}$·DP8 R/SP19 | | |
| do. | CXL·DP8 R/SP1 | | |
| 1376 | | DP8 W/SP15 | Write CY=VJ+RY or RAY |
| 1377 | $\overline{NBC}$·DP8 CAR, R/SPI | | Read I or |
| do. | LXC·DP8 CAR, R/SPIE | | IE |
| 1378 | | DP8 W/SP21, CAR, R/SPYE | Write AJ |
| 1379 | | DP8 sx, R/SP20 | Subtract VJ |
| 1380 | LXL·DP8 W/SP15, W/SP19 | | Write CY into SP15, SP19 |
| 1520 | | LXL·DP78 CAR, R/SP13 | Read mant. of RF/R |
| 1521 | | LXL·DP78 CONV, R/SP12 | Read char. of RF/R |
| 1524 | Multiply | LXL·DP78 emx, R/SP21 | Read I or J from SP21 |
| 1540 | | DP78 cmx | RFIE=RF/R·J or RFJE=RF/R·I |
| 1541 | Multiply | LXL·DP78 CAR, R/SPQ | |
| | | LXL·DP78 emx, R/SP33 | QI=Q $\cos\theta V$ or |
| 1557 | | LXL·DP78 cmx | QJ=Q $\sin\theta V$ |
| 1558 | | NBC·DP78 W/SP32 | Write QI or QJ into |
| do. | | CXL·DP78 W/SP35 | SP32, SP35 or SP31 |
| do. | | LXL·DP78 W/SP31, CAR | |
| 1561 | | DP78 emx | |
| 1562 | | NBC·DP78 R/SPR | Read R or |
| do. | Multiply | NBC·DP78 R/SPRF | RF |
| 1564 | Routine | DP78 R/SP33 | Read $\cos\theta V$ or $\sin\theta V$ |
| 1595 | | cmx | |
| 1598 | | $\overline{LXL \cdot CXL}$·DP78 W/SP31 | Write RI = RF $\cos\theta V$ or VI = R $\cos\theta V$ |
| do. | | CXL·DP78 W/SP33 | or RJ = Rf $\sin\theta V$ or VJ = R $\sin\theta V$ |
| 1720 | | DP78 CAR, R/SP16 | Read Mant. of $\dfrac{RF}{R}$ or $\dfrac{RF}{RA}$ [see DP5 1992, 1994] |
| 1721 | | DP78 CONV, R/SP17 | Read Char. of do. |

TABLE IX — Continued

DP7 and DP8 MODES

| | | | |
|---|---|---|---|
| 1724 | $\overline{\text{LXL}}$·DP78 | emx, R/SP21 | Read AI or AJ |
| | LXL·DP7 | emx, R/SPJE | Read JE on DP7 ⎫ |
| | | | if |
| | | | LXL ⎬ multiplier |
| | LXL·DP8 | emx, R/SPIE | Read IE on DP8 |
| | | | if |
| | | | LXL ⎭ |
| 1756 | | ↓ cmx | |
| 1757 | $\overline{\text{CXL}}$·DP78 | W/SP33 | Put RFI or RFJ into SP33 |
| | CXL·DP78 | W/SP31 | do. SP31 |
| 1760 | DP78 | CAR, CFFD, R/SP10 | Read mant of Q/R; see DP6, 1992 |
| 1764 | DP78 | CONV, R/SP11 | Read char of Q/R |
| 1765 | DP78 | emx | |
| 1766 | FS·DP78 | R/SP21 | Read SP21 ⎫ |
| do. | $\overline{\text{NBC}}\cdot\overline{\text{FS}}$·DP7 | R/SPJ | Read J ⎬ Read |
| do. | NBC·$\overline{\text{FS}}$·DP7 | R/SPI | Read I ⎬ Multiplier |
| do. | $\overline{\text{NBC}}\cdot\overline{\text{FS}}$·DP8 | R/SPI | Read I |
| do. | NBC·$\overline{\text{FS}}$·DP8 | R/SPJ | Read J ⎭ |
| 1796 | | ↓ cmx | |
| 1797 | $(\overline{\text{NBC}}+\overline{\text{FS}}\cdot\text{NBC})$·DP78 | W/SP32 | Write QI or QJ into SP 32 |
| do. | FS·NBC·DP78 | W/SP35 | Write QIE or QJE into SP35 |
| 1920 | $\overline{\text{CXL}}$·DP78 | CAR, CFFC, R/SP21 | Read J or JE |
| do. | CXL·DP78 | CAR, CFFC, R/SP20 | VI |
| 1921 | A0TM·DP78 | EFFC | Set FFC is negative |
| 1922 | DP78 | CAR, R/SP35 | Read QIE or QJE |
| do. | FFC·DP78 | sx | |
| 1923 | DP78 | W/SP35, CAR, R/SP33 | Same or reverse sign, Read RFI or RFJ |
| do. | FFC·DP78 | sx | |
| 1924 | DP78 | W/RSP33, R/SP35 | Same or reverse sign for RFI or RFJ |
| do. | (G41·CCW+G42·CW)·DP78 | sx | |
| 1925 | DP78 | W/SP35, CAR/SP33 | Same or reverse sign for QIE or QJE |
| do. | (RHS·CCW+$\overline{\text{RHS}}$·CW)·DP78 | sx | |
| 1926 | DP78 | W/SP33 | Same or reverse sign for RFI or RFJ |
| 1926 | DP78 | CAR, CFFC | |
| do. | DP7 | R/SPJE | Read JE or |
| do. | DP8 | R/SPIE | IE |
| 1927 | A0TM·DP78 | EFFC | Set FFC if negative |
| 1928 | DP78 | CAR, AIM, R/SP33 | Read RFI or RFJ |
| do. | $(\overline{\text{FFC}\cdot\text{RCW}}+\text{FFC}\cdot\text{RCW})$·DP7 | AIP | ⎫ |
| | | | Rotate vector ±90° |
| do. | $(\text{FFC}\cdot\overline{\text{RCW}}+\overline{\text{FFC}}\cdot\text{RCW})$·DP8 | AIP | |
| 1929 | LBC·DP78 | W/SP33 | ⎭ |
| 1930 | DP78 | CAR, CFFC | |
| do. | $\overline{\text{OSS}}$·DP78 | R/SP20 | Read VI or VJ, or |
| do. | 0SS·DP7 | R/SPI | Read I, or |
| do. | 0SS·DP8 | R/SPJ | Read J |
| 1931 | A0TM·DP78 | EFFC | Set FFC if negative |
| 1932 | DP78 | CAR, R/SP32 | Read QI or QJ |
| do. | FFC·DP78 | sx | |
| 1933 | DP78 | W/SP32 | Control sign of QI or QJ |
| 1933 | DP78 | CAR, R/SP31 | Read RI or RJ |
| do. | FFC·DP78 | sx | |
| 1934 | DP78 | W/SP31 | Control sign of RI or RJ |
| 1934 | DP78 | CAR, R/SP32 | Read QI or QJ |
| do. | (G41·G03+G42·G02)·DP78 | sx | |
| 1935 | DP78 | W/SP32 | Control sign of QI or QJ |
| 1935 | DP78 | CAR, CFFC, R/SP21 | Read |
| 1936 | A0TMhu·DP78 | EFFC, | Set FFC if negative |
| 1937 | DP78 | CAR, AIM, R/SP32 | Read QI or QJ |
| do. | $(\text{FFC}\cdot\text{RCW}+\overline{\text{FFC}\cdot\text{RCW}})$·DP7 | AIP | |
| do. | $(\text{FFC}\cdot\text{RCW}+\text{FFC}\cdot\overline{\text{RCW}})$·DP8 | AIP | |
| 1938 | $\overline{\text{NBC}}$·DP78 | W/SP32 | Control sign |
| 1938 | DP78 | CAR, AIM, R/SP31 | Read RI or RJ |
| do. | $(\text{FFC}\cdot\text{RCW}+\overline{\text{FFC}}\cdot\text{RCW})$·DP7 | AIP | |
| do. | $(\text{FFC}\cdot\text{RCW}+\text{FFC}\cdot\overline{\text{RCW}})$·DP8 | AIP | |
| 1939 | $\overline{\text{NBC}}$·DP78 | W/SP31 | Control signs |
| 1939 | DP78 | CAR, R/SP32 | Read QI or QJ |
| do. | (G42·RCW+G41·$\overline{\text{RCW}}$)·DP78 | sx | |
| 1940 | $\overline{\text{NBC}}$·DP78 | W/SP32 | Control sign |
| 1940 | FS·DP78 | CAR, R/SP35 | Read QIE or QJE |
| 1941 | LBC·FS·DP7 | W/QXE | Foreshorten QX endpoint |
| 1941 | LBC·FS·DP8 | W/QYE | Foreshorten QY endpoint |
| do. | DP78 | CAR,R/SP32 | Read QI or QJ |
| 1942 | DP7 | X/QXB | Set in new buffer end point |
| do. | DP8 | W/QYB | do. |
| 1943 | DP7 | W/SP23 | Put new QI or QIE in SP23 |
| | DP8 | W/SP25 | Put new QJ or QUE in SP25 |
| 1945 | DP7 | CAR,R/SP14 | READ CX |
| do. | DP8 | CAR,R/SP15 | Read CY |
| 1946 | $\overline{\text{XQ}}$ DP78 | R/SP33 | Read RFI or RFJ |
| do. | XQ·DP78 | sx | Subtract if XQ |
| do. | LBC·XQ·D78 | R/SP35 | Read QI or QJ |
| do. | $\overline{\text{LBC}}$·XQ·DP7 | R/QXE | ⎫ |
| do. | $\overline{\text{LBC}}$·XQ·DP8 | R/QYE | ⎬ Put foreshortened blk. 1 endpoint coords. into active storage. |
| 1947 | FS·DP7 | W/XCEP | |
| do. | FS·DP8 | W/YCEP | ⎭ |
| do. | DP78 | CAR | |

Table IX – Continued

DP7 and DP8 MODES

| | | |
|---|---|---|
| 1950 | $\overline{OSS} \cdot \overline{XQ} \cdot DP78$ R/SP33 | Read RFI or RFJ |
| 1951 | DP7 W/IB, CAR | Write RI; set=0 if OSS or XQ |
| do. | DP8 W/JB, CAR | Write RJ; do. |
| 1960 | (XQ+CXL·$\overline{XQ \cdot OSS}$)·DP7 R/SP14 | ⎫ |
| | | Read cx or cy |
| do. | (XQ+CXL·$\overline{XQ \cdot OSS}$)·DP8 R/SP15 | ⎬ |
| | | or read RX or RY |
| do. | $\overline{CXL \cdot XQ \cdot OSS}$·DP7 R/SP18 | |
| do. | $\overline{CXL \cdot XQ \cdot OSS}$·DP8 R/SP19 | |
| 1961 | $\overline{XQ \cdot OSS}$·DP78 R/SP31 | Read RY or RJ, or |
| do. | XQ·DP78 sx, RSP32 | Read QI or QJ, or |
| do. | OSS·DP7 R/SPXE | Read XE, or |
| do. | OSS·DP8 R/SPYE | Read YE |
| 1962 | DP7 W/XEP,W/SPXE | Load buffers with next block |
| do. | DP8 W/YEP, W/SPYE | data, internal or regular |
| 1966 | (OSS·NBC+$\overline{NBC}$)·DP7 CAR, R/SPI | Read I or J, or RI or RJ, |
| do. | (OSS·NBC+$\overline{NBC}$)·DP8 CAR, R/SPJ | or SPI or SPJ |
| do. | $\overline{OSS}$·NBC·DP78 CAR,R/SP31 | |
| 1967 | DP7 W/SP40 | |
| do. | DP8 W/SPJE,CAR,R/SP40 | |
| 1968 | DP8 W/SPIE | |
| 1970 | DP8 CAR,R/QXE | |
| 1971 | DP8 sx,R/SP23 | |
| 1972 | DP8 W/SP1 | Write QXE – QI |
| 1973 | DP8 CAR,R | QYE |
| 1974 | DP8 sx,R/SP25 | |
| 1975 | DP8 cx, R/SP1 | Classify QX against QY |
| 1976 | AGB·DP8 W/SP1 | Store larger in SP1 |
| 1977 | DP8 CAR,R/PVC | |
| 1978 | DP8 R/PVC | |
| 1979 | DP8 SAR3,CX,RSP1 | Classify .002 PVC vs. QX |
| | | or QY |
| 1980 | AGB·OSS·DP8 EJCX, CAR | |
| do. | RCW·($\overline{JCX \cdot OSS}$+XRO+XR)·DP8 E G02 | Set G02 |
| do. | ($\overline{JCX \cdot OSS}$+XRO+XR)·$\overline{RCW}$·DP8 E G03 | Set G03 |

TABLE X

DP9 MODE

| | | |
|---|---|---|
| 0120 | DP9 CAR, R/SPXE | Read new QX |
| 0121 | DP9 R/SP23 | Subtract old QX |
| 0122 | DP9 sx, R/QXE | |
| 0123 | JCX·OSS·DP9 W/XCEP | Mod. XE=XE+new QX–old QX |
| 0123 | DP9 CAR, R/SPYE | |
| 0124 | DP9 R/SP25 | |
| 0125 | DP9 sx, R/QYE | |
| 0126 | JCX·OSS·DP9 W/YCEP | Mod. YE=YE+new QY–old QY |
| 0520 | $\overline{TANG}$·DP9 CAR, R/SPIE | |
| do. | TANG·DP9 CAR, R/SPI | |
| 0521 | DP9 W/IB | Write new I buffer number |
| 0522 | $\overline{NBC}$·DP9 W/SPIE | Write next IE number |
| do. | DP9 CAR, R/SPXE | |
| 0523 | DP9 sx, R/SPI | |
| 0524 | TANG·DP9 W/SP18 | Write XE-I if TANG |
| 0524 | DP9 CAR, R/SPX | |
| 0525 | DP9 W/XEP, W/SPXE | Write Blk. 2 X end point back |
| 0527 | DP9 sx, R/SP18 | |
| 0528 | NBC·DP9 W/SPIE | Write new IE=X–(XE-I) |
| | | if NBC |
| 530 | $\overline{TANG}$·DP9 CAR, R/SPJE | Read JE or J |
| do. | TANG·DP9 CAR,R/SPJ | |
| 0531 | DP9 W/JB | Write new J buffer no. |
| 0532 | $\overline{NBC}$·DP9 W/SPJE | Write new JE no. |
| do. | DP9 CAR, R/SPYE | |
| 0533 | DP9 sx, R/SPJ | |
| 0534 | TANG·DP9 W/SP19 | Write YE-J if TANG |
| do. | DP9 CAR, R/SPY | |
| 0535 | DP9 W/YEP, W/SPYE | Write Blk. 2 Y end point |
| 0537 | DP9 sx, R/SP19 | |
| 0538 | NBC·DP9 W/SPJE | Write new JE=Y–(XE-I) |
| | | if NBC |
| 0540 | DP9 CAR, R/SPR | |
| 0541 | DP9 W/SPRA, CAR | Put old R into RA |
| 0542 | DP9 EDVA | |
| 0580 | DP9 R/SPQ | Read Q as numerator |
| 0584 | DP9 R/SPR | Read R as denominator |
| | ↓ | |
| 0792 | DP9 W/SP7 | Write Q/R mantissa |
| 0794 | DP9 W/SP8 | Write Q/R char. |

TABLE X—Continued

DP9 MODE

| | | | |
|---|---|---|---|
| 0920 | | DP9 CAR, R/SP7, CFFC | Read Q/R mant. |
| 0921 | | DP9 CONV, R/SP8 | Read mant. & conv. to decimal |
| 0924 | | DP9 emx, R/SPIE | |
| 0925 | | ↓ | |
| | | DP9 cmx | |
| 0956 | | DP9 W/SP1 | Write Q/R·IE in SP1 |
| 0957 | | DP9 CAR, R/SPIE | |
| 0958 | | A0TM·DP9 EFFC | Set FFC if IE neg. |
| 0960 | | DP9 CAR, R/SP1 | |
| do. | | FFC·DP9 sx | |
| 0961 | | DP9 W/SP1, CAR | Control sign |
| 0962 | | DP9 R/SP1 | |
| do. | (G42·G02+G41·G03)·DP9 sx | | Change sign |
| 0963 | | NBC·DP9 W/QXB | Store new QXB |
| 1120 | | DP9 CAR, R/SP7, CFFC | Read Q/R mantissa |
| 1121 | | DP9 CONV, R/SP8 | Read Q/R char. |
| 1124 | | DP9 emx, R, SPJE | |
| | | ↓ | |
| | | DP9 cmx | |
| 1156 | | DP9 W/SP1 | Write Q/R·IE in SP1 |
| 1157 | | DP9 CAR, R/SPJE | |
| 1158 | | A0TM·DP9 EFFC | Set FFC if IE neg. |
| 1160 | | DP9 CAR, R/SP1 | |
| do. | | FFC·DP9 sx | |
| 1161 | | DP9 W/SP1 | |
| 1162 | | DP9 R/SP1, CAR | Control sign |
| do. | (G42·G02+G41·G03)·DP9 sx | | Change sign |
| 1163 | | NBC·DP9 W/QYB | Store new QXB |
| 1759 | | DP9 EHQC | |
| | | ↓ | ⎫ |
| | | | ⎪ Half Quad. Routine; |
| 1762 | | DP9 R/SPIE | ⎬ set HQ Register to |
| | | ↓ | ⎪ classify the angle of |
| 1764 | | DP9 R/SPJE | ⎪ IE, JE resultant vector |
| | | ↓ | ⎭ |
| 1779 | | HQC W/HQ, CHQC | |
| 17xx | | DP9 EDVA | |
| 1780 | | FFJ·DP9 R/SPJE ⎫ | Read JE or IE as |
| do. | | FFJ·DP9 R/SPIE ⎬ | numerator |
| 1784 | | FFJ·DP9 R/SPIE ⎫ | Read IE or JE as |
| do. | | FFJ·DP9 R/SPJE ⎭ | denominator |
| | | ↓ | |
| 1992 | | DP9 W/SP7 | Write mant. I/J or J/I |
| 1993 | | DP9 W/SP8 | Write char. do. |

TABLE XI

DP10 MODE

| | | | |
|---|---|---|---|
| | | DP10 EATAN | ⎫ |
| | | ↓ | ⎪ Arc tan Routine to |
| 0192 | | ATAN R/SP8 | ⎬ compute the angle whose tangent is stored |
| 0193 | | ATAN R/SP7 | ⎪ as I/J or J/I in SP7, SP8 |
| | | ↓ | |
| 1199 | | ATAN W/sp33, CATAN | Store θA in SP33 |
| 1319 | | DP10 EDANG | ⎫ Develop Angle Routine |
| | | ↓ | ⎬ Same as Table V, 13xx to 1329 |
| 1329 | | DP10 W/THETAa, CDANG | Write 0 ≤ θA < 2π in THETAa |
| 1330 | | DP10 R/π ÷ 2 | |
| do. | | G02·DP10 sx | |
| 1331 | | NBC·DP10 W/THETAa, CFFC | θa =θa± 90° if NBC |
| 1332 | | A0TM·DP10 EFFC | |
| 1333 | | DP10 cx, R/2π | Classify θa against 2θ |
| 1334 | | FFC·DP10 R/2π | θa + 2π |
| do. | | ALB·DP10 sx, R/2π | θa − 2π |
| 1335 | | NBC·DP10 W/THETAa | Set θa between 0° and 360° |
| 1339 | | DP10 CFS, COSS | Clear FS and OSS |

TABLE XII

DP11 MODE

| | | | |
|---|---|---|---|
| 0120 | | DP11 CNDI, CAR,R/IB, CNDJ | Read I Buffer |
| 0121 | | DP11 W/SP31, CAR, R/JB | Write I in SP31 |
| 0122 | | DP11 W/SP32, CAR, R/H | Write J in SP32 |
| 0123 | | DP11 W/HA, CAR, R/Q | Write H in H active reg. |
| 0124 | | DP11 R/HA | |
| 0125 | | DP11 W/SPQ | SPQ = Q+H |
| 0126 | | DP11 CFFC, CAR, R/SP31 | |
| 0127 | AOTM·DP11 | EFFC | Set FFC if I negative |
| 0128 | | DP11 CFFD, CAR, R/SP32 | |
| 0129 | AOTM·DP11 | EFFD, CAR | Set FFD if J negative |
| 0130 | | DP11 W/SPX, W/SPY, W/SPI, W/SPJ, R/XEP | Set registers to zero |
| 0131 | | DP11 W/SPXE, CAR, R/YEP | Set X into SPXE |
| 0132 | | DP11 W/SPYE, CAR | Set Y into SPYE |
| 0179 | | DP11 ESQS | Enable sq.rt.sum routine |
| 0180 | | DP11 R/SP31 | Read I |
| 0182 | | DP11 R/SP32 | Read J |
| 0994 | | DP11 W/SP30,CSQS | Write $\sqrt{I^2+J^2}$ = R in SP30 |
| 11xx | | DP11 EDVA | |
| 1180 | | DP11 R/SPQ | Read Q as numerator |
| 1184 | | DP11 R/SP30 | Read R as denomintor |
| 1392 | | DP11 W/SP7 | Write Q/R mant. |
| 1394 | | DP11 W/SP8 | Write Q/R char. |
| 1520 | | DP11 CAR, R/SP7 | |
| 1521 | | DP11 CONV, R/SP8 | Get dec. Q/R |
| 1523 | | DP11 emx, R/SP32 | Read J |
| 1557 | | DP11 ↓ cmx | |
| 1558 | | DP11 W/SP32 | Put QXB=Q/R· J in SP32 |
| 1560 | | DP11 CAR, R/SP7 | |
| 1561 | | DP11 CONV, R/SP8 | Get dec. Q/R |
| 1563 | | DP11 emx, R/SP31 | Read I |
| 1597 | | DP11 cmx | |
| 1598 | | DP11 W/SP31 | Put QYB=Q/R · J in SP31 |
| 1720 | | DP11 CAR, AIM, R/SP32 | |
| 1720 | (G42·$\overline{FFD}$+G41·FFD)·DP11 | AIP | |
| 1721 | | DP11 W/QXB | Transfer QXB with sign |
| 1722 | | DP11 CAR, AIM, R/SP31 | |
| do. | (G42·FFC+G41·$\overline{FFC}$)·DP11 | AIP | |
| 1723 | | DP11 W/QYB | Transfer QYB with sign |

TABLE XIII

DP12 MODE

| | | | |
|---|---|---|---|
| 05xx | | DP12 ESQS | Enable sq. root sum routine |
| 0580 | | DP12 R/IB | Read I buff. |
| 0582 | | DP12 R/JB | Read I buff. |
| 994 | | DP12 W/SP5, CSQS | Write $\sqrt{I^2+J^2}$ = D or R |
| 1120 | | DP12 CAR, R/SP5 | Read R or D |
| 1121 | $\overline{NBC}$·DP12 | W/D | |
| 1121 | | NBC·DP12 R/Q | |
| do. | (G42·G02+G41·G03)·DP12 | sx | R±Q;–if centers on same side |
| 1122 | | DP12 W/SP6, CAR | Rt = R±Q in SP6 if NBC |
| 1122 | $\overline{NBC}$·DP12 | W/D | |
| 1123 | | DP12 ESQ | Enable sq.root routine |
| 1127 | | DP12 R/SP6 | Reat Rt |
| 1140 | | DP12 W/SP7, CAR, CSQ | Write $\sqrt{Rt}$ |
| 1141 | | DP12 emx | |
| 1142 | | DP12 R/SP7 | Read $\sqrt{Rt}$ |
| 1143 | | DP12 R/44.7 | Read 44.7 = $\sqrt{2000}$ |
| | | multiply | |
| | | cmx | |
| 1176 | | DP12 W/CULLV | Write CULLV = $\sqrt{2000 Rt}$ |
| 1175 | | DP12 cx, R/FB | Read Feed Rate Buffer |
| 1176 | ALB·DP12 | EMODF | set MODF ff |
| 1177 | (G01+$\overline{ALB}$)·DP12 | CMODF | Clear MODF ff |
| 1178 | DPR·DP12 | EDP | |
| 1330 | | DP12 ed, R/3.33 × 10$^{th}$ | |
| 1335 | | DP12 R/D | |
| | | Carry out Division | |
| 1389 | | DP12 ed | |
| 1391 | DP·DP12 | W/TFB | |
| 1397 | DP·DP12 | EDR | |
| do. | $\overline{DP}$·DP·DP12 | CDPR | |
| 1398 | $\overline{ZVX}$·$\overline{ICDTZ}$·DP·DP12 | CDTZ | Make Block 1 Decel. to zero |
| 1399 | | DP12 CDP | |
| do. | S2·READ·DR·DP12 | Adv. to S3 | |

TABLE XIV

End Point Zoning if Tool Radius Only Is Effective
(Supplements Table IX in Case A)

| | | |
|---|---|---|
| 1003 | QEPZ·**** | **** |
| do. | QEPZ | R/QY |
| 1-0034 | QEPZ·**** | **** |
| do. | QEPZ | R/QX, cx |
| 1-0035 | **** | **** |
| 1-0036 | QEPZ·**** | **** |
| do. | QEPZ·FAX | CAR, R/QX |
| do. | QEPZ·FAX | CAR, R/QY |
| 1-0037 | **** | **** |
| 1-0038 | QEPZ·*** | *** |
| do. | QEPZ·FAX | sx, R/QXE |
| do. | QEPZ·FAX | sx, R/QYE |
| 1-0039 | *** | *** |
| 1-0040 | QEPZ·*** | *** |
| do. | QEPZ·FAX | R/QXΔ |
| do. | QEPZ·FAX | R/QYΔ |
| 1-0041 | QEPZ·=== | *** |
| do. | QEPZ·FAX | R/QXΔ |
| do. | QEPZ·FAX | SAL |
| 1-0042 | QEPZ·*** | *** |
| do. | QEPZ·FAX | SAL |
| do. | QEPZ·FAX | R/QYΔ |

TABLE XIV-Continued

End Point Zoning if Tool Radius Only Is Effective
(Supplements Table IX in Case A)

| | | |
|---|---|---|
| 1-0043 | QEPZ·*** | *** |
| do. | QEPZ·FAX | R/QYΔ |
| 1-0044 | QEPZ·*** | *** |
| DO) | QEPZ·FAX | R/QYΔ |
| 1-0045 | QEPZ·*** | *** |
| do. | QEPZ·FAX | R/QYΔ |
| 1-0046 | QEPZ·*** | *** |
| do. | QEPZ·FAX | R/QYΔ |
| 1-0047 | S1·SST | Adv. to S2 |
| 1-0048 | S2 | Adv. to S3 |
| 1-0048 | QEPZ·*** | |
| 1-0048 | QEPZ·FAX | R/QXΔ |
| do. | QEPZ·FAX | R/QYΔ |
| 1-0049 | QEPZ·*** | *** |
| do. | QEPZ·FAX | R/QXΔ |
| do. | QEPZ·FAX | RQYΔ |
| 1-0050 | | |
| 1-0051 | Same as 1-0049 above | |
| 1-0052 | | |
| 1-0053 | S1 SST | Adv. to S2 |

TABLE XV

TRANSFER OPERATIONS IN MODE 3
(Supplements Table XI in Case A)

| | | | |
|---|---|---|---|
| 3-x660 | | CAR, R/XCP | |
| 3-x663 | (G40·OM)+ZVX+JCX | R/QX | |
| 3-x664 | G40·OM | sx, R/QXB | |
| do. | ZVX+JCX | sx, R/SP23 | Read X coord. on other side tool |
| 3-x665 | | W/XCP, CAR | Update XCP |
| 3-x666 | G40 | R/QXB | Put QXB into QX and |
| 3-x667 | G40·OM | W/QX | QXE when entering |
| do. | G40·OM | W/QX, W/QXB | |
| 3-x668 | | W/QXE | Set QX, QXE & QXB to zero when leaving. Otherwise, transfer QXB to QXE |
| 3-x668 | G40 | CAR, R/SP23 | Write SP23 no. into |
| 3-x669 | ZVX+JCX | W/QX | QX when JCX or ZVX |
| 3-x670 | | CAR, R/YCP | |
| 3-x673 | (G40·OM)+ZVX+JCX | R/QY | |
| 3-x674 | G40·OM | sx, R/QYB | |
| do. | ZVX+JCX | sx, R/SP25 | |
| 3-x675 | | W/YCP, CAR | Update YCP = YCP + QY new or −QYB or −QJ |
| 3-x676 | G40 | R/QYB | |
| 3-x677 | G40·OM | W/QY | |
| do. | G40·OM | W/QY, W/QYB | |
| 3-x678 | | W/QYE | |
| 3-x678 | G40 | CAR, R/SP25 | |
| 3-x679 | ZVX+JCX | W/QY | |
| 3-x683 | | CFRDP | |
| 3-x684 | OM·G40 | EFRDP | |
| 3-x685 | G40 | EOM | |
| do. | G40 | COM | |
| 3-x696 | | CIBA, CJCX, CZVX | |
| 3-x697 | FX+OSS | EIBA | Set IBA if int. blk. req'd. |
| do. | DP19 | EHD | Advance to DP0 |
| 3-x698 | IBA | EHD | Advance to DP01 if IBA |
| do. | | CNDM, EDTZ, CANR | |
| do. | CYSP | CCYST | |
| 3-x699 | | S8 Adv. to S9 | |

NOTE: In this Table XV, x means 0 or 1, so operations are performed in either time columns 0600 or 1600 during Mode 3.

TABLE XVI
(Supplements Table VIII in Case A)

| Time Step | Col. 0800A (old X400A) 08xx·LIN·PX2 | Col. 0800B (old X400B) 08xx·CIRC | Col. 0800C (old X400C) 08xx·S5·(G02+G03) | Col. 0800D (old 400D) 08xx·S6·(G02+G03) | Col. 1800A (old 900A) 18xx LIN PX2 | Col. 1800B (old 900B) 18xx CIRC | Col. 1800C (old 900C) 18xx S5 (G02+G03) | Col. 1800D (old 900D) 18xx S6 (G02+G03) |
|---|---|---|---|---|---|---|---|---|
| 65 | R/QX, emx | R/QY, emx | R/QYB, emx | R/QY, emx | R/QY, emx | R/QX, emx | R/QXB | R/QX |
| 66 | | | | | | | | |
| 67 | R/zero | R/Q' | R/Q' | R/Q' | R/zero | R/Q' | R/Q' | R/Q' |
|  | Multiply | Multiply | Multiply | Multiply | Multiply | Multiply | Multiply | Multiply |
|  | 0 x Q' | ±QY x Q' | ±QYB x Q' | ±QY x Q' | 0 x Q' | ±QX x Q' | ±QXB x Q' | ±QX x Q' |
| 83 | SL4 ─────────────────────────────────────────→ | | | | | | | → |
| 84 | R/Q X R ──────────────────────────────→ | | | | R/QYR ─────────────────────→ | | | → |
| 85 | SR4 ─────────────────────────────────→ | | | | ─────────────────────────────→ | | | → |
| 86 | W/QXΔ ───────────────────────────────→ | | | | ─────────────────────────────→ | | | → |
| 87 | ZR1 ─────────────────────────────────→ | | | | W/QYΔ ──────────────────────→ | | | → |
| 88 | SL4 ─────────────────────────────────→ | | | | ─────────────────────────────→ | | | → |
| 89 | W/QXR, CAR ─────────────────────────→ | | | | W/QYR, CAR ────────────────→ | | | → |
|  | | R/QX | | | | R/QY | | |
| 91 | | RQXΔ | | | | R/QYΔ | | |
| 92 | | W/QX new | | | | W/QY new | | |

TABLE XVII
SERVO NUMBER UPDATING
(Supplements Table VII in Case A)
COMMON TO ALL MODES

| | Col. 0000 (X000) | Col. 0200 (X100) | Col. 0400 (X200) | Col. 0600 (X300) | Col. 0800 (X400) | Col. 1000 (X500) | Col. 1200 (X600) | Col. 1400 (X700) | Col. 1600 (X800) | Col. 1800 (X900) |
|---|---|---|---|---|---|---|---|---|---|---|
| 03 | | | | | CAR | | | | | CAR |
| 04 | | | | | R/ΔX | | | | | R/ΔY |
| 05 | | | | | R/XCP | | | | | R/YCP |
| 06 | | | | | W/XCP | | | | | W/YCP |
| 07* | | | | | R/QX | | | | | R/QY |
| 08 | | | | | R/XOFF | | | | | R/YOFF |
| 15 | | | | | W/XMP | | | | | W/YMP |
| 16 | CAR ─────────────────────────────────────────────────────────────────→ | | | | | | | | | → |
| " | R/ΔX ──────────────────────→ | | | | R/XMP | R/ΔX ─────────────────────→ | | | | → |
| 17* | R/QXΔ ─────────────────────→ | | | | | R/QXΔ ─────────────────────→ | | | | → |
| 18 | SAR ───────────────────────→ | | | | | SAR ───────────────────────→ | | | | → |
| 19 | R/XSC ─────────────────────→ | | | | | R/XSC ─────────────────────→ | | | | → |
| 20 | | | | | | | | | | |
| 21 | W/XSC, CAR ─────────────────────────────────────────────────────────→ | | | | | | | | | → |
| 22 | R/ΔY ──────────────────────────────────────────────────────────────→ | | | | | | | | | R/YMP |
| 23* | R/QYΔ ─────────────────────────────────────────────────────────────→ | | | | | | | | | → |
| 24 | SAR ───────────────────────────────────────────────────────────────→ | | | | | | | | | → |
| 25 | R/YSC ─────────────────────────────────────────────────────────────→ | | | | | | | | | → |
| 26 | W/YSC, CAR ────────────────────────────────────────────────────────→ | | | | | | | | | → |

TABLE XVIII
STEPS ONLY IN MODE 3
(Supplements Table IV in Case B)

| | COL. 3-0600 (3300) | COL. 3-1600 (3800) |
|---|---|---|
| 1 to 34 | | |
| 35 | R/XEP ⟶ | |
| 36 | W/XCEP, CAR ⟶<br>R/YEP | |
| 37 | W/YCEP, CAR ⟶<br>R/TFB | |
| 38 | W/TFA, CAR<br>*R/FB if MODF ⟶<br><br>*R/CULLV if MODF | |
| 39 | W/FA, CAR ⟶ | |
| 40 | | |
| 60 to 99 | * { See Table XV in this case } | |

TABLE XIX
STEPS ONLY IN MODE 2
(Supplements Table X in Case A & Table III in Case B)

| | COL. 2-0600 (2300) | COL. 2-1600 (2800) |
|---|---|---|
| 1 to 32 | None | None |
| 37 to 69 | Prorate QY for last and first iterations of successive segments ⟶ | Same, except prorate QX |
| 70 to 76 | Prorate J<br>(See Table X, Case A) ⟶ | Prorate I |
| 76 | CAR, R/SP3 [Q'] if S7 ⟶ | |
| 77 | W/Q' if S7, CAR | |
| 78 | R/GB if S7 · $\overline{G09}$ ⟶ | |
| 79 | W/G if S7, CAR, ⟶<br>R/IB if S7 · LIN | |
| 80 | W/I if S7 · LIN, CAR ⟶<br>R/JB if S7 · LIN | |
| 81 | W/J if S7 · LIN, CAR ⟶ | |
| 82 | ⟶ | |

Table XIX—Continued
STEPS ONLY IN MODE 2
(Supplements Table X in Case A & Table III in Case B)

| | COL. 2-0600 (2300) | COL. 2-1600 (2800) |
|---|---|---|
| 83 to 95 | None $\longrightarrow$ | None |
| 96 | CQEPZ, CAR, R/SP5 $\longrightarrow$ | |
| 97 | CX, R/SPQ $\longrightarrow$ | |
| 98 | EQEPZ if ALB·NBC·0M $\longrightarrow$ | |
| 99 | Adv. to S8 if S7 $\longrightarrow$ | |

We claim:

1. In a control system for moving the center of a tool at a velocity V along a path which is offset perpendicularly by a distance Q from successive main path segments defined by successive blocks of numerical data, the combination comprising a. means including storage registers for storing and outputting first signals representing X and Y axis coordinate numbers XCP and YCP, b. means for controlling said means (a) to change said first signals, and the represented values XCP and YCP, by amounts $\Delta X$ and $\Delta Y$ during each of successive equal time periods $\Delta T$, so that such first signals dynamically designate the location of a point moving progressively along the main path, c. means including storage registers for storing and outputting second signals representing numbers QX and QY which are the X and Y components of a vector of length Q initially lying perpendicular to the main path, d. means for controlling said means (c) to change said second signals and the represented values QX and QY during each of said periods $\Delta T$, when the block of data for the main path segment defines such segment as a circular arc of radius R, by respective amounts $QX\Delta = QY \cdot V \cdot \Delta T/R$ and $QY\Delta = QX \cdot V \cdot \Delta T/R$, and e. means responsive to said first and second signals from said means (a) and (c) for moving the center of the tool simultaneously along X and Y axes to keep its position coordinates substantially and dynamically equal to XCP + QX and YCP + QY during each period $\Delta T$.

2. In a control system for moving the center of the tool of finite radius Q simultaneously along X and Y axes to produce resultant movment such that the tool periphery is tangentially in contact with a circular path segment defined by a block of numerical data directly or indirectly designating the segment radius R and its components I and J, the combination comprising a. means for measuring off successive and equal short time periods $\Delta T$, b. means including storage registers for storing and outputting first signals representing numerical values of changes $\Delta X$ and $\Delta Y$ during each period $\Delta T$ in coordinates XCP, YCP of the tool's peripheral contact point required to make the latter progress along said path segment, c. means including storage registers for storing and outputting second signals numerically representing the values of changes $QX\Delta$ and $QY\Delta$ during each period $\Delta T$ in the X and Y axis components QX and QY of a vector having length Q to keep such vector always normal to the path segment, d. means including storage registers for storing and outputting third signals numerically representing values of commanded position coorindates XSC and YSC for the tool center, e. means responsive to said means (a), (b), (c) and (d) for changing said third signals by the amounts $\Delta X + QX\Delta$ and $\Delta Y + QY\Delta$ during each of said periods $\Delta T$, and f. means responsive to said third signals from said means (d) for moving said tool simultaneously along the X and Y axes to keep its center dynamically at the coordinate positions represented by the signaled values XSC and YSC.

3. In a control system for moving the center of the tool having an effective radius Q simultaneously along X and Y axes to produce resultant composite motions of the tool center along a path which is offset from a circular main path defined by a block of numerical data, the combination comprising a. means for measuring off successive and equal periods $\Delta T$ in actual time, b. means for producing first signals representing, during each of the successive periods $\Delta T$, numerical values $\Delta X$ and $\Delta Y$ which are respectively equal to $\pm J \cdot Q'$ and $\pm I \cdot Q'$, where $Q'$ is proportional to the desired path velocity and the duration of the periods $\Delta T$ but is inversely proportional to the length of the radius of the main circular path, and I and J are the X and Y components of that radius, c. means including storage registers for storing and outputting said first signals last-produced by said means (b), d. means responsive to said means (c) for producing second signals representing, during each period $\Delta T$, new values for I and J which are respectively equal to $I + \Delta X$ and $J + \Delta Y$, and for supplying such signals to said means (b), e. means for producing third signals representing, during each period $\Delta T$, numerical values of $QX\Delta$ and $QY\Delta$ which are respectively proportional to $\pm QY \cdot Q'$ and $\pm QX \cdot Q'$, where QX and QY are the X and Y axis components of a vector of length Q lying perpendicular to the main path, f. means including storage registers for storing and outputting said third signals last-produced by said means (e), g. means responsive to said means (f) for producing fourth signals representing, during each of said periods $\Delta T$, new values for QX and QY which are respectively equal to $QX + QX\Delta$ and $QY + QY\Delta$, and for supplying such signals to said means (e), and h. means responsive to said first signals and third signals from said means (b) and (e) for moving said tool center, during each of said periods $\Delta T$, along the X axis through a distance $\Delta X + QX\Delta$ and along the Y axis through a distance $\Delta Y + QY\Delta$.

4. In a control system for moving the center of a tool, having an effective radius Q, simultaneously along X and Y axes to produce resultant composite motion of the tool center along a path which is offset from a linear or circular main path defined by a block of command data, the combination comprising a. means for measuring off successive, short and equal periods $\Delta T$ in actual time, b. means for computing and producing first digital signals representing, during each of said periods $\Delta T$, numerical values of $\Delta X$ and $\Delta Y$ where
   i. when the block data designates that the main path segment is linear and of length D having X and Y components I and J, such values $\Delta X$ and $\Delta Y$ are respectively equal to $I \cdot Q'$ and $J \cdot Q'$, where $Q'$ is equal to $V \cdot \Delta T / D$, V being the desired path velocity,
   ii. when the block data designates that the main path segment is circular with a radius R having changeable X and Y components I and J, such values $\Delta X$ and $\Delta Y$ are respectively equal to $\pm J \cdot Q'$ and $\pm I \cdot Q'$, where $Q'$ is equal to $V \cdot \Delta T / R$, c. means including storage registers for receiving, storing and outputting said first digital signals last-produced by said means (b), d. means for computing and producing second digital signals representing, during each of said periods $\Delta T$ when the block data designates that the main path segment is circular, new values of I and J respectively equal to $I - \Delta X$ and $J - \Delta Y$, and for supplying such signals as inputs to said means (b), e. means for computing and producing third digital signals representing, during each of said periods $\Delta T$ when the block data designates that the main path segment is circular, numerical values of $QX\Delta$ and $QY\Delta$ which are respectively proportional to $\pm QY \cdot Q'$ and $\pm QX \cdot Q'$, where QX and QY are the changeable X and Y components of a vector of length Q lying perpendicular to the main path, f. means including storage registers for receiving, storing and outputting said third digital signals last-produced by said means (e), g. means for computing and producing fourth digital signals representing, during each period $\Delta T$ when the block data designates that the main path segment is circular, new values of QX and QY which are respectively equal to $QX + QX\Delta$ and $QY + QY\Delta$, and for supplying such signals as inputs to said means (e), h. means responsive to said first signals from said means (c) for moving the tool center through distances $\Delta X$ and $\Delta Y$ along the X and Y axes during each of said periods $\Delta T$ when the block data designates that the main path segment is linear, and i. means responsive to said first and third signals from said means (c) and (f) for moving the tool center through distances $\Delta X + QX\Delta$ and $\Delta Y + QY\Delta$ along the X and Y axes during each of said periods $\Delta T$ when the block data designates that the main path segment is circular.

5. The combination set forth in claim 4 further characterized in that said means (h) and (i) include:

j. means including storage registers for receiving and outputting command signals representing commanded X and Y coordinate numbers XSC and YSC, k. means responsive to said first signals from said means (c) for transmitting to said means (j) command signals representing the previous numbers XSC and YSC changed by amounts $\Delta X$ and $\Delta Y$, during each of said periods $\Delta T$ when the block data designates that the main path segment is linear, l. means responsive to said first and third signals from said means (c) and (f) for transmitting to said means (j) command signals representing numbers XSC and YSC changed by amounts $\Delta X + QX\Delta$ and $\Delta Y + QY\Delta$ during each period $\Delta T$ when the block data designates that the main path segment is circular, and m. means responsive to said command signals from said means (j) for moving the tool center along the X and Y axes to keep its X and Y axis coordinate positions substantially instantaneously equal to the represented XSC and YSC numbers.

6. In a control system for moving the center of a tool along a path which is offset perpendicularly by a distance Q from successive main path segments defined by successive blocks of numerical data, the combination comprising a. means for producing signals which represent and correspond to the data of the successive blocks, b. means responsive to the signals from said means (a) for producing first or second mode signals (G41 or G42) when the tool bodily lies respectively on the left or the right of the path looking in the direction of travel, c. means, responsive to the signals from said means (a) representing a first path segment, for signaling the path angle ($\theta_a$) at the exit or terminal point of that first segment, d. means, responsive to the signals from said means (a) representing a second path segment which next succeeds said first segment, for signaling the path angle ($\theta$) at the entry or initial point of the second segment, e. means responsive to the signals from said means (c) and (d) for signaling the path angle change ($2\beta = \theta_a - \theta$) in the transition from said first to said second path segment, f. means responsive to said means (b) and (e) for producing a control signal (FFE) indicative of an inside corner transition only when (i) the signaled value of said angle change is negative and said first mode signal exists, or (ii) the signaled value of said angle change is positive and said second mode signal exists, whereby said control signal when present designates that the operative portion of the tool must execute an inside corner in making the transition between said first and second segments, g. means responsive to the signals from said means (a) and (f) for producing changing position command signals XSC and YSC which successively designate progressive positions to be occupied by the tool center along respective X and Y axes in traveling the offset path, and h. means responsive to said signals from said means (g) for moving said tool center along the X and Y axes to keep its position dynamically in substantial agreement with the changing signals XSC and YSC.

7. In numerical control apparatus for moving a tool simultaneously along X and Y axes to follow a predetermined path defined by numerically signaled successive blocks of command data, said apparatus comprising in combination means, responsive to the signals representing first and second successive blocks of data, for producing a first control signal (CCA) only when the second block includes a designation of the radius (RF) of a desired fillet to be joined between the successive path segments, means, responsive to the signals representing said first and second blocks of data, for producing a second control signal (FFE) only when the first and second segments defined thereby require the tool to travel around an inside corner, means for producing a first classification signal (XQ) only in response to the absence of said first control signal and the presence of said second control signal, means for producing a second classification signal (OSS) only in response to the absence of both said first and second control signals, means for producing a third classification signal (XRO) only in response to the presence of the first control signal and the absence of the second control signal, means for producing a fourth classification signal (XR) only in response to the presence of both said first and second control signals, means responsive to the signals representing said first and second blocks of data, and controlled in its operation by the presence of the first, second, third or fourth classification signal, for producing progressively changing position command signals XSC and YSC which indicate the progresssive positions which the tool center is to reach along the X and Y axes in traveling the desired path, and means responsive to said XSC and YSC signals for dynamically moving said tool along X and Y axes to keep its positions therealong substantially in agreement with the changing values of such signals XSC and YSC.

8. The combination set forth in claim 7 further including means responsive to said first, said third or said fourth classification signal (XQ, XR, XRO) for causing said means for dynamically moving said tool to move the tool along a first path segment only up to a foreshortened end point (XCEP', YCEP') which differs from the programmed segment end point (XCEP, YCEP) defined by a corresponding first block of command data.

9. The combination set forth in claim 8 further including means for modifying the operation of said means for producing progressively changing position command signals XSC and YSC to foreshorten the path segment defined by a succeeding, second block of command data whenever the first path segment defined by said first block of command data is foreshortened, said last-named means including means for computing and signaling the X and Y components I and J, of a linear segment or an arcuate segment starting radius, from the end point XEP' of a fillet arc which extends tangentially between the two programmed path segments, and means for controlling said means for producing said progressively changing position command signals XSC ans YSC to execute the second path segment based upon the computed and signaled values of I and J rather than the I and J values originally defined by the second block of command data.

10. In a numerical control system for moving a tool through two successive path segments which are non-tangent and defined by first and second successive blocks of numerical command data, the second block of data including a fillet radius number when it is desired that the two segments are to be joined by a fillet tangent to each, the combination comprising a. means for producing signals which represent the command data of first and second successive blocks which define first and second successive non-tangent path segments, b. means responsive to the signals from said means (a) for producing one of four classification signals (XR, XRO, OSS, XQ) respectively designating that the path transition between the two segments represented by the signals from said means (a) is (i) inside with fillet, (ii) outside with fillet, (iii) outside sharp, or (iv) inside sharp, c. means responsive to the signals from said means (a) and responsive to the existence of any one of said four classification signals excepting the third (OSS) for computing and signaling artificial end point coordinate values (XCEP', YCEP') which are less distant from the starting point of the first path segment in the direction of tool travel along such segment that are the first segment end point coordinates (XCEP, YCEP), and d. means resonsive to the signals representing said artificial end point coordinates (XCEP', YCEP') to terminate the tool movement along the first path segment at those artificial coordinate positions.

11. The combination set forth in claim 10 further characterized by means, responsive to signals from said means (c) representing artificial end point coordinates (XCEP', YCEP') for computing and signaling an internal block of command data representing a supplemental path segment extending from the said artificial end point coordinates to an internal block end point (XEP', YEP'), and means responsive to the second path segment signals from said means (a) for modifying the latter signals to represent a foreshortened second path segment extending from said internal block end point (XEP', YEP') to the programmed end point (XEP, YEP) represented by said second block of data.

12. In a numerical control system for moving a tool along first and second successive, non-tangent path segments defined by first and second numerically signaled blocks of data which directly or indirectly designate the end point coordinates of the two segments in an X, Y axis system, the effective radius Q of the tool being numerically signaled by an adjustable signal source, the improvement comprising in combination a. means for generating and signaling, from said signaled first and second data blocks, an internal block of data defining a circular arc having a radius Q and tangently joining the first and second path segments, a1. said internal block including signaled numerical representations of the X and Y axis components of the starting radius of said arc which is perpendicular to the first segment at their point of juncture, b. means for computing and numerically signaling from said signaled first and internal blocks of data the X, Y coordinate values of said point of juncture, and c. means for terminating the movement of the tool along the first path segment when its peripheral tangent contact with such segment reaches said coordinates, rather than when it reaches the end point coordinates defined by said first block of data.

13. The combination defined by claim 12 further including d. means for producing an indicating signal (XQ) in response to said first and second signaled blocks of data defining first and second successive path segments which are to be joined by an inside sharp transition, e. means responsive to said indicating signal (XQ) for decelerating the tool to zero velocity when its point of peripheral contact with the first path segment reaches the coordinates (XCEP', YCEP') of the point of juncture signaled by said means (b), and f. means for causing said tool to execute motion along the second path segment as modified to extend from the end point of the internal block of data, which is different from the end point coordinates (XCEP, YCEP) defined by the first block of data.

14. In a control system for moving a tool along first and second successive and non-tangent path segments which are defined by first and second blocks of numerical command data which directly or indirectly designate the end point coordinates of the two segments in an X, Y axis system, the second block of data including a fillet radius number (RF) when the two segments are to be joined by a programmed fillet and the tool radius (Q) being signaled numerically by an adjustable numerical signaling source, the combination comprising a. means for signaling the first and second blocks of numerical command data, b. means responsive to the signals from said means (a) for producing electric signals representing an internal block of data which defines a circular arc connecting and tangent to said first and second path segments with a radius equal to the larger one of (i) any programmed fillet radius (RF) or (ii) the tool radius (Q).

c. means, responsive to the signals from said means (a) and (b), for producing signals representing numerically the X and Y axis components of a starting radius for said circular arc which lies normal to the direction of the first path segment at their point of juncture, d. means for normally moving the tool along the first path segment to the end point coordinates designated by the first block of data and thence along the second segment, and e. means responsive to signals from said means (c) for terminating physical movement of the tool along the first path segment when its point of tangent contact with such first segment reaches said point of juncture.

15. In a control system for moving a tool along first and second successive, non-tangent path segments defined by first and second blocks of numerical data which directly or indirectly designate the end point coordinates XCEP, YCEP and XEP, YEP of such first and second segments in an X, Y axis system, one of said blocks of data designating the radius RF of a desired fillet joining said first and second segments, the combination comprising a. means for measuring off successive equal periods $\Delta T$ in actual time, b. means for producing first and second sets of signals respectively corresponding to the numerical data of said first and second blocks, c. an adjustable signal source for producing signals representing numerically the effective radius Q of the tool being controlled, d. means responsive to the signals from said means (b) for producing signals representing the starting point coordinate values XCP, YCP of the first path segment, and (d1) means for changing such signals to change the coordinate values by amounts $\Delta X$ and $\Delta Y$ during each period $\Delta T$ which are required to advance a target point along the path at a desired velocity, e. means responsive in part to said means (c) for producing signals numerically representing the X and Y components QX and QY of a vector of length Q lying normal to the active path segment, and (e1) means for changing such signals by amounts QX$\Delta$ and QY$\Delta$ during each period $\Delta T$ required to represent a new vector of length Q lying normal to the path segment at the location of the target point, f. means responsive to the signals from means (d) and (e) for moving the center of the tool along the X and Y axes to make it reside substantially instantaneously at coordinates respectively equal to XCP $\pm$ QX and YCP $\pm$ QY as those quantities take on different values during successive periods $\Delta T$, g. means, responsive to the signals from said means (b) and effective while the tool is being moved along said first path segment, for computing and electrically signaling an internally generated block of numerical data defining a circular arc segment of radius RF tangently joining said first and second path segments, and (g1) means for signaling the starting point coordinates XCEP', YCEP', the ending point coordinates XEP', YEP', and the starting radius X and Y components IB and JB of such internal block arc segment, h. means for controlling said means (f) to terminate movement of the tool along said first path segment when the tangent contact of the tool therewith reaches the internal block starting point coordinates XCEP', YCEP', i. means responsive to the signals from said means (h) for controlling said means (f) to cause the tool to follow the internal block arc segment, including means for terminating motion of the tool along such arc segment when the tangent contact of the tool with the arc segment reaches the end point coordinates XEP', YEP', j. means, responsive to the signals from said means (b) and operative while said tool is being moved along said internal arc segment, for computing and signaling new values defining a modified second path segment which extends from the point XEP', YEP' (rather than from XCEP, YCEP) to the original second segment end point XEP, YEP, —including new values of IB and JB which represent the X and Y components of (i) the foreshortened segment length if the second block of data designates that the second path segment is linear; or (ii) the starting point radius to the point XEP', YEP' if the second block of data designates that the second path segment is circular, and k. means for controlling said means (f) to cause the tool to continue motion from the end point of the internal arc segment along the modified second path segment, with the values of ΔX and ΔY and QXΔ and QYΔ during each period ΔT being derived from the second path segment starting values of IB, JB, QX and QY.

16. The combination set forth in claim 15 further including means responsive to a third block of data for producing signals defining a third path segment which is next-to-follow said second path segment, means for rendering said last-named means effective while said second block of data, as modified, is being actively executed, and means effective after said second path segment, as modified, has been executed by movement of the tool for causing the elements set out in claim 15 to function with the said modified second block of data treated as the "first block" and said third block of data being treated as the "second block."

17. In a control system for moving a tool along first and second successive, non-tangent path segments forming an outside sharp corner and defined by first and second blocks of numerical data which directly or indirectly designate the end point coordinates XCEP, YCEP and XEP, YEP of such segments in an X, Y axis system, the combination comprising a. means for measuring off successive equal time periods ΔT, b. means for producing signals representing the data in said first and second blocks and which define said first and second path segments, c. an adjustable signal source for signaling the effective radius Q of the tool being controlled, d. means responsive to the signals from said means (b) for producing signals representing the starting point coordinates XCP, YCP of the first path segment, and (d1) means for changing such signals by amounts ΔX and ΔY during each period ΔT which are required to advance a target point along the path at a desired velocity, e. means responsive to the signals from said means (b) and (c) for producing signals numerically representing the X and Y components QX and QY of a vector of length Q lying normal to the active path segment, and (e1) means for changing such signals by amounts QXΔ and QYΔ during each period ΔT required to represent a new vector of length Q lying normal to the path segment at the location of the target point, f. means responsive to the signals from said means (d) and (e) for moving the center of the tool along the X and Y axes to keep it residing substantially instantaneously at coordinates respectively equal to XCP ± QX and YCP ± QY as those quantities take on different values during successive periods ΔT, g. means, operative while the tool is moving along the first path segment and responsive to the signals from said means (b), for computing and signaling numerical values of data representing an internally generated block for which the X and Y axis components IB, JB are zero and which includes numerical signaling of the ending components QX and QY of a vector of length Q lying perpendicular to the second path segment at the starting point coordinates XCEP, YCEP of such segment, h. means for controlling said means (f) to terminate movement of the tool along the first path segment when the tangent contact of the tool therewith reaches the end point XCEP, YCEP defined by said first block of data, i. means for controlling said means (f) to cause the tool to move along the segment defined by said internally generated data block, with the result that said means (d) produces no change in the coordinate values XCP and YCP but said means (e) produces progressive changes in the signaled component numbers QX and QY, until the component numbers QX and QY reach the ending values thereof signaled as a part of the internally generated block, and j. means for thereafter controlling said means (f) to cause the tool to move along said second path segment.

18. In a control system including servo drives for moving a tool along X and Y axes to make it travel in tangent contact with a circular path segment defined by a block of data which directly or indirectly designate (i) the desired path velocity F, (ii) the end point coordinates XCEP, YCEP of the segment, (iii) the radius R of the segment, and (iv) the components I and J of the starting radius for the segment, the combination comprising a. an adjustable signal source for numerically signaling the effective radius Q of the tool being controlled, b. means for producing signals which represent the values designated by said block of data, c. means responsive to the signals from said means (a) and (b) for producing signals representing the total radius $R_t$ of the arc along which the tool center will travel, where $R_t$ equals $R - Q$ if the segment arc center and tool center are on the same side of the path segment, or equals $R + Q$ if such centers are on opposite sides of the path segment, d. means responsive to the signals from said means (c) for producing signals representing a circular upper limit velocity CULLV which is equal to $\sqrt{A \cdot R_t}$, where A is a predetermined constant related in magnitude to the maximum acceleration with which either of the X and Y axis servo drives can move the tool along the X or Y axis, e. means for measuring off successive equal time periods ΔT, f. means operative during each period ΔT and responsive to signals from said means (b) and (d) for producing signals representing incremental move numbers $\Delta X$ and $\Delta Y$, where $\Delta X = \pm J \cdot V \cdot \Delta T/R$ and $\Delta Y = \pm I \cdot V \cdot \Delta T/R$, with the quantity V being the smaller one of (i) the feed rate number F as represented by signals from said means (b) or (ii) the upper limit velocity CULLV as represented by signals from said means (d); and the quantity $V \cdot \Delta T/R$ being designated hereinbelow as $Q'$, g. means operative during each period $\Delta T$ for computing and signaling new values of I and J next to be effective and which are respectively equal to $I - \Delta X$ and $J - \Delta Y$, h. means for initially signaling the values of components QX and QY of a vector of length Q lying normal to the path segment at its beginning, i. means operative during each period $\Delta T$ for computing and signaling incremental changes $QX\Delta$ and $QY\Delta$ where $QX\Delta = \pm QY \cdot Q'$ and $QY\Delta = \pm QX \cdot Q'$, k. means effective during each period $\Delta T$ for changing the values QX and QY signaled by said means (i) such that the new values during each period $\Delta T$ represent $QX + QX\Delta$ and $QY + QY\Delta$, l. means for producing changeable signals representing command coordinate numbers XCP and YCP initially representing the starting point of the segment, m. means operative during each period $\Delta T$ for changing the values XCP and YCP signaled by said means (l) such that the new values during each period $\Delta T$ represent $XCP + \Delta X$ and $YCP + \Delta Y$, n. means, responsive to said means (k) and (l) operative during each period $\Delta T$ for computing and signaling command coordinate numbers XSC and YSC which are respectively equal to $XCP + QX$ and $YCP + QY$, and o. servo drive means responsive to the signals from said means (n) for moving the tool center to keep its actual position along the X and Y axes substantially instantaneously in agreement with the respective signals command numbers XSC and YSC.

19. In a control system for moving a tool along first and second successive path segments defined by first and second blocks of numerical data electrically signaled to designate directly or indirectly (i) the nautre (linear or circular) of each segment, (ii) the end point coordinates of each segment in an X, Y axis system, and (iii) the radius RF of any desired fillet to be formed between and tangent to said two segments being included as a part of the second data block, the combination comprising a. an adjustable signal source for producing signals representing the effective radius Q of the tool being controlled, b. means for producing signals representing the data forming said first and second blocks of numerical data, c. means responsive to signals from said means (b) for producing first control signal (FFE) when the data of said first and second blocks designate a path transition between said first and second segments which is an inside corner, d. means rendered effective in response to the existence of said first control signal and responsive to the signals from said means (a) and (b) for modifying the signals representing said second data block so that it designates no desired fillet radius in the event that the originally designated fillet radius RF is less than the tool radius Q signaled by said means (a).

e. means rendered effective by the presence of said first control signal and responsive to the signals from said means (a) and (b), for modifying said signals produced by said means (b) and representing said second data block to designate a linear path segment extending between the end point of said first path segment and the end point of the original second path segment, whenever the signals from said means (b) originally designate a tool radius Q which is greater than an original radius R of a circular second path segment, and f. means for causing the tool to move along the first and second path segments represented by the signals from said means (b) as modified or unmodified according to the operation of said means (d) and (e).

20. In a system for controlling the movement of a tool along first and second successive, non-tangent path segments forming an inside corner and defined by first and second blocks of numerical data directly or indirectly designating the end point coordinates of the two segments in an X, Y axis system, the second block of data defining a circular segment and designating directly or indirectly the X and Y components of its starting radius having length R, the combination comprising a. an adjustable signal source for producing signals numerically representing the effective radius Q of the tool being controlled, b. means for producing signals representing the numerical data of said first and second blocks, c. means responsive to signals from said means (a) and (b) for producing a reject signal if the second segment radius R is smaller than the tool radius Q, d. control means responsive to the signals from said means (a) and (b) for deriving and signaling an internal block of data defining the starting point coordinates and ending point coordinates and the X and Y ending radius components of an arcuate path segment having a radius Q and tangentially joining said first and second path segments; said control means further including means for executing the first data block by moving the tool along the first path segment but terminating such execution when the tool reaches said starting point coordinates (rather than when it reaches the first block end coordinates) while decelerating the tool velocity to zero as it reaches said starting point coordinates; said control means further including means for thereafter immediately executing said second data block by moving the tool along said second path segment from initial coordinates which are said ending coordinates; e. means responsive to said reject signal for modifying said control means to convert the latter into (i) means for modifying the numerically signaled values for the second data block so that they designate a linear path segment extending between the end point designated by said first data block and the end point designated by said second data block, whereupon said control means functions with the modified second block data instead of the original second block data.

21. In a system for controlling the movement of a tool along first and second successive, non-tangent path segments forming an inside corner and defined by first and second blocks of numerical data directly or indirectly designating the end point coordinates of the two segments in an X, Y axis system, the second block of data including a designation of the radius RF of a desired fillet to be formed between and tangent to the two segments, the combination comprising a. means for producing signals representing the designated values for said first and second blocks.
b. means for producing signals representing the effective radius Q of the tool being controlled,
c. means for comparing the signaled fillet radius RF with the signaled tool radius Q,
d. control means including
  d1. means responsive to the signals from said means (a) for producing signals representing an internal block of data defining the radius, the starting point coordinates, and the ending point coordinates of an arcuate path segment having a radius equal to RF and tangently joining said first and second path segments,
  d2. means for moving the tool along said first path segment but terminating such movement when the tool reaches said starting point coordinates (rather than when it reaches the first block end point coordinates),
  d3. means for thereafter moving the tool along the arcuate path segment represented by said internal block of data and terminating such movement when the tool reaches said ending point coordinates, and
  d4. means for thereafter moving the tool along the second path segment from initial coordinates which are said ending point coordinates (rather than from the first block end point coordinates) toward the end point coordinates for said second block;
e. means responsive to said comparing means (c) for modifying said control means (d) when the signals from said means (a) indicate that said tool radius Q is smaller than said fillet radius RF, including
  e1. means for causing said means (d1) to produce signals representing an internal block of data defining an arcuate path segment having a radius Q equal to the tool radius Q instead of the fillet radius RF,
  e2. means for causing said means (d2) to decelerate the tool velocity to zero and terminate its motion along said first path segment at a foreshortened end point represented by said starting point coordinates, and
  e3. and means for modifying said means (d3) and (d4) to cause said tool immediately after reaching said starting point coordinates to move along the second segment from initial coordinates which are said ending coordinates (rather than from the first block and point coordinates);
whereby a connecting fillet between said first and second segments is produced with a radius equal to the tool radius when the second data block defines a desired fillet radius which is smaller than the tool radius.

22. The combination set forth in claim 21 further characterized in that said second data block includes a mode designation (G02) or (G03) whenever the defined second path segment is circular, and said means (a) produces a mode signal in such event, and further comprising f. means for producing a reject signal if said second segment radius R defined by said second data block is less than said tool radius Q, and
g. means responsive to said reject signal for acting upon said means (a) to convert the signaling of said second block of data so that the signals therefore designate a linear path segment extending from the end point of the first path segment to the original designated end point of the second path segment, whereby said means (d) and (e) will function by using the modified second block data to cause the second path segment through which the tool is moved to be linear rather than circular.

23. In a control system for moving a tool along a path offset by the perpendicular distance Q from a path segment defined by a block of data electrically and numerically signaled to designate (i) whether that segment is linear or circular and (ii) the end point coordinates thereof in an X, Y axis system, the combination comprising a. means for numerically representing by signals the offset distance Q,
b. means responsive to said block data signals for producing signals representing target point coordinates XCP, YCP, and (b1) means for changing such signals respectively by amounts $\Delta X$ and $\Delta Y$, during each of successive equal time periods $\Delta T$, required to move the target point along the path segment at a desired velocity,
c. means for producing signals representing the end point coordinates XCEP, YCEP of the path segment,
d. means for signaling numerical values of X and Y components QX and QY of a vector of length Q lying normal to the path segment, and (d1) means for changing such signaling to change the signaled values of the components QX and QY by the amounts QX$\Delta$ and QY$\Delta$, during each period $\Delta T$, required to represent changes in the vector direction to keep it perpendicular to the path as the path target point XCP, YCP advances along a circular arc,
e. means for signaling the ending values QXE and QYE which the components QX and QY will acquire when said target point XCP, YCP reaches the end point coordinates XCEP, YCEP,
f. means responsive to said means (b) and (d) for moving the center of the tool such that its physical location coordinates substantially instantaneously agree with the sums XCP + QX and YCP + QY, so that the cutter center moves along a path offset by the distance Q from said path segment,
g. means for normally looking ahead during each period $\Delta T$ by determining and signaling on the fast axis when the number of $\Delta T$ periods, remaining to elapse before the target point reaches or passes the path segment end point, is less than a predetermined number,
h. means responsive to the signaled block data for producing a control signal when the path segment is circular and is of a radius less than the offset distance Q,
i. means responsive to the presence of said control signal for modifying said means (g) to convert it into a means for looking ahead during each $\Delta T$ by determining and signaling when the number of $\Delta T$'s remaining to elapse, before the changeable number QX or QY on the fast axis reaches or passes the value QXE or QYE, is less than a predetermined number, and
j. means for initiating the termination of the path segment execution and transfer to execution of a succeeding segment when either the unmodified means (g) or said modified means (g) signals a determination.

24. In a system for moving the center of a tool along a path which is offset perpendicularly by a distance Q from successive main path segments defined by successive blocks of numerical data, the combination comprising means for electrically signaling the numerical values of the quantities comprising a block of data, means for electrically signaling the numerical value of the desired offset distance Q, means for electrically signaling X and y axis coordinate numbers XCP and YCP and for changing the signaled values thereof by amounts $\Delta X$ and $\Delta Y$ during each of successive equal time periods required to designate the location of a point moving progressively along the main path segment, means for electrically signaling the values of numbers QX and QY which are the X and Y components of a vector of length Q initially lying perpendicular to the starting point of the main path segment, means for changing the signaled values of the numbers QX and QY during each time period when the main path segment is circular by amounts $QX\Delta = QY \cdot V \cdot \Delta T/R \pm Q$ and $QY\Delta = QX \cdot V \cdot \Delta I/R \pm Q$, where V is the velocity signaled as a part of said block of data, $\Delta T$ is the length of said time periods, and R is the radius of the main path segment signaled as a part of said block of data, means for signaling changeable servo command numbers XSC and YSC which during each period $\Delta T$ represent the respective sums $XCP + QX$ and $YCP + QY$, thereby to signal coordinates of a point which progressively moves along the offset path, and means responsive to the signals representing said command numbers XSC and YSC to move said tool along X and Y axes so as to keep its relative positions on said axes dynamically in agreement with the changing numbers represented by such signals.

25. In a control system for moving the center of a tool simultaneously along X and Y axes to produce composite motion along a path which is offset perpendicularly by a distance Q from successive main path segments defined by successive blocks of signaled numerical data, the tool in executing such successive path segments thereby undergoing an inside or an outside path corner transition, the combination comprising means responsive to the signals representing first and second successive path segments for generating first or second mode control signals (G41 or G42) when the tool bodily lies respectively on the left or the right of the path looking in the direction of travel, means responsive to the signals representing said first and second blocks of data for numerically signaling the value of an angle $(2\beta)$ which lies between (a) the line along which the tool will move when exiting from the first path segment and (b) the line along which the tool will move when entering the second path segment, means for producing a control signal (FFE) indicative of an inside corner transition only in response to (a) the signaled value of said angle being negative and the presence of said first mode signal or (b) the signaled value of said angle being positive and the presence of said second mode signal, and means controlled in its operation by the presence or absence of said control signal (FFE) and responsive to signals representing said first and second blocks of data for producing progressively changing command position signals XSC and YSC which indicate the progressive positions for the tool center to reach along the X and Y axes in traveling the offset path, and means responsive to said XSC and YSC signals for moving the tool simultaneously along the X and Y axes to keep its position dynamically in substantial agreement with such changing XSC and YSc signals.

26. The combination defined by claim 25 wherein two successive main path segments defined by two successive blocks of signaled numerical data may include in the second block a numerical designation of the radius (RF) of a desired fillet to be formed between and tangent to both of said segments, and further including:

means for producing an indicator signal (CCA) only when the second block of data designates a desired fillet radius (RF), means for producing first, second, third or fourth classification signals (XQ, OSS, XRO, XR) only respectively in response to
i. the absence of said indicator signal (CCA) and the presence of said control signal (FFE),
ii. the absence of both said indicator signal (CCA) and said control signal (FFE)
iii. the presence of said indicator signal (CCA) and the absence of said control signal (FFE), or
iv. the presence of both said indicator signal (CCA) and said control signal (FFE), and means responsive to the existing classification signal for determining the specific sequential operations performed by said means for producing said changing command signals XSC and YSC.

27. In a numerical control system for moving a tool along first and second successive path segments defined by first and second signaled blocks of numerical data, each block having a first or second signal (G01 or $\overline{G01}$) designating the corresponding segment as being either linear or circular, and in the latter case the signals corresponding to a given block and path segment numerically representing a circular segment with a radius R; and said system further including an adjustable signal source to produce signals numerically representing the effective radius Q of the tool in use, the improvement which comprises, in combination means responsive to a second signal ($\overline{G01}$) in the second block of data for comparing the signaled values Q and R to produce a reject signal only if the latter is less than the former, means responsive to said reject signal for modifying the signals which constitute and represent said second block of data so as to create a new second block of data defining a linear path segment extending from the end point of the first segment to the originally signaled end point of the second segment, means responsive to the signals representing said first and second blocks of data, with the second block of data being unmodified or modified according to the operation of said last-named means, for producing changing position command signals XSC and YSC which indicate progressive positions to be reached by the tool center along respective X and Y axes in traveling the desired path, and means responsive to said changing position command signals XSC and Ysc for simultaneously moving the tool along the X and Y axes to keep its position dynamically in substantial agreement with the changing values of such signals XSC and YSC.

28. In a numerical control system for moving a tool through two successive non-tangent path segments defined by first and second blocks of signaled numerical data which directly or indirectly designate the first and second segment end point coordinates, the second block of data including a signaled fillet radius number when the two path segments are to be joined by a fillet, the combination comprising means for deriving, from said signaled blocks of data, a first control signal (OSS) only when the two defined segments require the tool to travel around an outside corner without a fillet, means for producing a second control signal (CCA) when the second block of data includes a signaled fillet radius number, and means responsive to either the absence of said first signal or the presence of said second signal for terminating the movement of the tool commanded by said first block of data at an artificial end point along the first segment which is foreshortened in relation to the end point designated by said first block of data.

29. The combination set forth in claim 28 further including means for deriving the coordinate number values for said artificial end point from the signaled blocks of data and the signaled fillet radius number when the latter exists, and in its absence, from the radius of the tool in use.

30. The combination set forth in claim 12 further characterized in that said second block of data may include a numerical signaling of the radius RF for a fillet desirably to be formed between the first and second path segments, and said means (a) additionally includes means for generating and signaling said internal block of data to define a circular arc having a radius equal to the larger one of (i) said tool radius Q or (ii) said fillet radius RF.

31. The combination set forth in claim 30 further including means for producing a control signal when the signaled fillet radius (RF) is smaller than the tool radius Q, means responsive to said control signal for causing the tool to execute and follow the path segment defined by said internal block of data by movement of the tool promptly after the latter's peripheral tangent contact with the first path segment reaches said juncture coordinates (XCEP', YCEP'), and means for causing the tool to begin execution of the second path segment promptly from an artificial starting point whose coordinates are the end point of the internal block of data and different from the end point coordinates (XCEP, YCEP) defined by the first data block.

32. In a numerical control system for moving a tool along first and second successive, non-tangent path segments defined by first and second programmed and signaled blocks of numerical data which directly or indirectly designate the end point coordinates of the two segments in an X, Y axis system, the second block of data in some instances including a numerical signaling of the radius RF of a programmed fillet to be formed between the two path segments, and the effective tool radius Q being numerically signaled by an adjustable signal source, the combination comprising means for deriving and signaling, from said first and second signaled data blocks, an internal data block defining a circular arc path segment which begins and ends at points of tangency with the first and second segments and which has a radius equal to the larger one of (a) the tool radius Q or (b) the fillet radius RF.

means for moving the tool center along a path which is parallel to the first path segment and offset therefrom by the perpendicular distance Q to execute said first data block by terminating such movement when the tool periphery reaches the beginning point signaled as a part of said internal block, means for thereafter moving the tool center along a path which is parallel to the arc path segment defined by said internal data block but offset therefrom by the perpendicular distance Q and terminating such movement when the tool periphery reaches the end pont of such arc path segment, and means for thereafter moving the tool center along a path which is parallel to the second segment and offset therefrom by the perpendicular distance Q.

33. The combination set forth in claim 32 further including means, responsive to said first and second signaled data blocks, for producing a control signal (XQ) when the second block contains no fillet designation (RF) and the transition between the first and second segments is an inside corner, and means operative only in response to said control signal and which includes i. means for decelerating the tool velocity to zero by the time its periphery reaches the beginning point of the internal block circular arc path segment, ii. means for preventing any movement of the tool center of a consequence of the signaled internal data block, and iii. means for beginning the movement of the tool center along the said path which is parallel to the second segment immediately after the tool velocity has reached zero.

34. The combination set forth in claim 33 further characterized by and including means for producing signals numerically representing coordinates XCP, YCP of a point on a path segment being executed and adding thereto changes $\Delta x$ and $\Delta Y$ required during each of a succession of equal time periods $\Delta T$ to define a point which progressively moves along the path segment, means for changing the signals produced by said last-named means by adding values QX and QY to the represented values of XCP and YCP to form offset values of the latter, where QX and QY are the X and Y components of a vector of length Q lying perpendicular to the path segment, means for changing the signals produced by said last-named means to change the signaled values QX and QY by amounts $QX\Delta$ and $\Delta Y\Delta$ required during each period $\Delta T$ to keep the values of the QX and QY components representing a vector Q perpendicular to the segment as the angle of the segment changes, and means effective immediately when the tool reaches the beginning point of said internal block segment, for changing the signals representing the coordinate values XCP, YCP to new values equal to the coordinates of the end point of the internal block segment, and means effective immediately when the tool reaches the beginning point of said internal block segment for changing the signals representing QX and QY to represent new values which are respectively equal to the X and Y components of a vector of length Q lying perpendicular to the second path segment at the end point of the internal block segment 35. In a numerical control system for moving a tool along X and Y axes to make it travel a circular arc path segment defined by a block of signaled data numerically designating directly or indirectly the desired path velocity F and the radius R of the arc, the combination comprising means for computing and numerically signaling the value $ULV = \sqrt{A \cdot R}$, where A is a predetermined constant indicative of the maximum accelertaion with which X or Y servo drives can move the tool along the X or Y axis, means for signaling a number FA which is equal to the smaller one of the two numbers F and ULV, and means for moving the tool along the circular arc path segment, including 1. an X axis servo drive and means for causing it to drive the tool along the X axis a distance $\Delta X$ during each of successive equal time periods $\Delta T$, where $\Delta X = \pm J \cdot FA \cdot \Delta T/R$, and 2. a Y axis servo drive and means for causing it to drive the tool along the Y axis a distance $\Delta Y$ during each successive period $\Delta T$, where $\Delta Y = \pm I \cdot FA \cdot \Delta T/R$;

the numbers I and J being the X and Y components of the radius R at the start of the circular arc segment, and means for recomputing and signaling new values of I and J respectively equal to $I \pm \Delta X$ and $J \pm \Delta Y$ during each period $\Delta T$.

36. In a numerical control system for moving a tool along successive path segments defined by successive electrically signaled blocks of program data, each block including a numerically signaled end point, the combination comprising means for performing electrical signal digital computations during each of successive equal iteration periods $\Delta T$ to signal changing values of the coordinates XCP, YCP of a point advancing along a path segment, means for performing electrical signal digital computations during each period $\Delta T$ to signal changing values of the components QX, QY of an offset vector of length Q lying perpendicular to the path segment at the said advancing point, means for moving the center of the tool along an offset path to keep its actual position in agreement with coordinate values XCP + QX and YCP + QY, means for normally monitoring the coordinate value XCP or YCP in relation to the signaled end point coordinate XCEP or YCEP to initiate termination of the repeated computations for a given path segment, and means for disabling said last-named means and for monitoring the component value QX or QY in relation to the signaled value QXE or QYE which the later will reach at the end point of a path segment to initiate termination of the repeated computations for a given path segment.

* * * * *